(12) United States Patent
Ichimura et al.

(10) Patent No.: US 7,157,025 B2
(45) Date of Patent: Jan. 2, 2007

(54) TRANSPARENT COLORING COMPOSITION AND COLOR FILTER

(75) Inventors: Kunihiro Ichimura, Kanagawa-ken (JP); Kazuyuki Hayashi, Hiroshima-ken (JP); Hiroko Morii, Hiroshima-ken (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 10/808,545

(22) Filed: Mar. 25, 2004

(65) Prior Publication Data

US 2004/0235985 A1   Nov. 25, 2004

(30) Foreign Application Priority Data

Mar. 27, 2003   (JP)   ............................. 2003-089347

(51) Int. Cl.
*G02B 5/22*   (2006.01)
*B03F 3/12*   (2006.01)
*B32B 5/16*   (2006.01)
*B32B 5/30*   (2006.01)

(52) U.S. Cl. ........................... 252/582; 428/407; 516/9

(58) Field of Classification Search ................ 252/582
See application file for complete search history.

(56) References Cited

U.S. PATENT DOCUMENTS

| | | | |
|---|---|---|---|
| 6,596,071 B1 * | 7/2003 | Hayashi et al. | 106/445 |
| 6,623,557 B1 * | 9/2003 | Hayashi et al. | 106/499 |
| 6,737,211 B1 * | 5/2004 | Hayashi et al. | 430/108.11 |
| 2002/0069790 A1 * | 6/2002 | Hayashi et al. | 106/482 |
| 2003/0116758 A1 * | 6/2003 | Morii et al. | 252/582 |

FOREIGN PATENT DOCUMENTS

| | | |
|---|---|---|
| EP | 0 854 169 A1 | 7/1998 |
| EP | 1 184 426 A2 | 3/2002 |
| EP | 1 253 477 A2 | 10/2002 |
| EP | 1 262 229 A1 | 12/2002 |
| EP | 1 264 866 A2 | 12/2002 |
| EP | 1 270 686 A2 | 1/2003 |
| JP | 09068607 | 3/1997 |
| JP | 10183021 | 7/1998 |

* cited by examiner

*Primary Examiner*—Randy Gulakowski
*Assistant Examiner*—Timothy J. Kugel
(74) *Attorney, Agent, or Firm*—Nixon & Vanderhye P.C.

(57) ABSTRACT

The transparent coloring composition comprises a solvent and an organic-inorganic composite pigment comprising (i) fine white inorganic particles and an organic pigment adhered to the surface of the respective fine white inorganic particles, or (ii) fine white inorganic particles, a surface modifier coated on the surface of the respective fine white inorganic particles and an organic pigment adhered onto the surface modifier coating layer, primary particles of the composite pigment having an average particle diameter of 1 to 100 nm. The transparent coloring composition for color filter comprises the above transparent coloring composition and a transparent resin containing at least one acid group and/or latent acid group. The color filter is produced by applying a film-forming material made of the above transparent coloring composition for color filter on a substrate. The transparent coloring composition is suitable as a coloring composition for color filter because of excellent dispersibility and spectral properties. Further, the color filter produced from the transparent coloring composition can be suitably used as color filters for color liquid crystal displays (LCD) or the like owing to the excellent spectral properties.

12 Claims, No Drawings

TRANSPARENT COLORING COMPOSITION AND COLOR FILTER

BACKGROUND OF THE INVENTION

The present invention relates to a transparent coloring composition and a color filter. More particularly, the present invention relates to a transparent coloring composition containing an organic-inorganic composite pigment exhibiting not only a sharp particle size distribution but also an excellent photofatigue resistance as well as excellent spectral properties, a photosensitive transparent coloring composition obtained from the coloring composition, and a color filter obtained from the transparent coloring composition or the photosensitive transparent coloring composition.

Pigments have been primarily used for hiding a color tone of a substrate material and for changing the color to that of the pigments by coating the surface of the substrate material therewith together with a vehicle. The hiding power of the pigments is exhibited as a sum of surface reflection of incident light, and absorption and scattering of the light by the pigments (refer to "Handbook for Technology of Color Materials" edited by Institute of Color Materials, published by Asakura Shoten (1989), p. 240). In addition, the hiding power is influenced by a size, a dispersion degree and a volume concentration of the pigment particles, a refractive index of the vehicle, etc. On the other hand, the pigments having excellent photofatigue resistance, heat resistance and chemical resistance, have also been used as transparent colorants in extensive applications by further imparting a transparency thereto in addition to these excellent properties. One example of the applications is a color filter for liquid crystal displays. With remarkable progress of liquid crystal techniques, liquid crystal displays have been extensively used in personal computers as well as portable telephones, digital cameras, etc., and these liquid crystal displays are increasingly shifted to full color types. The liquid crystal devices are operated on the basis of such a principle that a liquid crystal enclosed between a pair of transparent electrodes is reversibly changed in orientation by applying an electric field to the electrodes, thereby producing shading due to change in transmittance of polarized light passed therethrough. The full coloration of the liquid crystal displays is achieved by providing regular pattern layers composed of three primary colors including red, blue and green, or cyan, yellow and magenta in respective fine regions on the transparent electrodes. The thus obtained patterned optical device constitutes a color filter, and have been required to be further improved in optical properties such as color properties, transmittance and contrast.

Also, a color filter for image pickup tubes is an optical device that is inevitably required to digitize full color images, and has been required to be considerably minimized in order to reproduce full color images having a high definition or resolution.

Typical examples of the method for production of a color filter for liquid crystal devices may include a pigment dispersion method, a dyeing method, a printing method, an electrodeposition method, etc. The dyeing method tends to be complicated in the production process and deteriorated in photofatigue resistance of the obtained product, and is, therefore, not frequently used. The printing method is still insufficient in accuracy irrespective of excellent productivity and low costs. The electrodeposition method has such a problem that the obtained product tends to be deteriorated in light transmittance due to formation of double ITO films required as transparent electrodes. On the other hand, the pigment dispersion method is simplified in production process and provides a color filter having an excellent photofatigue resistance, and, therefore, has been presently used as a main technique for production of the color filter (CMC, "2001 Markets of Constituting Materials for Liquid Crystal Displays", (2001), p. 115).

In order to produce a pigment dispersion-type color filter, there have been proposed methods of patterning a coating film made of a composition prepared by dispersing fine pigment particles having specific particle sizes in a photosensitive resin, by photolithography (Japanese Patent Application Laid-open (KOKAI) Nos. 60-129707(1985), 60-129739(1985), 9-197118(1997), 2001-214077 and 2002-328215).

In addition, there has been proposed a method of patterning a resin layer in which a soluble pigment precursor is dissolved in a molecular state, and then converting the soluble pigment precursor into an insoluble pigment by deprotection reaction using a chemical, thermal or photolytic method to form a transparent colored pattern (Japanese Patent Application Laid-open (KOKAI) No. 8-6242 (1996)).

As the photosensitive resin, there have been proposed water-soluble polymers substituted with photo-crosslinking group (Japanese Patent Publication (KOKOKU) No. 3-49422(1991)), radically photo-polymerizable resins composition (Japanese Patent Application Laid-open (KOKAI) Nos. 10-260310(1998) and 2000-47022), chemically amplified-type photoresists based on a catalytic reaction initiated by an acid produced from a photo-acid generator (Japanese Patent Application Laid-open (KOKAI) Nos. 7-84111 (1995), 9-203806(1997), 10-260532(1998) and 10-39127 (1998)), or the like.

Further, there have been proposed methods of subjecting an alkali-developable positive photoresist layer formed on an alkali-soluble resin layer in which fine pigment particles are dispersed, to exposure to light and to alkali development, and then etching and removing portions of the pigment-containing layer which are uncovered with the thus alkali-developed resist pattern (Japanese Patent Application Laid-open (KOKAI) Nos. 2000-53908 and 11-153706(1999)).

Meanwhile, the contrast of displays strongly depends upon depolarization of a color filter used therein. The depolarization further depends upon a scattering cross section of pigment contained in a pigment-dispersed film (Mure, Araizaki, Deguchi and Fujii, "SumitomoKagaku, 1998-II", p. 11). Since the scattering cross section is determined by a refractive index ratio between the pigment and binder resin, and a particle size of the pigment, the depolarization may be improved by reducing the particle size of the pigment and the scattering cross section. Therefore, optical properties of the color filter be improved by minimizing the particle size of the pigment particles contained in the colored film. However, even though a primary particle size of the pigment particles is sufficiently small, if the pigment particles are secondarily agglomerated, the pigment particles finally have a large particle size, thereby failing to improve the optical properties of the color filter. Namely, the small primary particle size is a necessary condition, but is not a sufficient condition.

On the other hand, in order to obtain an organic-inorganic composite pigment composed of inorganic pigment particles and an organic pigment adhered onto the surface thereof, there have been proposed techniques for synthesizing or precipitating the organic pigment in the presence of inorganic pigment, techniques for adhering the organic pigment onto the surface of inorganic pigment by a mechanically mixing and milling treatment, techniques for dissolving the organic pigment in a solvent, dispersing inorganic pigment in the obtained solution and adding a poor solvent for the organic pigment to the resultant dispersion, etc., (Japanese Patent Application Laid-open (KOKAI) Nos. 4-132770 (1992), 7-310027(1995), 10-88032(1998), 11-181329 (1999), 2002-356625 and 10-183021(1998)).

Also, in order to obtain a scratch-resistance color filter, there has been proposed a method of adding silica particles surface-treated with an organosilane containing hydrolyzable group(s) to a coloring composition for color filter (Japanese Patent Application Laid-open (KOKAI) No. 10-268124(1998)).

Color filters produced by the pigment dispersion method have been extensively used in applications such as mainly liquid crystal displays because of merits such as excellent photofatigue resistance and simplified production process. The color filters have been required to be further improved in spectral properties such as color reproducibility, transmittance and contrast. In addition, in order to obtain a color filter for image pickup tubes, it has been demanded to provide a coloring composition which is not adversely influenced by the particle size of pigment used therein even when the pigment is formed into ultrafine particles due to the increased number of pixel. To meet the above requirements, it has been required to provide a coloring composition and a color filter in which a pigment having a particle size as fine as possible and a narrow particle size distribution is dispersed.

In order to pulverize the pigment into fine particles, there has been most frequently used a mechanical pulverization method. For example, in Japanese Patent Application Laid-open (KOKAI) Nos. 60-129707(1985), 60-129739(1985) and 9-197118(1997), there are described color filters using a pigment having a specified particle size. However, since the pigment is mechanically pulverized into fine particles, the resultant pigment particles have a non-uniform particle shape and fails to show a narrow particle size distribution.

In addition, in Japanese Patent Application Laid-open (KOKAI) Nos. 2001-214077 and 2002-328215, there are described methods for forming a pigment into fine particles by pulverizing the pigment together with a milling medium such as common salt, and then removing the milling medium by water-washing. However, the obtained particles may fail to have uniform particle shape and particle size distribution.

Further, in the technique described in Japanese Patent Application Laid-open (KOKAI) No. 8-6242(1996), there can be produced fine pigment primary particles. However, in this method, a long heating time is required for formation of the pigment in a polymer solid film (refer to Ichimura, "Functional Materials", Vol. 23, No. 3, p. 25(2003)), and a color tone thereof may be unstable.

In Japanese Patent Application Laid-open (KOKAI) Nos. 4-132770(1992) and 7-310027(1995), there are described organic-inorganic composite pigments obtained by synthesizing and precipitating organic pigment by conducting azo-coupling reaction in the presence of inorganic pigment having a refractive index of not less than 2.0. However, these techniques aim at attaining a hiding effect by the pigment, but may fail to obtain an organic-inorganic composite pigment having a high transparency.

In Japanese Patent Application Laid-open (KOKAI) No. 10-88032(1998), there is described the technique for mechanically mixing and milling inorganic pigment and organic pigment while both are kept in a solid state. However, in the specified particle size range of the composite pigment composition, although it is possible to hide the pigment, the obtained composite pigment may fail to show a high transparency.

In Japanese Patent Application Laid-open (KOKAI) No. 11-181329(1999), there is described the technique of dispersing organic pigment in cyclic silicone in which a modified silicone is dissolved, adding inorganic pigment to the obtained dispersion, and evaporating and removing the cyclic silicone from the dispersion. However, in the specified particle size range of the inorganic particles which aims to attain a hiding effect, although it is possible to hide the inorganic pigment, the obtained composite pigment may fail to show a high transparency.

In Japanese Patent Application Laid-open (KOKAI) No. 2002-356625, there is described the technique for producing organic-inorganic composite particles by modifying the surface of white inorganic particles with organic residue and then adhering organic pigment onto the thus modified surface of the white inorganic particles. However, in this KOKAI, there is not described a coloring composition having a high transparency such as those used for color filters.

In Japanese Patent Application Laid-open (KOKAI) No. 10-183021(1998), there is described the transparent coloring composition containing organic-inorganic composite pigment treated with a silylating agent. However, there is no description concerning the particle size required for ensuring a transparency of the organic-inorganic composite pigment.

In Japanese Patent Application Laid-open (KOKAI) No. 10-268124(1998), there is described the technique of adding silica particles surface-treated with an organosilane containing hydrolyzable group(s) to a coloring composition for color filter. However, since the coloring pigment and silica particles are separately added to the coloring composition, the pigment particles tends to be agglomerated, so that it may be difficult to obtain a coloring composition for color filter having a high transparency.

As a result of the present inventors' earnest studies for solving the above problems, it has been found that when the surface of fine white inorganic particles is treated with an organic surface modifier and then the resultant surface-treated fine white inorganic particles are mixed and milled with an organic pigment, it is possible to obtain an organic-inorganic composite pigment containing primary particles having an average particle size of 1 to 100 nm and exhibiting a high transparency. The present invention has been attained on the basis of this finding.

SUMMARY OF THE INVENTION

An object of the present invention is to provide a coloring composition containing organic-inorganic composite pigment having not only a sharp particle size distribution but also exhibiting an excellent photofatigue resistance and excellent spectral properties.

Another object of the present invention is to provide a transparent coloring composition exhibiting an excellent photosensitivity.

A further object of the present invention is to provide a color filter exhibiting a light transmittance of not less than 75% in a transmission range of respective colors.

To accomplish the aims, in a first aspect of the present invention, there is provided a transparent coloring composition comprising an organic-inorganic composite pigment comprising fine white inorganic particles and an organic pigment adhered to the surface of the respective fine white inorganic particles, primary particles of the composite pigment having an average particle diameter of 1 to 100 nm; and a solvent.

In a second aspect of the present invention, there is provided a transparent coloring composition comprising an organic-inorganic composite pigment comprising fine white inorganic particles, a surface modifier coated on the surface of the respective fine white inorganic particles and an organic pigment adhered to the surface modifier coating layer, primary particles of the composite pigment having an average particle diameter of 1 to 100 nm; and a solvent.

In a third aspect of the present invention, there is provided a transparent coloring composition comprising the transparent coloring composition as defined in the above aspect 1 or 2, and a transparent resin having at least one acid group and/or latent acid group.

In a fourth aspect of the present invention, there is provided a photosensitive transparent coloring composition comprising the transparent coloring composition as defined in the above aspect 3, a radical photo-initiator and a polyfunctional monomer having two or more ethylenically unsaturated double bonds.

In a fifth aspect of the present invention, there is provided a photosensitive transparent coloring composition comprising the transparent coloring composition as defined in the above aspect 3 and a photo-acid generator.

In a sixth aspect of the present invention, there is provided a color filter comprising a film-forming material composed of the transparent coloring composition as defined in any of the above aspects 3 to 5.

DETAILED DESCRIPTION OF THE INVENTION

The compound and composition constituting the coloring composition of the present invention are described in detail below.

<Organic-inorganic Composite Pigment>

Conventional colorants for pigment dispersion-type color filters are composed of finely pulverized organic pigment solely. On the other hand, the colorant of the present invention is essentially different from the conventional colorants in that the colorant of the present invention is composed of organic-inorganic composite pigment. The organic-inorganic composite pigment can be produced (1) by mechanically adhering the organic pigment onto the surface of the fine white inorganic particles, or (2) by surface-treating the surface of fine white inorganic particles so as to allow an organic pigment to be readily adhered thereonto and then mechanically adhering the organic pigment onto the surface of the surface-treated fine white inorganic particles.

Next, the fine white inorganic particles as core particles, the surface-treating agent, method, the organic pigment and the organic-inorganic composite pigment are explained in detail.

Examples of the fine white inorganic particles as core particles usable in the present invention may include silica, clay, calcium carbonate, barium sulfate, alumina, talc or the like. The primary particles of the fine white inorganic particles have an average particle diameter of usually 0.9 to 99 nm, preferably 0.9 to 89 nm, more preferably 0.9 to 79 nm. The fine white inorganic particles may be of any suitable shape such as spherical shape, granular shape, polyhedral shape, acicular shape, spindle shape, rice grain-like shape, flake shape, scale shape and plate shape. In particular, when spherical fine white inorganic particles are used as core particles, the resultant organic and inorganic pigment also has a spherical shape. The spherical shape is preferable since the contact surface between the pigment particles is restricted, and dispersion of the pigment in a solvent is facilitated. The particle diameter and shape of primary particles of the fine white inorganic particles may be determined by observation using a microscope.

The primary particles of the fine white inorganic particles used in the present invention have a geometrical standard deviation of particle size of usually not more than 2.0, preferably not more than 1.8, more preferably not more than 1.5. When the geometrical standard deviation is more than 2.0, the resultant organic-inorganic composite pigment tends to have a broad particle size distribution, so that a color filter produced using such an organic-inorganic composite pigment tends to show an increased degree of light scattering, a reduced transmittance, and a deteriorated contrast.

The fine white inorganic particles used in the present invention have a BET specific surface area value of usually 10 to 1,000 $m^2/g$, preferably 15 to 750 $m^2/g$. When the BET specific surface area value is less than 10 $m^2/g$, the white inorganic particles tends to become coarse, so that the resultant organic-inorganic composite pigment produced therefrom also tends to be coarse particles, resulting in poor transparency.

The fine white inorganic particles used in the present invention preferably have such a refractive index that the difference in refractive index between the fine white inorganic particles and the organic pigment or transparent resin is as small as possible in order to prevent occurrence of light scattering and ensure a good transparency. Since the refractive index of the organic pigment is generally in the range of 1.2 to 2.5 and that of the transparent resin is generally in the range of 1.4 to 1.7, the fine white inorganic particles having a refractive index of usually 1.2 to 2.0, preferably 1.3 to 1.8, more preferably 1.3 to 1.7, are used. The transparency of the fine white inorganic particles can be enhanced by inhibiting scattering of light thereon.

When the behavior particle diameter of the fine white inorganic particles is expressed by a volume average particle diameter ($Dp_{50}$) thereof, the lower limit of the volume average particle diameter is usually more than 10.00 μm. In order to obtain such an organic-inorganic composite pigment having a volume average particle diameter ($Dp_{50}$) of not more than 5.00 μm, the volume average particle diameter ($Dp_{50}$) of the fine white inorganic particles are also preferably as low as possible. The upper limit of the volume average particle diameter ($Dp_{50}$) as the behavior particle diameter of the fine white inorganic particles is usually 100.00 μm, preferably 80.00 μm.

The behavior particles of the fine white inorganic particles used in the present invention have a volume maximum particle diameter ($Dp_{99}$) of usually not more than 200.00 μm, preferably not more than 190.00 μm, more preferably not more than 180.00 μm.

As to the hue of the fine white inorganic particles used in the present invention, the L* value thereof is usually not less than 70.00, preferably not less than 75.00; and the C* value thereof is usually not more than 18.00, preferably not more than 15.00, more preferably not more than 12.00. When the L* and C* values are out of the above-specified ranges, the color developing property of the organic pigment adhered onto the fine white inorganic particles tends to be unsuitably deteriorated.

As to the photofatigue resistance of the fine white inorganic particles used in the present invention, when measured by the below-mentioned method, the lower limit of the ΔE* value is usually more than 5.0, and the upper limit thereof is usually 12.0, preferably 11.0, more preferably 10.0.

The surface of the fine white inorganic particles used in the present invention is preferably coated with a surface modifier in order to facilitate adhesion of the organic pigment thereonto and ensure stable adhesion of the organic pigment even in the presence of a solvent. Examples of the surface-treating agent suitably used for this purpose may include organosilicon compounds such as alkoxysilanes, fluoroalkylsilanes, silane-based coupling agents and organopolysiloxanes; coupling agents such as titanate-based coupling agents, aluminate-based coupling agents and zirconate-based coupling agents; low-molecular or high-molecular surfactants; or the like.

Specific examples of the organosilicon compounds may include alkoxysilanes such as methyltriethoxysilane, dimethyldiethoxysilane, phenyltriethoxysilane, diphenyldiethoxysilane, methyltriethoxysilane, dimethyldimethoxysilane, phenyltrimethoxysilane, diphenyldimethoxysilane, ethyltriethoxysilane, propyltriethoxysilane, butyltriethoxysilane, isobutyltrimethoxysilane, hexyltriethoxysilane, octyltriethoxysilane and decyltriethoxysilane; fluoroalkylsilanes such as trifluoropropyltrimethoxysilane, tridecafluorooctyltrimethoxysilane, heptadecafluorodecyltrimethoxysilane, trifluoropropyltriethoxysilane, heptadecafluorodecyltriethoxysilane and tridecafluorooctyltriethoxysilane; silane-based coupling agents such as vinyltrimethoxysilane, vinyltriethoxysilane, γ-aminopropyltriethoxysilane, γ-glycidoxypropyltriethoxysilane, γ-mercaptopropyltrimethoxysilane, γ-methacryloyloxypropyltrimethoxysilane, N-(β-aminoethyl)-γ-aminopropyltrimethoxysilane, γ-glycidoxypropylmethyldimethoxysilane and γ-chloropropyltrimethoxysilane; organopolysiloxanes such as polysiloxane, methylhydrogenpolysiloxane and modified polysiloxanes; or the like.

Specific examples of the titanate-based coupling agents may include isopropyltrisstearoyl titanate, isopropyltris(dioctylpyrophosphate)titanate, isopropyltri(N-aminoethyl-aminoethyl)titanate, tetraoctylbis(ditridecylphosphate)titanate, tetra(2,2-diallyloxymethyl-1-butyl)bis(ditridecyl)phosphate titanate, bis(dioctylpyrophosphate)oxyacetate titanate, bis(dioctylpyrophosphate)ethylene titanate or the like.

Specific examples of the aluminate-based coupling agents may include acetoalkoxyaluminum diisopropylate, aluminum diisopropoxymonoethylacetoacetate, aluminum trisethylacetoacetate, aluminum trisacetylacetonate or the like.

Specific examples of the zirconate-based coupling agents may include zirconium tetrakisacetylacetonate, zirconium dibutoxybisacetylacetonate, zirconium tetrakisethylacetoacetate, zirconium tributoxymonoethykacetoacetate, zirconium tributoxyacecylacetonate or the like.

Specific examples of the low-molecular surfactants may include alkylbenzenesulfonic acid salts, dioctylsulfonesuccinic acid salts, alkylamineacetic acid salts, alkyl fatty acid salts or the like. Specific examples of the high-molecular surfactants may include polyvinyl alcohol, polyacrylic acid salts, carboxymethyl cellulose, acrylic acid-maleic acid salt copolymer, olefin-maleic acid salt copolymer or the like.

The surface modifier is coated in an amount of usually 0.01 to 15.0% by weight, preferably 0.02 to 12.5% by weight, more preferably 0.03 to 10.0% by weight (calculated as C) based on the weight of the fine white inorganic particles. When the coating amount of the surface modifier is less than 0.01% by weight, it may be difficult to adhere not less than 1 part by weight of the organic pigment onto the 100 parts by weight of the fine white inorganic particles.

When the coating amount of the surface modifier is not more than 15.0% by weight, it is possible to adhere 1 to 500 parts by weight of the organic pigment onto 100 parts by weight of the fine white inorganic particles. Therefore, it is not required to use the surface modifier in an amount of more than 15.0% by weight.

As the organic pigment used in the present invention, there may be used those organic pigments capable of exhibiting either (1) red, green and blue or (2) cyan, magenta and yellow. Also, in order to improve spectral properties of the obtained organic-inorganic composite pigment, these organic pigments may be used in combination with other organic pigments having different hues such as violet-based organic pigment exhibiting a complementary color of blue.

Examples of the organic red-based pigments may include quinacridone pigments such as quinacridon red, azo-based pigments such as permanent red, condensed azo pigments such as condensed azo red, vat dye-based pigments such as dianthraquinonyl red and diketopyrrolopyrrole-based pigments, perylene pigments such as perylene red, or the like. Examples of the organic green-based pigments may include phthalocyanine-based pigments such as phthalocyanine green, or the like. Examples of the organic blue-based pigments may include phthalocyanine-based pigments such as metal-free phthalocyanine blue, phthalocyanine blue and fast sky blue, alkali blue, or the like. Examples of the organic yellow-based pigments may include monoazo-based pigments such as Hanza yellow, disazo-based pigments such as benzidine yellow and permanent yellow, condensed azo pigments such as condensed azo yellow, isoindoline-based pigments such as isoindoline yellow, or the like. Examples of the organic violet-based pigments may include dioxazine-based pigments such as dioxazine violet, or the like. The organic pigments usable in the present invention are not particularly limited to the above-exemplified pigments.

The amount of the organic pigment adhered is usually 1 to 500 parts by weight, preferably 10 to 400 parts by weight, more preferably 20 to 300 parts by weight based on 100 parts by weight of the fine white inorganic particles. When the amount of the organic pigment adhered is less than 1 part by weight, since the amount of the fine white inorganic particles having no tinting power is too large, the color concentration of the resultant composite pigment tends to be insufficient. On the other hand, when the amount of the organic pigment adhered is more than 500 parts by weight, it may be difficult to form a highly uniform adhesion layer of the organic pigment.

The particle shape and particle size distribution of the organic-inorganic composite pigment of the present invention largely depend upon those of the fine white inorganic particles as core particles, and have a particle configuration similar to that of the fine white inorganic particles.

The primary particles of the organic-inorganic composite pigment have an average particle diameter of usually 1 to 100 nm, preferably 1 to 90 nm, more preferably 1 to 80 nm. When the average particle diameter of the primary particles is more than 100 nm, the particle size thereof tends to be too large, resulting in poor transparency. When the average particle diameter of the primary particles is less than 1 nm, the resultant pigment tends to be agglomerated due to too fine particles, so that it may be difficult to uniformly disperse the composite pigment in the transparent coloring composition.

The organic-inorganic composite pigment may have any suitable particle shape such as spherical shape, granular shape, polyhedral shape, acicular shape, spindle shape, rice grain-like shape, flake shape, scale shape and plate shape. In particular, the organic-inorganic composite pigment particles preferably have a spherical shape because the contact surface between the pigment particles is restricted, and dispersion of the pigment in a solvent is facilitated.

The primary particles of the organic-inorganic composite pigment have a geometrical standard deviation of particle size of usually not more than 2.0, preferably not more than 1.8, more preferably not more than 1.5. When the geometrical standard deviation of the primary particles is more than 2.0, the primary particles of the organic-inorganic composite pigment have a too broad particle size distribution, so that a color filter produced using such an organic-inorganic composite pigment tends to show an increased degree of light scattering, a reduced transmittance, and a deteriorated contrast. In consideration of industrial productivity, the lower limit of the geometrical standard deviation of particle size of the primary particles of the organic-inorganic composite pigment is 1.01

The organic-inorganic composite pigment has a BET specific surface area value of usually 10 to 1,000 $m^2/g$, preferably 15 to 750 $m^2/g$. When the BET specific surface area value is less than 10 $m^2/g$, the organic-inorganic composite pigment tends to be coarse particles, resulting in poor transparency.

The volume average particle diameter ($Dp_{50}$) representing the behavior particle diameter of the organic-inorganic composite pigment is usually not more than 5.00 μm, preferably 0.01 to 4.50 μm, more preferably 0.01 to 4.00 μm. When the volume average particle diameter ($Dp_{50}$) of behavior particles of the organic-inorganic composite pigment is more than 5.00 μm, the color filter produced therefrom tends to be deteriorated in transmittance.

The behavior particles of the organic-inorganic composite pigment used in the present invention have a volume maximum particle diameter ($Dp_{99}$) of usually not more than 12.00 μm, preferably not more than 11.00 μm, more preferably not more than 10.00 μm. When the volume maximum particle diameter ($Dp_{99}$) of the organic-inorganic composite pigment is more than 12.00 μm, the existing coarse particles tend to inhibit a uniform film from being produced upon formation of a coating film of the color filter.

The organic-inorganic composite pigment has a tinting strength of usually not less than 110%, preferably not less than 115%, more preferably not less than 120%, when evaluated by the below-mentioned method.

As to the photofatigue resistance of the organic-inorganic composite pigment, the ΔE* value thereof is usually not more than 5.0, preferably not more than 4.0, when evaluated by the below-mentioned method.

The desorption degree of the organic pigment from the organic-inorganic composite pigment is usually Rank 5 or 4, preferably Rank 5, when evaluated by the below-mentioned visual observation method. When the desorption degree of the organic pigment is Rank 3, 2 or 1, the desorbed organic pigment tends to prevent the organic-inorganic composite pigment from being uniformly dispersed in the transparent coloring composition, and the desorbed organic pigment itself tends to be self-agglomerated or undergo crystal growth. As a result, the color filter produced using such an organic-inorganic composite pigment tends to be deteriorated in contrast due to light scattering.

The transparent coloring composition according to the first and second aspects of the present invention contains the above organic-inorganic composite pigment and a solvent, and may further contain a dispersant, etc., if required.

<Solvent>

The solvent used in the present invention is not particularly restricted as long as the organic-inorganic composite pigment, the transparent resin, the polyfunctional monomer having two or more ethylenically unsaturated double bonds, the photopolymerization initiator and the photoacid generator can be dissolved or dispersed therein, and the solvent can be evaporated and removed from the composition after coating. Examples of the solvent may include water; aromatic hydrocarbons such as toluene and xylene; ketones such as methyl ethyl ketone and cyclohexanone; amides such as N,N-dimethylformamide, N,N-dimethylacetamide and N-methyl pyrrolidone; ether alcohols such as ethylene glycol monomethyl ether, ethylene glycol monoethyl ether, diethylene glycol monomethyl ether, propylene glycol monomethyl ether and propylene glycol monoethyl ether; ether acetates such as ethylene glycol monomethyl ether acetate, ethylene glycol monoethyl ether acetate, propylene glycol monomethyl ether acetate and propylene glycol monoethyl ether acetate; acetic acid esters such as ethyl acetate, butyl acetate and isobutyl acetate; lactic acid esters such as lactic acid methyl ester, lactic acid ethyl ester and lactic acid propyl ester; cyclic esters such as ethylene carbonate, propylene carbonate and γ-butyrolactone; or the like. These solvents may be used singly or in the form of a mixture of any two or more thereof.

In the present invention, the solvent may be used in an amount of usually 5 to 90% by weight, preferably 10 to 80% by weight based on the total weight of the organic-inorganic composite pigment, the transparent resin, the polyfunctional monomer and the photopolymerization initiator. When the amount of the solvent used is less than 5% by weight, the resultant composition tends to show a too high viscosity, thereby failing to form a uniform film. When the amount of the solvent used is more than 90% by weight, the thickness of a coating film obtained therefrom tends to be too small, so that it may be difficult to obtain a color filter having sufficient color concentration and contrast.

<Dispersant>

As the dispersant, there may be used at least one surfactant selected from the group consisting of anionic surfactants such as ammonium laurylsulfate and polyoxyethylene alkylethersulfuric acid ester; cationic surfactants such as stearylamine acetate and lauryltrimethylammonium chloride; amphoteric surfactants such as lauryldimethylamine oxide and laurylcarboxymethylhydroxyethyl imidazolium betaine; nonionic surfactants such as polyoxyethylene lauryl ether, polyoxyethylene stearyl ether and sorbitan monostearate.

In particular, when water is used as the solvent, the anionic surfactants, nonionic surfactants, cationic surfactants, sodium naphthalenesulfonate-formalin condensate, acetylene glycol-based dispersants, etc., are preferably used as the dispersant.

The transparent coloring composition according to the first and second aspects of the present invention has a viscosity of usually 0.5 to 800 mPa·s. When the viscosity of the transparent coloring composition is more than 800 mPa·s, it may be difficult to obtain a uniform coating film thereof. When the viscosity of the transparent coloring composition is less than 0.5 mPa·s, the thickness of the resultant coating film tends to be too thin.

The dispersion average particle diameter ($Dd_{50}$) of the organic-inorganic composite pigment in the transparent coloring composition according to the first and second aspects of the present invention is usually not more than 300 nm, preferably not more than 250 nm, more preferably not more than 200 nm. The dispersion particle diameter ($Dd_{84}$) of the organic-inorganic composite pigment in the transparent coloring composition is usually not more than 600 nm, preferably not more than 550 nm, more preferably not more than 500 nm. The dispersion maximum particle diameter ($Dd_{99}$) of the organic-inorganic composite pigment in the transparent coloring composition is usually not more than 1,000 nm, preferably not more than 900 nm, more preferably not more than 800 nm. The geometrical standard deviation ($Dd_{84}/Dd_{50}$) of the dispersion particle diameter ($Dd_{84}$) to the dispersion average particle diameter ($Dd_{50}$) is usually not more than 3.00, preferably not more than 2.75, more preferably not more than 2.50.

The transmittance values of the transparent coloring composition according to the first and second aspects of the present invention are as follows. The transparent coloring composition using the green-based organic-inorganic composite pigment exhibits a 530 nm transmittance of usually not less than 65%, preferably not less than 70%, more preferably not less than 75%; a 650 nm transmittance of usually not more than 5%, preferably not more than 3%; and a 650 nm specific absorptivity (based on weight) of usually 1.05 to 5.00, preferably 1.10 to 5.00, more preferably 1.20 to 5.00.

The transparent coloring composition using the blue-based organic-inorganic composite pigment exhibits a 460 nm transmittance of usually not less than 65%, preferably not less than 70%, more preferably not less than 75%; a 610 nm transmittance of usually not more than 5%, preferably not more than 3%; and a 610 nm specific absorptivity (based on weight) of usually 1.05 to 5.00, preferably 1.10 to 5.00, more preferably 1.20 to 5.00.

The transparent coloring composition using the red-based organic-inorganic composite pigment exhibits a 620 nm transmittance of usually not less than 65%, preferably not less than 70%, more preferably not less than 75%; a 550 nm transmittance of usually not more than 5%, preferably not more than 3%; and a 550 nm specific absorptivity (based on weight) of usually 1.05 to 5.00, preferably 1.10 to 5.00, more preferably 1.20 to 5.00.

The transparent coloring composition using the yellow-based organic-inorganic composite pigment exhibits a 550 nm transmittance of usually not less than 65%, preferably not less than 70%, more preferably not less than 75%; a 400 nm transmittance of usually not more than 5%, preferably not more than 3%; and a 400 nm specific absorptivity (based on weight) of usually 1.05 to 5.00, preferably 1.10 to 5.00, more preferably 1.20 to 5.00.

The transparent coloring composition according to the third aspect of the present invention is obtained by adding the transparent resin to the transparent coloring composition according to the first or second aspect of the present invention.

<Transparent Resin>

The transparent resin usable in the present invention is not particularly restricted as long as the resin is soluble in an alkali developing solution, has no absorption band in a visible wavelength range, and exhibits a good film-forming property. Examples of the transparent resin may include polymers substituted with at least one acid group, or polymers having at least one latent acid group capable of being converted into an acid group by deprotection reaction due to the effect of an acid. The acid group usable in the present invention includes phenolic hydroxy and carboxyl. The amount of the acid group introduced may be appropriately adjusted so as to attain a good solubility of the transparent resin in an aqueous alkali solution.

Examples of the polymers having a phenolic hydroxy group may include novolak resins, homopolymers or copolymers of 4-hydroxystyrene, or the like.

Examples of the transparent resin having a carboxyl group may include vinyl-based copolymers of ethylenically unsaturated monomer with other copolymerizable unsaturated monomer. Examples of the monomer having a carboxyl group may include acrylic acid, methacrylic acid, 2-acryloyloxyethyl phthalate, 2-acryloyloxypropyl phthalate, maleic acid, maleic anhydride, itaconic acid, itaconic anhydride or the like. Examples of the other monomer copolymerizable with the monomer having a carboxyl group may include methyl (meth)acrylate, ethyl (meth)acrylate, propyl (meth)acrylate, butyl (meth)acrylate, cyclohexyl (meth)acrylate, isobornyl (meth)acrylate, 2-hydroxyethyl (meth)acrylate, 2-hydroxypropyl (meth)acrylate, benzyl (meth)acrylate, phenyl (meth)acrylate, 2-ethoxyethyl (meth)acrylate, 2-phenoxyethyl (meth)acrylate, 2-(N,N-dimethylamino)ethyl (meth)acrylate, glycidyl (meth)acrylate, (meth)acrylonitrile, (meth)acrylamide, (meth)acryloyl morpholide, N-methyl maleimide, N-phenyl maleimide, N-cyclohexyl maleimide, styrene, 4-vinyl toluene, vinyl acetate, vinyl methyl ether or the like.

The molar ratio of the carboxyl-containing monomer to the transparent resin is usually 0.005 to 0.5, preferably 0.05 to 0.4. When the molar ratio of the carboxyl-containing monomer is less than 0.005, the resultant copolymer tends to be deteriorated in solubility in the aqueous alkali solution, resulting in occurrence of fogging upon patterning. When the molar ratio of the carboxyl-containing monomer is more than 0.5, a coating film obtained from the resultant photosensitive composition tends to be undesirably swelled at insolubilized exposed portions thereof upon the alkali development after exposure to light, resulting in deterioration in resolution as well as surface smoothness of the obtained coating film. The transparent resin has a weight-average molecular weight of usually 2,000 to 500,000, preferably 3,000 to 300,000.

As the carboxyl-containing transparent resin, there may be used polyamic acids obtained by polyaddition reaction of tetracarboxylic dianhydride and diamine. Examples of the tetracarboxylic dianhydride may include 1,2,3,4-cyclobutanetetracarboxylic dianhydride, 1,2,3,4-cyclopentanetetracarbbxylic dianhydride, 1,2,3,5-cyclopentanetetracarboxylic dianhydride, 1,2,4,5-bicyclohexenetetracarboxylic dianhydride, 3,3',4,4'-benzophenonetetracarboxylic dianhydride, pyromellitic dianhydride, 3,3',4,4'-diphenylsulfonetetracarboxylic dianhydride, 3,3',4,4'-biphenyltetracarboxylic dianhydride or the like, but are not particularly limited thereto. Also, these dianhydrides may be used singly or in the form of a mixture of any two or more thereof. Examples of the diamines reacted with these dianhydrides may include ethylenediamine, 1,3-diaminocyclohexane, 1,4-diaminocyclohexane, 4,4'-diaminodiphenyl ether, 3,4'-diaminodiphenyl ether, 4,4'-diaminodiphenyl methane, 3,3'-diaminodiphenyl methane, 4,4'-diaminodiphenyl sulfone, 3,3'-diaminodiphenyl sulfone, m-phenylenediamine, p-phenylenediamine, 2,4-diaminotolene, 2,5-diaminotolene or the like, but are not particularly limited thereto.

The polyamic acids may be produced by reacting the tetracarboxylic dianhydride with the diamine in a polar organic solvent by known methods. The polymerization degree of the polyamic acids may be controlled by changing the mixing molar ratio between these components.

The latent acid group-containing transparent resin is a polymer having a substituent group capable of producing a carboxyl group or a phenolic hydroxy group by a catalytic action of an acid generated from the photo-acid generator. As such a transparent resin, there may be used base polymers used in alkali-developable chemically amplified photoresists (refer to C. P. Wong, "Polymers for Electronic and Photonic Applications", Academic Press, p. 67(1993)). Examples of the latent acid group-containing transparent resin may include copolymers of cyclohexyl (meth)acrylate, tert-butyl (meth)acrylate, tert-amyl (meth)acrylate, 1,1-dimethylbenzyl (meth)acrylate, 1-ethoxyethyl (meth)acrylate, etc., with other acrylate monomers containing (meth)acrylic acid, homopolymers of 4-(tert-butoxycarbonyloxy)styrene, 4-(1-methoxyethoxy)styrene, 4-(1-ethoxyethoxy)styrene, etc. or copolymers of these monomers with 4-hydroxystyrene, or the like.

These transparent resins substituted with an acid group and/or a latent acid group may be used in an amount of usually 5 to 500 parts by weight, preferably 7 to 300 parts by weight based on 100 parts by weight of the organic-inorganic composite pigment. When the amount of the transparent resin used is less than 5 parts by weight, the resultant composition tends to be deteriorated in film-forming property and alkali developability. When the amount of the transparent resin used is more than 500 parts by weight, since the concentration of the pigment is relatively lowered, the thickness of the coating film must be increased to ensure a color concentration required for the color filter. As a result, it may be difficult to obtain a film having a uniform thickness, and the resultant color filter tends to be deteriorated in optical properties.

The transparent coloring composition according to the third aspect of the present invention has a viscosity of usually 0.5 to 1,000 mPa·s. When the viscosity of the transparent coloring composition is more than 1,000 mPa·s, it may difficult to obtain a uniform coating film. When the viscosity of the transparent coloring composition is less than 0.5 mPa·s, the thickness of the obtained coating film tends to be too thin.

The dispersion average particle diameter ($Dd_{50}$) of the organic-inorganic composite pigment in the transparent coloring composition according to the third aspect of the present invention is usually not more than 300 nm, preferably not more than 250 nm, more preferably not more than 200 nm. The dispersion particle diameter ($Dd_{84}$) of the organic-inorganic composite pigment in the transparent coloring composition is usually not more than 600 nm, preferably not more than 550 nm, more preferably not more than 500 nm. The dispersion maximum particle diameter ($Dd_{99}$) of the organic-inorganic composite pigment in the transparent coloring composition is usually not more than 1,000 nm, preferably not more than 900 nm, more preferably not more than 800 nm. The geometrical standard deviation ($Dd_{84}/Dd_{50}$) of the dispersion particle diameter ($Dd_{84}$) to the dispersion average particle diameter ($Dd_{50}$) is usually not more than 3.00, preferably not more than 2.75, more preferably not more than 2.50.

The specific absorptivity values (based on weight) of the transparent coloring composition according to the third aspect of the present invention are as follows. The transparent coloring composition using the green-based organic-inorganic composite pigment exhibits a specific absorptivity at a wavelength of 650 nm of usually 1.05 to 5.00, preferably 1.10 to 5.00, more preferably 1.20 to 5.00. The transparent coloring composition using the blue-based organic-inorganic composite pigment exhibits a specific absorptivity at a wavelength of 610 nm of usually 1.05 to 5.00, preferably 1.10 to 5.00, more preferably 1.20 to 5.00. The transparent coloring composition using the red-based organic-inorganic composite pigment exhibits a specific absorptivity at a wavelength of 550 nm of usually 1.05 to 5.00, preferably 1.10 to 5.00, more preferably 1.20 to 5.00. The transparent coloring composition using the yellow-based organic-inorganic composite pigment exhibits a specific absorptivity at a wavelength of 400 nm of usually 1.05 to 5.00, preferably 1.10 to 5.00, more preferably 1.20 to 5.00.

Further, a colored transparent film obtained from the transparent coloring composition according to the third aspect of the present invention has a surface roughness Ra of usually not more than 20.0 nm, preferably not more than 15.0, more preferably not more than 10.0 nm; and a photo-fatigue resistance $\Delta E^*$ value of usually not more than 5.00, preferably not more than 4.50.

The transmittance values of the colored transparent film obtained from the transparent coloring composition according to the third aspect of the present invention are as follows. Namely, the colored transparent film using the green-based organic-inorganic composite pigment exhibits a 530 nm transmittance of usually not less than 75%, preferably not less than 80%, more preferably not less than 85%, still more preferably not less than 90%; and a 650 nm transmittance of usually not more than 5%, preferably not more than 3%.

The colored transparent film using the blue-based organic-inorganic composite pigment exhibits a 460 nm transmittance of usually not less than 75%, preferably not less than 80%, more preferably not less than 85%, still more preferably not less than 90%; and a 610 nm transmittance of usually not more than 5%, preferably not more than 3%.

The colored transparent film using the red-based organic-inorganic composite pigment exhibits a 620 nm transmittance of usually not less than 75%, preferably not less than 80%, more preferably not less than 85%, still more preferably not less than 90%; and a 550 nm transmittance of usually not more than 5%, preferably not more than 3%.

The colored transparent film using the yellow-based organic-inorganic composite pigment exhibits a 550 nm transmittance of usually not less than 75%, preferably not less than 80%, more preferably not less than 85%, still more preferably not less than 90%; and a 400 nm transmittance of usually not more than 5%, preferably not more than 3%.

The transparent coloring composition according to the fourth aspect of the present invention is obtained by adding a photo-radial polymerization initiator and a polyfunctional monomer having two or more ethylenically unsaturated double bonds to the transparent coloring composition as defined in the third aspect of the present invention.

In addition, the transparent coloring composition according to the fifth aspect of the present invention is obtained by adding a photo-acid generator to the transparent coloring composition as defined in the third aspect of the present invention.

<Polyfunctional Monomer having Two or more Ethylenically Unsaturated Double Bonds>

As the method for producing the pigment dispersion-type color filter, there have been proposed the etching method of subjecting a pigment-free photosensitive film formed on a pigment-containing coating film to exposure to light and then to developing process in which patterns are formed on the photosensitive layer and, at the same time, the pigment-containing coating film is removed by etching; and the colored photosensitive material method in which a pigment is dispersed in a photosensitive layer itself ("Film-Forming Techniques and Chemicals for Color Filters" supervised by Watanabe, CMC Press (1998), p. 49). In the case where the color filter is produced from the coloring composition composed of the organic-inorganic composite pigment and the acid group-containing transparent resin, the former etching method is applicable thereto. In order to apply the latter colored photosensitive material method to such a composition, it is required to impart a photosensitivity to the coloring composition. The polyfunctional monomer having two or more ethylenically unsaturated double bonds is added to the transparent resin in order to impart a photosensitivity to the coloring composition and serves for initiating polymerization by radical species generated from the photopolymerization initiator at light-exposed portions thereof and inducing a crosslinking reaction to cause insolubilization of the composition.

Examples of the polyfunctional monomer having two or more ethylenically unsaturated double bonds may include polyfunctional monomers such as ethylene glycol di(meth)acrylate, diethylene glycol di(meth)acrylate, trimethylene glycol di(meth)acrylate, tetramethylene glycol di(meth)acrylate, pentamethylene glycol di(meth)acrylate, hexamethylene glycol di(meth)acrylate, neopentyl glycol di(meth)acrylate, pentaerythritol tri(meth)acrylate, pentaerythritol tetra(meth)acrylate, stearic acid-modified pentaerythritol (meth)acrylate, trimethylolpropane tri(meth)acrylate, tris(acryloyloxyethyl)isocyanurate dipentaerythritol hexaacrylate and dipentaerythritol pentaacrylate as well as acrylate oligomers obtained from polyester resins, epoxy resins, urethane resins, silicone resins, etc.

These polyfunctional monomers may be used in the form of a mixture with monofunctional monomers. Examples of the monofunctional monomers may include methoxytriethylene glycol (meth)acrylate, 2-hydroxy-3-phenoxypropyl (meth)acrylate, 2-acryloyloxyethyl succinate, 2-acryloyloxyethyl phthalate, 2-acryloyloxypropyl phthalate or the like. These monofunctional monomers may be used in an amount of usually 0 to 80 parts by weight, preferably 0 to 40 parts by weight based on 100 parts by weight of the polyfunctional monomer. When the amount of the monofunctional monomers used exceeds the above-specified range, the coating film obtained from the composition tends to be partially peeled off or deteriorated in resolution upon the alkali development after exposure to light.

The polyfunctional monomer used in the present invention is preferably mixed in especially the carboxyl-containing vinyl-based copolymer among the components of the transparent resin. The amount of the polyfunctional monomer used is usually 5 to 300 parts by weight, preferably 10 to 200 parts by weight based on 100 parts by weight of the transparent resin. When the amount of the polyfunctional monomer used is less than 5 parts by weight, the coating film obtained from the composition tends to be partially peeled off or deteriorated in resolution after the alkali development. When the amount of the polyfunctional monomer used is more than 300 parts by weight, the resultant composition tends to be deteriorated in alkali developability, resulting in problems such as fogging at unexposed portions of the coating film and failed removal of the film.

<Photopolymerization Initiator>

The photopolymerization initiator used in the present invention is a substance capable of efficiently generating radical species by irradiation of light, and serves for initiating polymerization of the polyfunctional monomer to form a crosslinked structure and reduce the alkali solubility of the acid group-containing transparent resin, thereby producing negative images. Examples of the photopolymerization initiator may include ketone-based compounds, triazine-based compounds containing a trichloromethyl group, electron transfer-type initiators or the like. Of these polymerization initiators, preferred are such polymerization initiators capable of generating radical species by irradiation of ultraviolet ray in a wavelength range of 200 to 450 nm.

Specific examples of the ketone-based photopolymerization initiators may include 2-hydroxy-2-methyl-1-phenyl-propan-1-one, 1-hydroxy-1-benzoylcyclohexane, 2-morpholino-2-methyl-1-phenylpropan-1-one, 2-morpholino-2-methyl-1-(4-methoxyphenyl)propan-1-one, 2-morpholino-2-methyl-1-(4-methylthiophenyl) propan-1-one, 2-benzyl-2-dimethylamino-1-(4-morpholinophenyl) butan-1-one, 2-phenyl-2,2-dimethoxy-1-(4-methylthiophenyl) ethan-1-one, diphenylmesitylenephosphine oxide, phenacyltetramethylenesulfonium hexafluorophosphate or the like.

Specific examples of the triazine-based compounds containing a trichloromethyl group may include 2-(4-methoxy-β-styryl)-bis(4,6-trichloromethyl)-s-triazine, 1-phenyl-3,5-bis(trichloromethyl)-s-triazine, 1-(4-chlorophenyl)-3,5-bis(trichloromethyl)-s-triazine, 1-(4-methoxyphenyl)-3,5-bis(trichloromethyl)-s-triazine, 1-(4-butoxyphenyl)-3,5-bis(trichloromethyl)-s-triazine, 1-(3,4-methylenedioxyphenyl)-3,5-bis(trichloromethyl)-s-triazine, 1-(3,4-dimethoxyphenyl)-3,5-bis(trichloromethyl)-s-triazine, 1-(4-methoxynaphthyl-1)-3,5-bis(trichloromethyl)-s-triazine, 1-{2-(4-methoxyphenyl)ethenyl}-3,5-bis(trichloromethyl)-s-triazine, 1-{2-(2-methoxyphenyl)ethenyl}-3,5-bis(trichloromethyl)-s-triazine, 1-{2-(3,4-dimethoxyphenyl)ethenyl}-3,5-bis(trichloromethyl)-s-triazine, 1-{2-(3-chloro-4-methoxyphenyl)ethenyl}-3,5-bis(trichloromethyl)-s-triazine, 1-(biphenyl-1)-3,5-bis(trichloromethyl)-s-triazine or the like.

The electron transfer-type initiator is composed of a radical generator as an electron accepting compound or an electron donating compound, and a sensitizing agent. Examples of the electron accepting compound may include trichloromethyl-substituted triazine derivatives; biimidazole compounds such as 2,2'-bis(2-chlorophenyl)-4,4',5,5'-phenylbiimidazole, 2,2'-bis(2,4-dichlorophenyl)-4,4',5,5'-phenylbiimidazole and 2,2'-bis(2-chlorophenyl)-4,4',5,5'-tetrakis(4-ethoxycarbonylphenyl)biimidazole; iodonium salts such as diphenyliodonium hexafluorophosphate, bis(4-tert-butylphenyl)iodonium hexafluorophosphate and (4-methoxyphenyl)(4-octyloxyphenyl)iodonium hexafluorophosphate; or the like. Examples of the sensitizing agent may include 9,10-dimethyl anthracene, 9,10-diphenyl anthracene, 9,10-bis(phenylethinyl)anthracene, 1,8-dimethyl-9,10-bis(phenylethinyl)anthracene, 9,10-dimethoxyanthracene, 9,10-diethoxyanthracene, 9,10-dipropoxyanthracene, 9,10-dibutoxyanthracene, thioxanthone, isopropylthioxanthone, 4,4'-bis(diethylamino)benzophenone or the like. Further, there may also be used photopolymerization initiators composed of an electron donating compound and a sensitizing agent. Examples of the suitable electron donating compound may include p-dimethylaminobenzoic acid esters, diethanolamine or the like. Examples of the suitable sensitizing agent may include thioxanthone derivatives or the like. One or more kinds of sensitizing agents may be used in combination with the above electron accepting compound or electron donating compound.

<Photo-acid Generator>

Examples of the photo-acid generator usable in the present invention may include compounds applied to chemically amplified-type photoresists or photo-cationic polymerization which have an absorption band in a wavelength range of 200 to 430 nm (refer to "Imaging Organic Materials" edited by Society of Organic Electronics Materials, Bunshin Press (1993), pp. 187 to 192), onium cationic compounds, halogen-containing compounds capable of generating a halogen acid, and sulfonated compounds capable of generating sulfonic acid.

Examples of the onium salts may include $BF_4^-$ salts, $PF_6^-$ salts, $AsF_6^-$ salts; $SbF_6^-$ salts, $CH_3SO_3^-$ salts, $CF_3SO_3^-$ salts, perfluorobutanesulfonates, benzenesulfonates, p-toluenesulfonates or $(C_6F_5)_4B^-$ salts of p-phenylthiophenyl-diphenylsulfonium, phenacyltetramethylenesulfonium, phenacyldimethylsulfonium, (2-naphthylcarbonylmethyl)tetramethylenesulfonium, phenyl(4-methoxyphenyl)iodonium, phenyl{4-(tert-butyl)phenyl}iodonium, (4-bis{4-(tert-butyl)phenyl}iodonium, bis(4-dodecylphenyl)iodonium, etc.

Examples of the halogen-containing compounds capable of generating a halogen acid may include 1-(3,4-dimethoxyphenyl)-3,5-bis(trichloromethyl)-s-triazine, 1-(4-methoxynaphthyl-1)-3,5-bis(trichloromethyl)-s-triazine, 1-{2-(4-methoxyphenyl)ethenyl}-3,5-bis(trichloromethyl)-s-triazine, 1-{2-(2-methoxyphenyl)ethenyl}-3,5-bis(trichloromethyl)-s-triazine, 1-{2-(3,4-dimethoxyphenyl)ethenyl}-3,5-bis(trichloromethyl)-s-triazine, 1-{2-(3-chloro-4-methoxyphenyl)ethenyl}-3,5-bis(trichloromethyl)-s-triazine, 1-(biphenyl-1)-3,5-bis(trichloromethyl)-s-triazine, 1-(4-hydroxybiphenyl-1)-3,5-bis(trichloromethyl)-s-triazine, 1-(4-methoxybiphenyl-1)-3,5-bis(trichloromethyl)-s-triazine or the like.

Examples of the acid generator capable of generating a sulfonic acid may include N-trifluoromethanesulfonyloxy-diphenylmaleimide, N-p-toluenesulfonyloxysuccinimide, N-camphor-sulfonyloxysuccinimide, N-trifluoromethane-sulfonyloxysuccinimide, N-perfluorobutanesulfonyloxyph-thalimide, N-p-toluenesulfonyloxy-1,8-naphthalenecarbox-imide, N-camphor-sulfonyloxy-1,8-naphthalenecarboximide, N-trifluoromethanesulfonyloxy-1,8-naphthalenecarboximide, N-perfluorobutanesulfonyloxy-1,8-naphthalenecarboximide or the like.

These photo-acid generators may be used singly or under the co-existence of the following sensitizing agents. Examples of the sensitizing agents may include 9-methyl anthracene, 9,10-dimethyl anthracene, 9,10-diphenyl anthracene, 9,10-dimethoxyanthracene, 9,10-diethoxyanthracene, 9,10-dipropoxyanthracene, 9,10-dibutoxyanthracene, 1-methylpyrene, thioxanthone derivatives or the like.

The amount of the photo-acid generator used is 0.1 to 30 parts by weight based on 100 parts by weight of the transparent resin.

The transparent coloring composition according to the fourth and fifth aspects of the present invention has a viscosity of usually 0.5 to 1,000 mPa·s. When the viscosity of the transparent coloring composition is more than 1,000 mPa·s, it may difficult to obtain a uniform coating film. When the viscosity of the transparent coloring composition is less than 0.5 mPa·s, the thickness of the obtained coating film tends to be too thin.

The dispersion average particle diameter ($Dd_{50}$) of the organic-inorganic composite pigment in the transparent coloring composition according to the fourth and fifth aspects of the present invention is usually not more than 300 nm, preferably not more than 250 nm, more preferably not more than 200 nm. The dispersion particle diameter ($Dd_{84}$) of the organic-inorganic composite pigment in the transparent coloring composition is usually not more than 600 nm, preferably not more than 550 nm, more preferably not more than 500 nm. The dispersion maximum particle diameter ($Dd_{99}$) of the organic-inorganic composite pigment in the transparent coloring composition is usually not more than 1,000 nm, preferably not more than 900 nm, more preferably not more than 800 nm. The geometrical standard deviation ($Dd_{84}/Dd_{50}$) of the dispersion particle diameter ($Dd_{84}$) to the dispersion average particle diameter ($Dd_{50}$) is usually not more than 3.00, preferably not more than 2.75, more preferably not more than 2.50.

The specific absorptivity values (based on weight) of the transparent coloring composition according to the fourth and fifth aspects of the present invention are as follows. The transparent coloring composition using the green-based organic-inorganic composite pigment exhibits a specific absorptivity (based on weight) at a wavelength of 650 nm of usually 1.05 to 5.00, preferably 1.10 to 5.00, more preferably 1.20 to 5.00. The transparent coloring composition using the blue-based organic-inorganic composite pigment exhibits a specific absorptivity (based on weight) at a wavelength of 610 nm of usually 1.05 to 5.00, preferably 1.10 to 5.00, more preferably 1.20 to 5.00. The transparent coloring composition using the red-based organic-inorganic composite pigment exhibits a specific absorptivity (based on weight) at a wavelength of 550 nm of usually 1.05 to 5.00, preferably 1.10 to 5.00, more preferably 1.20 to 5.00. The transparent coloring composition using the yellow-based organic-inorganic composite pigment exhibits a specific absorptivity (based on weight) at a wavelength of 400 nm of usually 1.05 to 5.00, preferably 1.10 to 5.00, more preferably 1.20 to 5.00.

Further, a colored transparent film obtained from the transparent coloring composition according to the fourth and fifth aspects of the present invention has a surface roughness Ra of usually not more than 20.0 nm, preferably not more than 15.0, more preferably not more than 10.0 nm; and a photofatigue resistance $\Delta E^*$ value of usually not more than 5.00, preferably not more than 4.50.

The transmittance values of the colored transparent film obtained from the transparent coloring composition according to the fourth and fifth aspects of the present invention are as follows. Namely, the colored transparent film using the green-based organic-inorganic composite pigment exhibits a 530 nm transmittance of usually not less than 75%, preferably not less than 80%, more preferably not less than 85%, still more preferably not less than 90%; and a 650 nm transmittance of usually not more than 5%, preferably not more than 3%.

The colored transparent film using the blue-based organic-inorganic composite pigment exhibits a 460 nm transmittance of usually not less than 75%, preferably not less than 80%, more preferably not less than 85%, still more preferably not less than 90%; and a 610 nm transmittance of usually not more than 5%, preferably not more than 3%.

The colored transparent film using the red-based organic-inorganic composite pigment exhibits a 620 nm transmittance of usually not less than 75%, preferably not less than 80%, more preferably not less than 85%, still more preferably not less than 90%; and a 550 nm transmittance of usually not more than 5%, preferably not more than 3%.

The colored transparent film using the yellow-based organic-inorganic composite pigment exhibits a 550 nm transmittance of usually not less than 75%, preferably not less than 80%, more preferably not less than 85%, still more preferably not less than 90%; and a 400 nm transmittance of usually not more than 5%, preferably not more than 3%.

The color filter of the present invention has a light transmittance in each color transmission range of usually not less than 75%, preferably not less than 80%, more preferably not less than 85%; and a contrast of usually not less than 800, preferably not less than 1,000, more preferably not less than 1,200.

Next, the process for producing the transparent coloring composition is explained.

First, the process for producing the organic-inorganic composite pigment composed of the fine while inorganic particles and the organic pigment is explained below.

In the process for producing the organic-inorganic composite pigment according to the present invention, (1) the fine while inorganic particles are mixed with the organic pigment, or (2) the fine while inorganic particles and the surface modifier are mixed with each other to coat the surface of the respective fine while inorganic particles with the surface modifier and the surface modifier-coated fine while inorganic particles are mixed with the organic pigment, and then, the resultant particles are pulverized and classified.

If required, the surface of the fine while inorganic particles may be previously coated with at least one intermediate coating material selected from the group consisting of hydroxides of aluminum, oxides of aluminum, hydroxides of silicon and oxides of silicon. The coating with the intermediate coating material is conducted as follows. That is, an aluminum compound and/or a silicon compound are added to a water suspension prepared by dispersing the fine while inorganic particles in water. The resultant dispersion is mixed and stirred together and then, if required, the pH value thereof is adjusted adequately, thereby coating at least one intermediate coating material selected from the group consisting of hydroxides of aluminum, oxides of aluminum, hydroxides of silicon, and oxides of silicon, on the surface of the respective fine while inorganic particles. Thereafter, the thus-obtained fine while inorganic particles coated with the intermediate coating material are filtered out, washed with water, dried and then pulverized, and may be further subjected to subsequent treatments such as deaeration and compaction, if required.

Examples of the aluminum compound may include aluminum salts such as aluminum acetate, aluminum sulfate, aluminum chloride and aluminum nitrate, alkali aluminates such as sodium aluminate, or the like. Examples of the silicon compound may include water glass #3, sodium orthosilicate, sodium metasilicate or the like.

In order to promote the adhesion of the organic pigment, the fine while inorganic particles may be mechanically mixed and stirred with the surface modifier or a solution containing the surface modifier, or the fine while inorganic particles may be mechanically mixed and stirred while spraying the surface modifier or a solution containing the surface modifier to the fine while inorganic particles. The mixing and stirring may be preferably carried out using an apparatus capable of applying a shear force to the particles, especially such an apparatus capable of simultaneously effecting shear action, spatula stroking and compression. Examples of the apparatus may include wheel-type kneaders, ball-type kneaders, blade-type kneaders, roll-type kneaders or the like. Among these apparatuses, the wheel-type kneaders are preferred to effectively practice the present invention.

Specific examples of the wheel-type kneaders may include edge runners (similar in meaning to mix muller, Simpson mill and sand mill), multimill, Stotz mill, wet pan mill, corner mill, ring muller or the like. Among these wheel-type kneaders, the preferred kneaders are edge runners, multimill, Stotz mill, wet pan mill and ring muller, and the more preferred kneaders are edge runners. Specific examples of the ball-type kneaders may include vibration mill or the like. Specific examples of the blade-type kneaders may include Henschel mixer, planetary mixer, Nauter mixer or the like. Specific examples of the roll-type kneaders may include extruders or the like.

The conditions of the mixing and stirring treatment of the fine white inorganic particles with the surface modifier may be selected so as to uniformly coat the surface of the fine white inorganic particles with the surface modifier. Specifically, the mixing and stirring conditions may be appropriately controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

After the surface of the fine white inorganic particles is coated with the surface modifier, the organic pigment is added, and then mixed and stirred with the surface modifier-coated fine white inorganic particles to adhere the organic pigment onto the surface modifier coating layer. The obtained particles may be further subjected to drying and heating treatments, if required. The organic pigment may be added slowly and little by little especially for a period of 5 minutes to 24 hours, preferably 5 minutes to 20 hours. Alternatively, usually 5 to 25 parts by weight of the organic pigment may be dividedly added to 100 parts by weight of the fine white inorganic particles until the amount of the organic pigment added reaches the desired amount.

The mixing and stirring conditions upon adhesion of the organic pigment may be appropriately selected so as to form a uniform organic pigment coat on the surface modifier coating layer, and may be controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

As the apparatus for pulverizing the thus obtained organic-inorganic composite particles, there may be preferably used fine pulverizers or ultrafine pulverizers. Examples of the suitable pulverizers may include roller mills, impact pulverizers, ball mills, stirring mills, jet pulverizers or the like. Among these pulverizers, jet pulverizers and impact pulverizers can be used more effectively.

Examples of the jet pulverizers may include turning flow-type jet mills, fluidized bed-type jet mills or the like. Among these jet pulverizers, preferred are the fluidized bed-type jet mills. Examples of the impact pulverizers may include hammer mills, pin mills, screen mills, turbo-type mills, centrifugal classification-type mills or the like. Among these impact pulverizers, preferred are the pin mills. Examples of the roller mills may include ring roller mills, centrifugal roller mills or the like. Examples of the ball mills may include rolling ball mills, vibration ball mills, planetary mills or the like. Examples of the stirring mills may include agitation tank-type mills, flowing tube-type mills, annular mills or the like.

As the apparatus for classifying the pulverized organic-inorganic composite particles, there may be suitably used dry-type classifiers such as, especially, gravity classifiers, inertia classifiers and centrifugal classifiers. Among these classifiers, the centrifugal classifiers can be used more effectively.

Specific examples of the centrifugal classifiers may include cyclone, classiclone, Startevant-type classifier, micron separator, turboplex, turbo classifier, super separator, dispersion separator or the like. Among these centrifugal classifiers, preferred are turboplex and micron separator. Examples of the gravity classifiers may include horizontal flow-type classifiers, vertical flow-type classifiers, slant flow-type classifiers or the like. Examples of the inertia classifiers may include linear-type classifiers, curve-type classifiers, slant-type classifiers or the like.

The conditions of the pulverization and classification may be appropriately selected so as to obtain the particles having the volume-average particle diameter and volume maximum particle diameter as aimed by the present invention.

The heating temperature used in the drying or heating treatment is usually 40 to 150° C., preferably 60 to 120° C., and the heating time is usually 10 minutes to 12 hours, preferably 30 minutes to 3 hours.

In order to produce the transparent coloring composition according to the first and second aspects of the present invention, the organic-inorganic composite pigment and the dispersant are mixed and dispersed in a solvent. The mixing and dispersing treatment may be conducted using a milling apparatus such as ball mills, beads mills, sand mills, edge runners, twin or triple roll mills, extruders, high-speed impact mills, etc. The milling medium usable in the milling apparatus may be selected from steel beads, glass beads, ceramic beads, etc., according to material of the mill used, and has a size of usually 0.01 to 10 mm, preferably 0.03 to 3 mm. The milling temperature is not particularly restricted, and may be appropriately selected from the range of from room temperature to a boiling point of the solvent.

In order to produce the transparent coloring composition according to the third aspect of the present invention, the transparent resin containing an acid group or a latent acid group is dissolved in the transparent coloring composition according to the first or second aspect of the present invention. Alternatively, the organic-inorganic composite pigment is mixed and dispersed in a solution previously prepared by dissolving the transparent resin containing an acid group or a latent acid group in a solvent.

In order to produce the photosensitive transparent coloring composition according to the fourth aspect of the present invention, the photopolymeization initiator and the polyfunctional monomer having two or more ethylenically unsaturated double bonds are added and mixed in the coloring composition containing the transparent resin containing an acid group according to the third aspect of the present invention. In this case, a solvent may be added to the composition, if required, to suitably adjust the pigment concentration, viscosity, etc. Further, if required, a polymerization inhibitor, a curing accelerator such as 2-mercaptobenzoimidazole, etc., may be added to the composition.

In order to produce the photosensitive transparent coloring composition according to the fifth aspect of the present invention, a photo-acid generator is added and mixed in the coloring composition containing the transparent resin containing an acid group according to the third aspect of the present invention.

Next, the process for producing the color filter using the transparent coloring composition according to the present invention is explained.

The transparent coloring composition of the present invention is applied onto a transparent substrate on which black matrix patterns are formed, and then pre-baked to fully evaporate and remove the solvent therefrom, thereby obtaining a colored coating film. In the case of the non-photosensitive colored coating film, an alkali-developable positive photoresist layer is formed on the film, thereby obtaining a coating film with a two-layer structure. As the alkali-developable positive photoresist, there may be suitably used quinonediazide-based photoresist. The thus obtained colored coating film is irradiated with light through a photo mask, and then developed with an aqueous alkali solution. Since the light-exposed portion of the positive photoresist-coated film becomes alkali-soluble, the underlying colored layer exposed by the alkali development is also etched by the alkali solution, thereby obtaining a colored positive image. Then, the photoresist layer is selectively removed by a solvent to obtain a colored pattern. On the other hand, in the case of the photosensitive transparent coloring composition to which the photopolymerization initiator and the polyfunctional monomer are added, the prepared coating film is directly usable as a colored photosensitive layer. The coating film may be similarly exposed to light through a photo mask, and then alkali-developed to insolubilize the exposed portion, thereby obtaining a negative colored pattern. As the developing method, there may be used dipping method, spraying method, paddle method, shower method, etc. After the alkali development, the resultant film is washed with water and then dried.

As the transparent substrate for the color filter, there may be used such substrates made of silica glass as well as polycarbonates, polyesters, polyamides, polyimides, polyamide imides, etc. Also, in order to produce a solid image pickup device, there may be used a silicon substrate. The transparent coloring composition may be applied onto the transparent substrate by an appropriate method such as rotary coating, cast coating, roll coating and screen printing. The thickness of the coating film depends upon concentration of the organic-inorganic composite pigment, and is usually 0.1 to 10 µm, preferably 0.2 to 5.0 µm.

As the alkali developing solution, there may be used aqueous solutions of sodium carbonate, potassium carbonate, sodium hydroxide, potassium hydroxide, tetramethylammoniumhydroxide or the like. The aqueous alkali solution may also contain methanol, ethanol, isopropanol, surfactants, etc.

The transparent coloring composition of the present invention has the following advantages that are unobtainable in case of using ordinary organic pigments as a coloring material. First, the particle shape, particle diameter and particle size distribution of the organic-inorganic composite pigment according to the present invention are substantially similar to those of the fine white inorganic particles as core particles. The reason therefor is considered to be that the organic pigment is uniformly adhered onto the surface of the respective core particles or surface-treated core particles to form a core/shell structure. For this reason, by appropriately selecting the core particles, it is possible to obtain fine pigment particles having a uniform shape, a very small particle diameter and a narrow particle size distribution. On the other hand, the conventional organic pigments for color filters have been prepared by mechanical pulverization or milling and, therefore, tend to exhibit an uniform shape, so that it may be difficult to obtain particles having a narrow particle size distribution. As a result, in the color filter of the present invention, it is possible to extremely minimize reflection and scattering of incident light, and at the same time, the size of ultrafine colored patterns of submicron order which are formed by photolithography is not limited by the particle diameter of the pigment used.

Secondary, the absorption coefficient of the organic pigment component contained in the organic-inorganic composite pigment of the present invention is increased as compared to the case where the organic pigment is used solely. In particular, when the volume-average particle diameter (behavior particle diameter) of the composite pigment becomes smaller, a hyper-chromic (color-concentrating) effect thereof is more remarkably exhibited. The hyper-chromic phenomenon has been first found by forming the organic pigment and inorganic pigment into composite particles. The reason therefor is considered to be that since the organic-inorganic composite pigment particles of the present invention have a core/shell structure, the incident light undergoes multiple reflection on the boundary between the organic and inorganic substances so that the absorption coefficient thereof is apparently increased. Therefore, the organic-inorganic composite pigment contained in the colored layer can exhibit an increased color concentration even though the organic pigment is used therein in the same amount as in the conventional case where the organic pigment is used solely. As a result, it becomes possible to produce a color filter having an excellent color reproducibility.

The color filter obtained from the coloring composition of the present invention has the above-mentioned advantages, and, therefore, can be extremely usefully applied to color liquid crystal displays, color image pickup devices, color sensors, etc.

The organic-inorganic composite pigment contained in the transparent coloring composition exhibits a fine particle diameter and a narrow particle size distribution as well as excellent spectral properties due to high hyper-chromic effect as compared to the case where the organic pigment is used solely. Also, the transparent coloring composition containing the organic-inorganic composite material is excellent in dispersibility and spectral properties and, therefore, suitably used for production of color filters. Further, the color filter produced from the transparent coloring composition has excellent spectral properties and, therefore, can be suitably applied to color liquid crystal displays (LCD), etc.

EXAMPLES

The present invention is described in more detail by Examples and Comparative Examples, but the Examples are only illustrative and, therefore, not intended to limit the scope of the present invention.

Various properties were evaluated by the following methods.

(1) The average particle diameter of primary particles of the respective particles was expressed by an average value of particle diameters of 350 particles observed on a micrograph.

(2) The particle size distribution of the primary particles was expressed by the geometrical standard deviation value obtained by the following method. That is, the particle sizes were measured from the above magnified micrograph. The actual particle sizes and the number of the particles were obtained from the calculation on the basis of the measured values. On a logarithmic normal probability paper, the particle sizes were plotted at regular intervals on the abscissa-axis and the accumulative number of particles (under integration sieve) belonging to each interval of the particle sizes were plotted by percentage on the ordinate-axis by a statistical technique. The particle sizes corresponding to the number of particles of 50% and 84.13%, respectively, were read from the graph, and the geometrical standard deviation was obtained from the following formula:

Geometrical standard deviation={particle size corresponding to 84.13% under integration sieve}/ {particle size (geometrical average diameter) corresponding to 50% under integration sieve}.

The more the geometrical standard deviation is close to 1, the more excellent the particle size distribution of the primary particles.

(3) The specific surface area was expressed by the value measured by a BET method.

(4) The amounts of Al and Si which were present on the surface of the fine white inorganic particle coated with the intermediate coating material, were respectively measured by a fluorescent X-ray spectroscopy device "3063 M-type" (manufactured by RIGAKU DENKI KOGYO CO., LTD.) according to JIS K0119 "General rule of fluorescent X-ray analysis".

(5) The volume average particle diameter ($Dp_{50}$) and the volume maximum particle diameter ($Dp_{99}$) representing the conditions of behavior particles of the fine white inorganic particles and organic-inorganic composite pigment were measured as follows. That is, the sample particles were previously passed through a 60 mesh sieve (opening size: 250 μm), and then dried at 80° C. for 3 hours using a drier. Thereafter, the respective parameters ($Dp_{50}$) and ($Dp_{99}$) of the sample particles were measured under a dispersion pressure of 0.1 MPa (1 bar) using a dry dispersion unit including a laser diffraction-type particle size distribution measuring device "Model HELOS LA/KA" (manufactured by Sympatec Co., Ltd.). Meanwhile, the behavior particles mean secondary particles formed by agglomeration of the primary particles.

(6) The amount of the surface modifier coating layer formed on the surface of the fine white inorganic particle, and the amount of the adhered organic pigment contained in the organic-inorganic composite pigment, were respectively determined by measuring the carbon contents using "Horiba Metal, Carbon and Sulfur Analyzer EMIA-2200 Model" (manufactured by Horiba Seisakusho Co., Ltd.).

(7) The degree of desorption of the organic pigment from the organic-inorganic composite pigment was visually observed and evaluated by the following method, and the observation results were classified into the following five ranks. The Rank 5 represents that the amount of the organic pigment desorbed from the surface of the organic-inorganic composite pigment was smallest.

That is, 2 g of the particles to be measured and 20 ml of ethanol were placed in a 50-ml conical flask and then subjected to ultrasonic dispersion for 60 minutes. Thereafter, the obtained dispersion was centrifuged at a rotating speed of 10,000 rpm for 15 minutes to separate the particles from the solvent. The obtained particles were dried at 80° C. for one hour, and the micrograph (×50,000) thereof was visually observed to count the number of the desorbed and re-aggregated organic pigment particles present in a visual field of the micrograph. The micrograph was compared with a micrograph (×50,000) of a physical mixture obtained by simply mixing the fine white inorganic particles with the organic pigment. The results are classified into the following five ranks.

Rank 1: Number of desorbed and re-aggregated particles was substantially the same as that in the physical mixture;

Rank 2: 30 to 49 desorbed and re-aggregated particles per 100 particles of the organic and inorganic composite pigment;

Rank 3: 10 to 29 desorbed and re-aggregated particles per 100 particles of the organic and inorganic composite pigment;

Rank 4: 5 to 9 desorbed and re-aggregated particles per 100 particles of the organic and inorganic composite pigment; and Rank 5: 0 to 4 desorbed and re-aggregated particles per 100 particles of the organic and inorganic composite pigment.

(8) The hues of the fine white inorganic particles, organic pigment, and organic-inorganic composite pigment, were measured by the following method.

That is, 0.5 g of each sample and 0.5 ml of castor oil were intimately kneaded together by a Hoover's muller to form a paste. 4.5 g of clear lacquer was added to the obtained paste and was intimately kneaded to form a paint. The obtained paint was applied onto a clear base film by using a 150 μm (6 mil) applicator to produce a coating film piece (having a coating film thickness of about 30 μm). The thus obtained coating film piece was placed on a standard white back plate and measured by a spectrophotometric calorimeter "CM-3610d" (manufactured by MINOLTA CO., LTD.) to determine color specification values thereof according to JIS Z 8929. Meanwhile, the C* value representing chroma is calculated according to the following formula:

$$C^* = ((a^*)^2 + (b^*)^2)^{1/2}$$

(9) The tinting strength of the organic-inorganic composite pigment was measured by the following method.

That is, a primary color enamel and a vehicle enamel prepared by the below-mentioned methods were respectively applied on a clear base film by using a 150 μm (6 mil) applicator to produce coating film pieces. The thus obtained coating film pieces were placed on a standard white back plate, and the L* values thereof were measured by a spectrophotometric calorimeter "CM-3610d" (manufactured by MINOLTA CO., LTD.). The difference between the obtained L* values was represented by a ΔL* value.

Next, a control sample for the organic-inorganic composite pigment was prepared by simply mixing the organic pigment with the fine white inorganic particles at the same mixing ratio as used upon the production of the organic-inorganic composite pigment. Using the thus prepared mixed particles as a control sample, the same procedure as defined above was conducted to prepare an primary color enamel and a vehicle enamel, form respective coating film pieces and then measure L* values thereof. The difference between the L* values was represented by a ΔLs* value.

From the obtained ΔL* value of the organic-inorganic composite pigment and ΔLs* value of the control sample, the tinting strength (%) was calculated according to the following formula:

$$\text{Tinting strength (\%)} = 100 + \{(\Delta Ls^* - \Delta L^*) \times 10\}$$

Preparation of Primary Color Enamel:

10 g of the above sample particles, 16 g of an amino alkyd resin and 6 g of a thinner were blended with each other. The resultant mixture was added together with 90 g of 3 mmϕ glass beads into a 140-ml glass bottle, and then mixed and dispersed for 45 minutes by a paint shaker. The obtained mixture was mixed with 50 g of an additional amino alkyd resin, and further dispersed for 5 minutes by a paint shaker, thereby obtaining a primary color enamel.

Preparation of Vehicle Enamel:

12 g of the above-prepared primary color enamel and 40 g of Amirac White (titanium dioxide-dispersed amino alkyd resin) were blended with each other, and the resultant mixture was mixed and dispersed for 15 minutes by a paint shaker, thereby preparing a vehicle enamel.

(10) The photofatigue resistances of the fine white inorganic particles, organic pigment, and organic-inorganic composite pigment were measured by the following method.

That is, the primary color enamel prepared above for measuring the tinting strength was applied onto a glass plate (0.8 mm×70 mm×150 mm) and dried to form a coating film having a thickness of 150 μm. One half of the thus prepared coating film piece was covered with a metal foil, and an ultraviolet light was continuously irradiated over the coating film piece at an intensity of 100 mW/cm² for 6 hours using "EYE SUPER UV TESTER SUV-W13" (manufactured by IWASAKI DENKI CO., LTD.). Then, the hue values (L*, a* and b* values) of the metal foil-covered UV-unirradiated portion and the UV-irradiated portion of the coating film piece were respectively measured. On the basis of the measured value of the UV-unirradiated portion as a standard value, the ΔE* value was calculated from differences between the measured hue values of the metal foil-covered UV-unirradiated portion and the UV-irradiated portion according to the following formula:

$$\Delta E^* = [(\Delta L^*)^2 + (\Delta a^*)^2 + (\Delta b^*)^2]^{1/2}$$

wherein ΔL* represents the difference between L* values of the UV-unirradiated and UV-irradiated portions; Δa* represents the difference between a* values of the UV-unirradiated and UV-irradiated portions; and Δb* represents the difference between b* values of the UV-unirradiated and UV-irradiated portions.

(11) The viscosity of the transparent coloring composition was expressed by the value obtained by measuring the viscosity of the resultant composition at 25° C. and a shear rate (D) of 1.92 sec⁻¹ using "E-type Viscometer EMD-R" (manufactured by Tokyo Keiki Co., Ltd.).

(12) The dispersion average particle diameter ($Dd_{50}$), the dispersion particle diameter ($Dd_{84}$) and the dispersion maximum particle diameter ($Dd_{99}$) of the organic-inorganic composite pigment contained in the transparent coloring composition were measured by a dynamic light scattering method using a concentrated particle size analyzer "FPAR-1000" (manufactured by Otsuka Denshi Co., Ltd.). Meanwhile, the geometrical standard deviation ($Dd_{84}/Dd_{50}$) was expressed by the value calculated according to the following formula:

Geometrical standard deviation ($Dd_{84}/Dd_{50}$)={particle size ($Dd_{84}$) corresponding to 84.13% under integration sieve}/{particle size ($Dd_{50}$) corresponding to 50% under integration sieve}

The more the geometrical standard deviation value ($Dd_{84}/Dd_{50}$) is close to 1, the more excellent the particle size distribution of the behavior particles in the transparent coloring composition.

(13) The specific absorptivity values of the respective transparent coloring compositions were measured as follows. That is, the respective transparent coloring compositions were diluted 1,000 times with propylene glycol monomethyl ether acetate (PGMA). Using the thus prepared diluted solutions, the absorptivity coefficient at a wavelength of 550 nm in the case of the red-based coloring composition, the absorptivity coefficient at a wavelength of 650 nm in the case of the green-based coloring composition, the absorptivity coefficient at a wavelength of 650 nm in the case of the blue-based coloring composition and the absorptivity coefficient at a wavelength of 400 nm in the case of the yellow-based coloring composition were respectively measured using a self-recording photoelectric spectrophotometer "UV-2100" (manufactured by SHIMADZU SEISAKUSHO CO., LTD.). The specific absorptivity of the respective transparent coloring compositions was expressed by the value calculated according to the following formula:

$$\epsilon_w = \epsilon_h / \epsilon_0$$

wherein $\epsilon_w$ represents a specific absorptivity; $\epsilon_h$ represents an absorptivity coefficient per unit weight of the organic pigment contained in each organic-inorganic composite pigment; and $\epsilon_0$ represents an absorptivity coefficient per unit weight of the organic pigment used as a raw material of each organic-inorganic composite pigment.

The larger the specific absorptivity value, the higher the tinting effect of the organic pigment coated on the fine white inorganic particles.

(14) The light transmittances of the transparent coloring compositions according to the first and second aspects of the present invention were measured as follows. That is, the respective transparent coloring compositions were diluted such that a concentration of the organic pigment contained therein was 0.0078% by weight, and then filled in a quartz cell. Using the thus prepared diluted solutions each filled in the quartz cell, the light transmittances at wavelengths of 620 nm and 550 nm in the case of the red-based transparent coloring composition, the light transmittances at wavelengths of 530 nm and 650 nm in the case of the green-based transparent coloring composition, the light transmittances at wavelengths of 460 nm and 610 nm in the case of the blue-based transparent coloring composition, and the light transmittances at wavelengths of 550 nm and 460 nm in the case of the yellow-based transparent coloring composition, were respectively measured using a self-recording photoelectric spectrophotometer "UV-2100" (manufactured by SHIMADZU SEISAKUSHO CO., LTD.).

(15) The surface roughness Ra of the colored transparent film obtained from the respective transparent coloring compositions was determined by measuring a center line average roughness of the colored transparent film using a surface roughness tester "Surfcom-575A" (manufactured by Tokyo Seimitsu Co., Ltd.).

(16) The chromaticity of the colored transparent film obtained from the respective transparent coloring compositions was measured as follows. That is, the respective transparent coloring compositions prepared by the below-mentioned methods were applied onto a clear base film to form a coating film having a thickness of 150 μm, and then dried to obtain a coating film piece having a colored transparent film. The chromaticity of the thus obtained coating film piece was measured using a spectrophotometric colorimeter "CM-3610d" (manufactured by MINOLTA CO., LTD.), and expressed according to XY chromaticity diagram prescribed by CIE (Commission Internationale de l'Eclairage).

(17) The photofatigue resistance of the colored transparent film obtained from the respective transparent coloring compositions was measured by the following method.

That is, the respective transparent coloring compositions were applied onto a glass plate (0.8 mm×70 mm×150 mm) to form a coating film having a thickness of 150 μm and then dried, thereby obtaining a coating film piece. A part of the thus prepared coating film piece was covered with a metal foil, and an ultraviolet light was continuously irradiated over the coating film piece at an intensity of 100 mW/cm² for 6 hours using "EYE SUPER UV TESTER SUV-W13" (manufactured by IWASAKI DENKI CO., LTD.). Then, the hue values (L*, a* and b* values) of the metal foil-covered UV-unirradiated portion and the UV-irradiated portion of the coating film piece were respectively measured using a spectrophotometric colorimeter "CM-3610d" (manufactured by MINOLTA CO., LTD.). On the basis of the measured value of the UV-unirradiated portion as a standard value, the ΔE* value was calculated from differences between the measured hue values of the metal foil-covered UV-unirradiated portion and the UV-irradiated portion according to the formula described in the above (10).

(18) The light transmittance of the colored transparent film obtained from the respective transparent coloring compositions was measured as follows. That is, using the coating film piece prepared above for measuring the chromaticity, the light transmittances at wavelengths of 620 nm and 480 nm in the case of the red-based colored transparent film, the light transmittances at wavelengths of 530 nm and 650 nm in the case of the green-based colored transparent film, and the light transmittances at wavelengths of 460 nm and 630 nm in the case of the blue-based colored film, were respectively measured using a self-recording photoelectric spectrophotometer "UV-2100" (manufactured by SHIMADZU SEISAKUSHO CO., LTD.).

(19) The light transmittance of the color filter was determined using a color filter prepared by the below-mentioned method. Specifically, the light transmittances at wavelengths of 620 nm, 530 nm and 460 nm, were respectively measured using a self-recording photoelectric spectrophotometer "UV-2100" (manufactured by SHIMADZU SEISAKUSHO CO., LTD.).

(20) The contrast of the color filter was measured as follows. That is, the color filter prepared by the below-mentioned method was interposed between two polarizing plates on a back light, and the brightness (A) when arranging the two polarizing plates in parallel with each other and the brightness (B) when arranging the two polarizing plates perpendicularly to each other were respectively measured. The contrast was expressed by a ratio of (A) to (B) ((A)/(B)).

Example 1

<Production of Organic-inorganic Composite Pigment (G)>

560 g of methylhydrogenpolysiloxane (tradename: "TSF484", produced by GE TOSHIBA SILICONE CO., LTD.) was added to 7.0 kg of silica particles (particle shape: spherical shape; average particle diameter of primary particles: 17 nm; BET specific surface area value: 211.3 m²/g; geometrical standard deviation value of primary particles: 1.27; volume average particle diameter ($Dp_{50}$): 1.66 μm; volume maximum particle diameter ($Dp_{99}$): 2.61 μm; refractive index: 1.42; L* value: 93.39; a* value: 0.12; b* value: 0.26; C* value: 0.28; photofatigue resistance: 5.48) while operating an edge runner, and the resultant mixture was mixed and stirred for 30 minutes under a linear load of 588 N/cm (60 Kg/cm) at a stirring speed of 22 rpm.

Then, 7.0 kg of organic pigment G-1 (kind: phthalocyanine-based pigment; particle shape: granular shape; average particle diameter: 96 nm; BET specific surface area value: 66.4 m²/g; L* value: 31.77; a* value: −21.28; b* value: 3.06; photofatigue resistance (ΔE* value): 9.26) was added to the above-obtained mixture for 30 minutes while operating the edge runner, and the resultant mixture was mixed and stirred for 120 minutes under a linear load of 588 N/cm (60 Kg/cm) at a stirring speed of 22 rpm, thereby forming the organic pigment G-1 coat onto the methylhydrogenpolysiloxane coating layer formed on the respective silica particles. Then, the obtained particles were pulverized and classified using a fluidized bed-type jet mill and a centrifugal classifier, respectively, and then dried at 80° C. for 60 minutes using a dryer, thereby obtaining organic-inorganic composite pigment (G).

The thus obtained organic-inorganic composite pigment (G) was in the form of spherical particles having an average particle diameter of primary particles of 19 nm, and had a BET specific surface area value of 68.6 m$^2$/g, a geometrical standard deviation value of primary particles of 1.27, a volume average particle diameter ($Dp_{50}$) of 0.97 µm and a volume maximum particle diameter ($Dp_{99}$) of 1.43 µm. As to the hue of the organic-inorganic composite pigment (G), the L* value thereof was 38.69; the a* value thereof was −20.38; and the b* value thereof was 2.96. In addition, it was confirmed that the organic-inorganic composite pigment (G) had a tinting strength of 143%; a photofatigue resistance (ΔE* value) of 1.38; an organic pigment desorption degree of Rank 5; and a coating amount of methylhydrogenpolysiloxane of 2.05% by weight (calculated as C), and that the amount of the organic pigment G-1 adhered was 18.02% by weight (calculated as C; corresponding to 100 parts by weight based on 100 parts by weight of the silica particles). As a result of observing the micrograph of the obtained organic-inorganic composite pigment (G), since almost no organic pigment G-1 was recognized from the micrograph, it was confirmed that a substantially whole amount of the organic pigment G-1 added contributed to the formation of the organic pigment coat on the coating layer composed of methylhydrogenpolysiloxane.

Example 2

<Production of Organic-inorganic Composite Pigment (B)>

The same procedure for production of the organic-inorganic composite pigment (G) as defined in Example 1 was conducted except that organic pigment B-1 (kind: phthalocyanine-based pigment; particle shape: granular shape; average particle diameter: 83 nm; BET specific surface area value: 81.6 m$^2$/g; L* value: 24.41; a* value: 6.01; b* value: −12.63; photofatigue resistance (ΔE* value): 10.68) was used as organic pigment, thereby obtaining organic-inorganic composite pigment (B).

The thus obtained organic-inorganic composite pigment (B) was in the form of spherical particles having an average particle diameter of primary particles of 19 nm, and had a BET specific surface area value of 65.9 m$^2$/g, a geometrical standard deviation value of primary particles of 1.27, a volume average particle diameter ($Dp_{50}$) of 0.98 µm and a volume maximum particle diameter ($Dp_{99}$) of 1.39 µm. As to the hue of the organic-inorganic composite pigment (B), the L* value thereof was 26.19; the a* value thereof was 6.98; and the b* value thereof was −11.93. In addition, it was confirmed that the organic-inorganic composite pigment (B) had a tinting strength of 141%; a photofatigue resistance (ΔE* value) of 1.31; an organic pigment desorption degree of Rank 5; and a coating amount of methylhydrogenpolysiloxane of 2.06% by weight (calculated as C), and that the amount of the organic pigment B-1 adhered was 33.11% by weight (calculated as C; corresponding to 100 parts by weight based on 100 parts by weight of the silica particles). As a result of observing the micrograph of the obtained organic-inorganic composite pigment (B), since almost no organic pigment B-1 was recognized from the micrograph, it was confirmed that a substantially whole amount of the organic pigment B-1 added contributed to the formation of the organic pigment coat on the coating layer composed of methylhydrogenpolysiloxane.

Example 3

<Production of Organic-inorganic Composite Pigment (R)>

The same procedure for production of the organic-inorganic composite pigment (G) as defined in Example 1 was conducted except that organic pigment R-1 (kind: diketopyrrolopyrrole-based pigment; particle shape: granular shape; average particle diameter: 130 nm; BET specific surface area value: 81.6 m$^2$/g; L* value: 37.95; a* value: 43.24; b* value: 23.28; photofatigue resistance (ΔE* value): 10.13) was used as organic pigment, thereby obtaining organic-inorganic composite pigment (R).

The thus obtained organic-inorganic composite pigment (R) was in the form of spherical particles having an average particle diameter of primary particles of 19 nm, and had a BET specific surface area value of 63.8 m$^2$/g, a geometrical standard deviation value of primary particles of 1.27, a volume average particle diameter ($Dp_{50}$) of 0.96 µm and a volume maximum particle diameter ($Dp_{99}$) of 1.36 µm. As to the hue of the organic-inorganic composite pigment (R), the L* value thereof was 39.83; the a* value thereof was 42.96; and the b* value thereof was 21.83. In addition, it was confirmed that the organic-inorganic composite pigment (R) had a tinting strength of 156%; a photofatigue resistance (ΔE* value) of 1.88; an organic pigment desorption degree of Rank 5; and a coating amount of methylhydrogenpolysiloxane of 2.08% by weight (calculated as C), and that the amount of the organic pigment R-1 adhered was 30.48% by weight (calculated as C; corresponding to 100 parts by weight based on 100 parts by weight of the silica particles). As a result of observing the micrograph of the obtained organic-inorganic composite pigment (R), since almost no organic pigment R-1 was recognized from the micrograph, it was confirmed that a substantially whole amount of the organic pigment R-1 added contributed to the formation of the organic pigment coat on the coating layer composed of methylhydrogenpolysiloxane.

Example 4

<Transparent Coloring Composition (I): Production of Transparent Coloring Composition (I-G)>

The organic-inorganic composite pigment (G) obtained in Example 1, propylene glycol monomethyl ether acetate (PGMA) and a dispersant (basic comb-shaped polymer) were kneaded together at the following mixing ratio using a triple roll mill.

| | |
|---|---|
| Organic-inorganic composite pigment (G) | 100.0 parts by weight |
| Cyclohexanone | 50.0 parts by weight |
| Dispersant (basic comb-shaped polymer; tradename: "Solsperse 24000" produced by Abicia Co., Ltd.) | 20.0 parts by weight |

The obtained kneaded material was mixed with 230.0 parts by weight of propylene glycol monomethyl ether acetate (PGMA), and the resultant mixture was dispersed using a beads mill, thereby obtaining a transparent coloring composition (I-G).

As a result, it was confirmed that the thus obtained transparent coloring composition (I-G) had a viscosity of 10.4 mPa·s, a dispersion average particle diameter ($Dd_{50}$) of 65 nm, a dispersion particle diameter ($Dd_{84}$) of 123 nm, a dispersion maximum particle diameter ($Dd_{99}$) of 186 nm, a geometrical standard deviation ($Dd_{84}/Dd_{50}$) (as a ratio of dispersion particle diameter ($Dd_{84}$) to dispersion average particle diameter ($Dd_{50}$)) of 1.89, a transmittance at wavelength of 530 nm of 81.6%, a transmittance at wavelength of 650 nm of less than 1%, and a specific absorptivity ($\epsilon_w$) at wavelength of 650 nm of 2.26.

Example 5

<Transparent Coloring Composition (I): Production of Transparent Coloring Composition (I-B)>

The same procedure for production of the transparent coloring composition (I-G) as defined in Example 4 was conducted except that the organic-inorganic composite pigment (B) obtained in Example 2 was used as coloring pigment, thereby producing a transparent coloring composition (I-B).

As a result, it was confirmed that the thus obtained transparent coloring composition (I-B) had a viscosity of 11.3 mPa·s, a dispersion average particle diameter ($Dd_{50}$) of 71 nm, a dispersion particle diameter ($Dd_{84}$) of 132 nm, a dispersion maximum particle diameter ($Dd_{99}$) of 186 nm, a geometrical standard deviation ($Dd_{84}/Dd_{50}$) of 1.86, a transmittance at wavelength of 460 nm of 78.6%, a transmittance at wavelength of 610 nm of less than 1%, and a specific absorptivity ($\epsilon_w$) at wavelength of 610 ram of 2.13.

Example 6

<Transparent Coloring Composition (I): Production of Transparent Coloring Composition (I-R)>

The same procedure for production of the transparent coloring composition (I-G) as defined in Example 4 was conducted except that the organic-inorganic composite pigment (R) obtained in Example 3 was used as coloring pigment, thereby producing a transparent coloring composition (I-R).

As a result, it was confirmed that the thus obtained transparent coloring composition (I-R) had a viscosity of 7.3 mPa·s, a dispersion average particle diameter ($Dd_{50}$) of 88 nm, a dispersion particle diameter ($Dd_{84}$) of 155 nm, a dispersion maximum particle diameter ($Dd_{99}$) of 198 nm, a geometrical standard deviation ($Dd_{84}/Dd_{50}$) of 1.76, a transmittance at wavelength of 620 nm of 76.9%, a transmittance at wavelength. of 550 nm of less than 1%, and a specific absorptivity (based on weight) ($\epsilon_w$) at wavelength of 550 nm of 2.11.

Example 7

<Transparent Coloring Composition (II): Production of Transparent Coloring Composition (II-G)>

The transparent coloring composition (I-G) obtained in Example 4 and a methyl methacrylate/methacrylic acid copolymer were dispersed together at the below-mentioned mixing ratio using a sand grinder. The resultant kneaded material was filtered through a 5 µm glass filter.

| | |
|---|---|
| Transparent coloring composition (I-G) | 400.0 parts by weight |
| Methyl methacrylate/methacrylic acid copolymer | 100.0 parts by weight |

As a result, it was confirmed that the thus obtained transparent coloring composition (II-G) had a viscosity of 17.3 mPa·s, a dispersion average particle diameter ($Dd_{50}$) of 63 nm, a dispersion particle diameter ($Dd_{84}$) of 111 nm, a dispersion maximum particle diameter ($Dd_{99}$) of 146 nm, a geometrical standard deviation ($Dd_{84}/Dd_{50}$) of 1.76, and a specific absorptivity ($\epsilon_w$) at wavelength of 650 nm of 2.29.

Then, the transparent coloring composition (II-G) was applied onto a clear base film to form a coating layer having a thickness of 150 µm (6 mil), and then dried, thereby obtaining a colored transparent film (II-G). As a result, it was confirmed that the thus obtained colored transparent film (II-G) had a surface roughness Ra of 5.8 nm, a chromaticity x value of 0.2743, a chromaticity y value of 0.3786, an Y value of 71.26, a photofatigue resistance $\Delta E^*$ value of 2.56, a transmittance at wavelength of 530 nm of 92.6%, and a transmittance at wavelength of 650 nm of less than 1%.

Example 8

<Transparent Coloring Composition (II): Production of Transparent Coloring Composition (II-B)>

The same procedure for production of the transparent coloring composition (II-G) as defined in Example 7 was conducted except that the transparent coloring composition (I-B) obtained in Example 5 was used as the raw transparent coloring composition, thereby obtaining a transparent coloring composition (II-B).

As a result, it was confirmed that the thus obtained transparent coloring composition (II-B) had a viscosity of 20.3 mPa·s, a dispersion average particle diameter ($Dd_{50}$) of 70 nm, a dispersion particle diameter ($Dd_{84}$) of 120 nm, a dispersion maximum particle diameter ($Dd_{99}$) of 153 nm, a geometrical standard deviation ($Dd_{84}/Dd_{50}$) of 1.71, and a specific absorptivity ($\epsilon_w$) at wavelength of 610 nm of 2.29.

Then, the transparent coloring composition (II-B) was applied onto a clear base film to form a coating layer having a thickness of 150 µm (6 mil) thereon, and then dried, thereby obtaining a colored transparent film (II-B). As a result, it was confirmed that the thus obtained colored transparent film (II-B) had a surface roughness Ra of 6.1 nm, a chromaticity x value of 0.1486, a chromaticity y value of 0.2163, an Y value of 29.41, a photofatigue resistance $\Delta E^*$ value of 2.78, a transmittance at wavelength of 460 nm of 93.0%, and a transmittance at wavelength of 610 nm of less than 1%.

Example 9

<Transparent Coloring Composition (II): Production of Transparent Coloring Composition (II-R)>

The same procedure for production of the transparent coloring composition (II-G) as defined in Example 7 was conducted except that the transparent coloring composition (I-R) obtained in Example 6 was used as the raw transparent coloring composition, thereby obtaining a transparent coloring composition (II-R).

As a result, it was confirmed that the thus obtained transparent coloring composition (II-R) had a viscosity of 22.3 mPa·s, a dispersion average particle diameter ($Dd_{50}$) of 58 nm, a dispersion particle diameter ($Dd_{84}$) of 100 nm, a dispersion maximum particle diameter ($Dd_{99}$) of 144 nm, a geometrical standard deviation ($Dd_{84}/Dd_{50}$) of 1.73, and a specific absorptivity ($\epsilon_w$) at wavelength of 550 nm of 2.25.

Then, the transparent coloring composition (II-R) was applied onto a clear base film to form a coating layer having a thickness of 150 μm (6 mil) thereon, and then dried, thereby obtaining a colored transparent film (II-R). As a result, it was confirmed that the thus obtained colored transparent film (II-R) had a surface roughness Ra of 6.3 nm, a chromaticity x value of 0.5673, a chromaticity y value of 0.3177, an Y value of 22.86, a photofatigue resistance ΔE* value of 3.65, a transmittance at wavelength of 620 rim of 94.0%, and a transmittance at wavelength of 550 nm of less than 1%.

Example 10

<Transparent Coloring Composition (III): Production of Transparent Coloring Composition (III-G)>

The transparent coloring composition (II-G) obtained in Example 7, dipentaerythritol pentaacrylate and a polymerization initiator: 2-(4-methoxy-β-styryl)-bis(4,6-(trichloromethyl)-s-triazine were dispersed together at the below-mentioned mixing ratio using a sand grinder. The resultant kneaded material was filtered through a 1 μm glass filter.

| | |
|---|---|
| Transparent coloring composition (II-G) | 480.0 parts by weight |
| Dipentaerythritol pentaacrylate | 100.0 parts by weight |
| 2-(4-methoxy-β-styryl)-bis(4,6-(trichloromethyl)-s-triazine | 5.0 parts by weight |

As a result, it was confirmed that the thus obtained transparent coloring composition (III-G) had a viscosity of 23.8 mPa·s, a dispersion average particle diameter ($Dd_{50}$) of 58 nm, a dispersion particle diameter ($Dd_{84}$) of 96 nm, a dispersion maximum particle diameter ($Dd_{99}$) of 141 nm, a geometrical standard deviation ($Dd_{84}/Dd_{50}$) of 1.66, and a specific absorptivity ($\epsilon_w$) at wavelength of 650 nm of 2.31.

Then, the transparent coloring composition (III-G) was applied onto a clear base film to form a coating layer having a thickness of 150 μm (6 mil), and then dried, thereby obtaining a colored transparent film (III-G). As a result, it was confirmed that the thus obtained colored transparent film (III-G) had a surface roughness Ra of 5.8 nm, a chromaticity x value of 0.2736, a chromaticity y value of 0.3776, an Y value of 71.21, a photofatigue resistance ΔE* value of 2.51, a transmittance at wavelength of 530 nm of 93.0%, and a transmittance at wavelength of 650 nm of less than 1%.

Example 11

<Transparent Coloring Composition (III): Production of Transparent Coloring Composition (III-B)>

The same procedure for production of the transparent coloring composition (III-G) as defined in Example 10 was conducted except that the transparent coloring composition (II-B) obtained in Example 8 was used as the raw transparent coloring composition, thereby obtaining a transparent coloring composition (III-B).

As a result, it was confirmed that the thus obtained transparent coloring composition (III-B) had a viscosity of 23.8 mPa·s, a dispersion average particle diameter ($Dd_{50}$) of 68 nm, a dispersion particle diameter ($Dd_{84}$) of 116 nm, a dispersion maximum particle diameter ($Dd_{99}$) of 159 nm, a geometrical standard deviation ($Dd_{84}/Dd_{50}$) of 1.71, and a specific absorptivity ($\epsilon_w$) at wavelength of 610 nm of 2.29.

Then, the transparent coloring composition (III-B) was applied onto a clear base film to form a coating layer having a thickness of 150 μm (6 mil) thereon, and then dried, thereby obtaining a colored transparent film (III-B). As a result, it was confirmed that the thus obtained colored transparent film (III-B) had a surface roughness Ra of 5.8 nm, a chromaticity x value of 0.1479, a chromaticity y value of 0.2170, an Y value of 29.60, a photofatigue resistance ΔE* value of 2.81, a transmittance at wavelength of o460 nm f 93.3%, and a transmittance at wavelength of 610 nm of less than 1%.

Example 12

<Transparent Coloring Composition (III): Production of Transparent Coloring Composition (III-R)>

The same procedure for production of the transparent coloring composition (III-G) as defined in Example 10 was conducted except that the transparent coloring composition (II-R) obtained in Example 9 was used as the raw transparent coloring composition, thereby obtaining a transparent coloring composition (III-R).

As a result, it was confirmed that the thus obtained transparent coloring composition (III-R) had a viscosity of 25.6 mPa·s, a dispersion average particle diameter ($Dd_{50}$) of 55 nm, a dispersion particle diameter ($Dd_{84}$) of 93 nm, a dispersion maximum particle diameter ($Dd_{99}$) of 131 nm, a geometrical standard deviation ($Dd_{84}/Dd_{50}$) of 1.69, and a specific absorptivity ($\epsilon_w$) at wavelength of 550 nm of 2.33μ.

Then, the transparent coloring composition (III-R) was applied onto a clear base film to form a coating layer having a thickness of 150 μm (6 mil) thereon, and then dried, thereby obtaining a colored transparent film (III-R). As a result, it was confirmed that the thus obtained colored transparent film (III-R) had a surface roughness Ra of 5.9 nm, a chromaticity x value of 0.5675, a chromaticity y value of 0.3163, an Y value of 22.88, a photofatigue resistance ΔE* value of 3.59, a transmittance at wavelength of 620 nm of 94.0%, and a transmittance at wavelength of 550 nm of less than 1%.

Example 13

<Transparent Coloring Composition (IV): Production of Transparent Coloring Composition (IV-G)>

The transparent coloring composition (II-G) obtained in Example 7, dipentaerythritol pentaacrylate and a photo-acid generator: p-phenylthiophenyldiphenylsulfonium-trifluoroacetate were dispersed together at the below-mentioned mixing ratio using a sand grinder. The resultant kneaded material was filtered through a 1 μm glass filter.

| | |
|---|---|
| Transparent coloring composition (II-G) | 480.0 parts by weight |
| p-phenylthiophenyldiphenylsulfonium trifluoroacetate | 5.0 parts by weight |

As a result, it was confirmed that the thus obtained transparent coloring composition (IV-G) had a viscosity of 25.6 mPa·s, a dispersion average particle diameter ($Dd_{50}$) of 53 nm, a dispersion particle diameter ($Dd_{84}$) of 89 nm, a dispersion maximum particle diameter ($Dd_{99}$) of 139 nm, a geometrical standard deviation ($Dd_{84}/Dd_{50}$) of 1.68, and a specific absorptivity ($\epsilon_w$) at wavelength of 650 nm of 2.31.

Then, the transparent coloring composition (IV-G) was applied onto a clear base film to form a coating layer having a thickness of 150 μm (6 mil), and then dried, thereby obtaining a colored transparent film (IV-G). As a result, it was confirmed that the thus obtained colored transparent film (IV-G) had a surface roughness Ra of 5.8 nm, a chromaticity x value of 0.2742, a chromaticity y value of 0.3781, an Y value of 71.26, a photofatigue resistance ΔE* value of 2.53, a transmittance at wavelength of 530 nm of 93.1%, and a transmittance at wavelength of 650 nm of less than 1%.

Example 14

<Transparent Coloring Composition (IV): Production of Transparent Coloring Composition (IV-B)>

The same procedure for production of the transparent coloring composition (IV-G) as defined in Example 13 was conducted except that the transparent coloring composition (II-B) obtained in Example 8 was used as the raw transparent coloring composition, thereby obtaining a transparent coloring composition (IV-B).

As a result, it was confirmed that the thus obtained transparent coloring composition (IV-B) had a viscosity of 24.8 mPa·s, a dispersion average particle diameter ($Dd_{50}$) of 68 nm, a dispersion particle diameter ($Dd_{84}$) of 121 nm, a dispersion maximum particle diameter ($Dd_{99}$) of 159 nm, a geometrical standard deviation ($Dd_{84}/Dd_{50}$) of 1.78, and a specific absorptivity ($\epsilon_w$) at wavelength of 610 nm of 2.34.

Then, the transparent coloring composition (IV-B) was applied onto a clear base film to form a coating layer having a thickness of 150 μm (6 mil) thereon, and then dried, thereby obtaining a colored transparent film (IV-B). As a result, it was confirmed that the thus obtained colored transparent film (IV-B) had a surface roughness Ra of 5.6 nm, a chromaticity x value of 0.1482, a chromaticity y value of 0.2169, an Y value of 29.68, a photofatigue resistance ΔE* value of 2.89, a transmittance at wavelength of 460 nm of 94.1%, and a transmittance at wavelength of 610 nm of less than 1%.

Example 15

<Transparent Coloring Composition (IV): Production of Transparent Coloring Composition (IV-R)>

The same procedure for production of the transparent coloring composition (IV-G) as defined in Example 13 was conducted except that the transparent coloring composition (II-R) obtained in Example 9 was used as the raw transparent coloring composition, thereby obtaining a transparent coloring composition (IV-R).

As a result, it was confirmed that the thus obtained transparent coloring composition (IV-R) had a viscosity of 31.2 mPa·s, a dispersion average particle diameter ($Dd_{50}$) of 58 nm, a dispersion particle diameter ($Dd_{84}$) of 101 nm, a dispersion maximum particle diameter ($Dd_{99}$) of 148 nm, a geometrical standard deviation ($Dd_{84}/Dd_{50}$) of 1.74, and a specific absorptivity ($\epsilon_w$) at wavelength of 550 nm of 2.38.

Then, the transparent coloring composition (IV-R) was applied onto a clear base film to form a coating layer having a thickness of 150 μm (6 mil) thereon, and then dried, thereby obtaining a colored transparent film (IV-R). As a result, it was confirmed that the thus obtained colored transparent film (IV-R) had a surface roughness Ra of 5.6 nm, a chromaticity x value of 0.5670, a chromaticity y value of 0.3159, an Y value of 28.91, a photofatigue resistance ΔE* value of 3.49, a transmittance at wavelength of 620 nm of 94.3%, and a transmittance at wavelength of 550 nm of less than 1%.

Example 16

<Production of Color Filter (I)>

The green-based transparent coloring composition (II-G) obtained in Example 7 was spin-coated onto a 0.7 mm-thick non-alkali glass substrate on which 1.0 μm-thick resin black matrix patterns were formed, and then pre-baked at 90° C. for 4 minutes using a hot plate. Thereafter, a positive photoresist was applied onto the resultant film, and then dried under heating at 80° C. for 20 minutes, thereby obtaining a resist film. The thus obtained resist film was exposed to light at a luminous energy of 400 mJ/cm² using a 2.50 kW ultrahigh-pressure mercury lamp, and then developed with an aqueous sodium carbonate solution. An unnecessary portion of the photoresist layer was peeled off and removed using methyl cellosolve acetate. Further, the obtained colored film was heat-treated in a nitrogen atmosphere at 250° C. for 30 minutes, thereby obtaining a patterned green-colored film.

Thereafter, the same procedure as defined above was conducted except that the transparent coloring composition (II-B) obtained in Example 8 and the transparent coloring composition (II-R) obtained in Example 9 were respectively used as the raw transparent coloring composition, thereby obtaining respective patterned colored films.

As a result, it was confirmed that the obtained color filter (I) had a transmittance at wavelength of 620 nm of 93.5%, a transmittance at wavelength of 530 nm of 92.8%, a transmittance at wavelength of 460 nm of 93.1%, and a contrast of 1580.

Example 17

<Production of Color Filter (II)>

The transparent coloring composition (III-G) obtained in Example 10 was spin-coated onto a 0.7 mm-thick non-alkali glass substrate on which 1.0 μm-thick resin black matrix patterns were formed, and then pre-baked at 90° C. for 4 minutes on a hot plate. The thus obtained film was exposed to light at a luminous energy of 400 mJ/cm² using a 2.50 kW ultrahigh-pressure mercury lamp, and then developed with an aqueous sodium carbonate solution to remove an unexposed portion of the photoresist layer. Further, the obtained colored film was heat-treated in a nitrogen atmosphere at 250° C. for 30 minutes, thereby obtaining a patterned green-colored film.

Thereafter, the same procedure as defined above was conducted except that the transparent coloring composition (III-B) obtained in Example 11 and the transparent coloring composition (III-R) obtained in Example 12 were respectively used as the raw transparent coloring composition, thereby obtaining respective patterned colored films.

As a result, it was confirmed that the obtained color filter (II) had a transmittance at wavelength of 620 nm of 94.0%, a transmittance at wavelength of 530 nm of 93.0%, a transmittance at wavelength of 460 nm of 93.3%, and a contrast of 1790.

Example 18

<Production of Color Filter (III)>

The same procedure for production of the color filter (II) as defined in Example 17 was conducted except that the transparent coloring composition (IV-G) obtained in Example 13, the transparent coloring composition (IV-B) obtained in Example 14 and the transparent coloring composition (IV-R) obtained in Example 15 were respectively used as the raw transparent coloring composition, thereby obtaining a color filter (III).

As a result, it was confirmed that the obtained color filter (III) had a transmittance at wavelength of 620 nm of 94.3%, a transmittance at wavelength of 530 nm of 93.1%, a transmittance at wavelength of 460 nm of 94.1%, and a contrast of 1630.

Core Particles 1 to 4:

Fine white inorganic particles having properties shown in Table 1 were prepared as core particles 1 to 4.

Core Particles 5:

A slurry containing silica particles was obtained by dispersing 20 kg of silica particles (core particles 1) in 150 liters of water. The pH value of the thus obtained re-dispersed slurry containing the silica particles was adjusted to 10.5 using an aqueous sodium hydroxide solution, and then the slurry concentration was adjusted to 98 g/liter by adding water thereto. After 150 liters of the slurry was heated to 60° C., 2,722 ml of a 1.0 mol/liter sodium aluminate solution (corresponding to 0.5% by weight (calculated as Al) based on the weight of the silica particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the silica particles whose surface was coated with hydroxides of aluminum.

The essential production conditions are shown in Table 2, and various properties of the obtained surface-treated silica particles are shown in Table 3.

Core Particles 6 and 7:

The same procedure as defined in the production of the above core particles 5, was conducted except that the core particles 2 and 3 were respectively used as the fine white inorganic particles, and kinds and amounts of surface-coating materials were changed variously, thereby obtaining fine white inorganic particles whose surface was coated with the surface-coating material.

The essential production conditions are shown in Table 2, and various properties of the obtained surface-treated fine white inorganic particles are shown in Table 3.

Meanwhile, in Tables, "A" and "S" as described in "kind of coating material used in surface-treating step" represent hydroxides of aluminum and oxides of silicon, respectively.

Organic Pigments:

Organic pigments having properties as shown in Table 4 were prepared.

Examples 19 to 37, Comparative Examples 1 to 6 and Reference Examples 1 to 3

The same procedures as defined in Examples 1 to 3 were conducted except that kinds and amounts of additives added in coating step with surface modifier, linear load and treating time for edge runner treatment used in the coating step with surface modifier, kinds and amounts of organic pigments adhered in organic pigment-adhering step, linear load and treating time for edge runner treatment used in the organic pigment-adhering step, and use and non-use of pulverization and classification, were changed variously, thereby obtaining organic-inorganic composite pigments.

The essential production conditions are shown in Tables 5 and 6, and various properties of the obtained organic-inorganic composite pigments are shown in Tables 7 and 8.

Meanwhile, in Examples 19 to 23, 36 and 37, Comparative Examples 1 to 6 and Reference Examples 1 to 3, the respective organic pigments were added five times in an amount of 20.0 g each to 100.0 g of the core particles such that the total amount of the respective organic pigments added was 100.0 g. In Examples 30 to 32, 200.0 g of the respective organic pigments were continuously added to 100.0 g of the core particles for 200 minutes. In Examples 24 to 26, after the respective organic pigments were previously mixed together using a Henschel mixer, etc., the thus obtained mixed pigments were added eight times in an amount of 20.0 g each to 100.0 g of the core particles such that the total amount of the respective organic pigments added was 160.0 g. In Examples 27 to 29 and 33 to 35, the respective organic pigments were added six times in an amount of 20.0 g each to 100.0 g of the core particles such that the total amount of the respective organic pigments added was 120.0 g.

Examples 38 to 56, Comparative Examples 7 to 15 and Reference Examples 4 to 6

<Transparent Coloring Composition (I)>

The same procedures for production of the transparent coloring composition (I) as defined in Examples 4 to 6 were conducted except that kinds of organic-inorganic composite pigments, kinds and amounts of dispersants blended, and kinds and amounts of solvents blended, were changed variously, thereby obtaining transparent coloring compositions (I).

The essential production conditions are shown in Tables 9 and 10, and various properties of the obtained transparent coloring compositions (I) are shown in Tables 11 and 12.

Examples 57 to 75, Comparative Examples 16 to 24 and Reference Examples 7 to 9

<Transparent Coloring Composition (II)>

The same procedures for production of the transparent coloring composition (II) as defined in Examples 7 to 9 were conducted except that amounts of transparent coloring compositions (I) blended, and kinds and amounts of transparent resins blended, were changed variously, thereby obtaining transparent coloring compositions (II).

The essential production conditions are shown in Tables 13 and 14, various properties of the obtained transparent coloring compositions (II) are shown in Tables 15 and 16, and various properties of the colored transparent films (II) obtained by coating the transparent coloring compositions (II) are shown in Tables 17 and 18.

Examples 79 to 94, Comparative Examples 25 to 33 and Reference Examples 10 to 12

<Transparent Coloring Composition (III)>

The same procedures for production of the transparent coloring composition (III) as defined in Examples 10 to 12 were respectively conducted except that kinds and amounts of transparent coloring compositions (II) blended, kinds and amounts of polyfunctional monomers blended, and kinds and amounts of polymerization initiators blended, were changed variously, thereby obtaining transparent coloring compositions (III).

The essential production conditions are shown in Tables 19 and 20, various properties of the obtained transparent coloring compositions (III) are shown in Tables 21 and 22, and various properties of the colored transparent films (III) obtained by coating the transparent coloring compositions (III) are shown in Tables 23 and 24.

Examples 95 to 113, Comparative Examples 34 to 42 and Reference Examples 13 to 15

<Transparent Coloring Composition (IV)>

The same procedures for production of the transparent coloring composition (IV) as defined in Examples 13 to 15 were respectively conducted except that kinds and amounts of transparent coloring compositions (II) blended, and kinds and amounts of photo-acid generators blended, were changed variously, thereby obtaining transparent coloring compositions (IV).

The essential production conditions are shown in Tables 25 and 26, various properties of the obtained transparent coloring compositions (IV) are shown in Tables 27 and 28, and various properties of the colored transparent films (IV) obtained by coating the transparent coloring compositions (IV) are shown in Tables 29 and 30.

<Color Filter>

Examples 114 to 117, Comparative Examples 43 to 45 and Reference Example 16

The same procedure for production of the color filter (I) as defined in Example 16 was conducted except that kinds of transparent coloring compositions were changed variously, thereby obtaining color filters.

The essential production conditions and various properties of the obtained color filters are shown in Tables 31 and 32.

Examples 118 to 121, Comparative Examples 46 to 48 and Reference Example 17

The same procedure for production of the color filter (II) as defined in Example 17 was conducted except that kinds of transparent coloring compositions were changed variously, thereby obtaining color filters.

The essential production conditions and various properties of the obtained color filters are shown in Tables. 31 and 32.

Examples 122 to 125, Comparative Examples 49 to 51 and Reference Example 18

The same procedure for production of the color filter (III) as defined in Example 18 was conducted except that kinds of transparent coloring compositions were changed variously, thereby obtaining color filters.

The essential production conditions and various properties of the obtained color filters are shown in Tables 31 and 32.

TABLE 1

| Kind of core particles | Properties of fine white inorganic particles | | | | | |
|---|---|---|---|---|---|---|
| | Kind | Shape | Average particle diameter of primary particles (nm) | Geometrical standard deviation (−) | BET specific surface area value (m$^2$/g) | Volume average particle diameter (Dp$_{50}$) (μm) |
| Core particles 1 | Silica | Spherical | 20 | 1.25 | 201.3 | 1.63 |
| Core particles 2 | Silica | Spherical | 11 | 1.27 | 303.8 | 1.87 |
| Core particles 3 | Precipitated barium sulfate | Granular | 30 | 1.48 | 31.6 | 1.56 |
| Core particles 4 | Titanium oxide | Granular | 36 | 1.38 | 61.2 | 1.96 |

| Kind of core particles | Properties of fine white inorganic particles | | | | | | |
|---|---|---|---|---|---|---|---|
| | Volume maximum particle diameter (Dp$_{99}$) (μm) | Refractive index (−) | Hue | | | | Photofatigue resistance ΔE* value (−) |
| | | | L* value (−) | a* value (−) | b* value (−) | C* value (−) | |
| Core particles 1 | 2.59 | 1.42 | 93.36 | 0.13 | 0.25 | 0.28 | 5.36 |
| Core particles 2 | 3.12 | 1.42 | 93.13 | 0.11 | 1.16 | 1.17 | 5.38 |
| Core particles 3 | 2.68 | 1.62 | 94.16 | 0.23 | 0.84 | 0.87 | 4.64 |
| Core particles 4 | 3.26 | 2.71 | 98.16 | 0.08 | 0.96 | 0.96 | 8.64 |

TABLE 2

| Kind of core particles | Kind of core particles | Surface-treating step Additives | | |
|---|---|---|---|---|
| | | Kind | Calculated as | Amount (wt. %) |
| Core particles 5 | Core particles 1 | Sodium aluminate | Al | 0.5 |
| Core particles 6 | Core particles 2 | Aluminum sulfate | Al | 1.0 |
| Core particles 7 | Core particles 3 | Sodium aluminate Water glass #3 | Al SiO$_2$ | 0.5 1.0 |

TABLE 2-continued

| Kind of core particles | Surface-treating step Coating material | | |
|---|---|---|---|
| | Kind | Calculated as | Amount (wt. %) |
| Core particles 5 | A | Al | 0.49 |
| Core particles 6 | A | Al | 0.99 |
| Core particles 7 | A S | Al SiO$_2$ | 0.49 0.98 |

TABLE 3

| Kind of core particles | Shape | Properties of surface-treated fine white inorganic particles | | | | | |
|---|---|---|---|---|---|---|---|
| | | Average particle diameter of primary particles (nm) | Geometrical standard deviation (−) | BET specific surface area value (m$^2$/g) | Volume average particle diameter (Dp$_{50}$) (μm) | Volume maximum particle diameter (Dp$_{99}$) (μm) | Refractive index (−) |
| Core particles 5 | Spherical | 20 | 1.25 | 196.4 | 1.96 | 3.87 | 1.42 |
| Core particles 6 | Spherical | 11 | 1.27 | 286.3 | 2.83 | 4.86 | 1.42 |
| Core particles 7 | Granular | 30 | 1.47 | 29.8 | 2.06 | 3.73 | 1.62 |

| Kind of core particles | Properties of surface-treated fine white inorganic particles | | | | Photofatigue resistance ΔE* value (−) |
|---|---|---|---|---|---|
| | Hue | | | | |
| | L* value (−) | a* value (−) | b* value (−) | C* value (−) | |
| Core particles 5 | 93.11 | 0.15 | 0.28 | 0.32 | 4.36 |
| Core particles 6 | 92.96 | 0.13 | 1.13 | 1.14 | 4.96 |
| Core particles 7 | 93.93 | 0.28 | 0.76 | 0.81 | 4.23 |

TABLE 4

| Organic pigments | Kind | Properties of organic pigment | | | | | | |
|---|---|---|---|---|---|---|---|---|
| | | Particle shape | Average particle diameter of primary particles (nm) | BET specific surface area value (m$^2$/g) | Hue | | | Photofatigue resistance (ΔE* value) (−) |
| | | | | | L* value (−) | a* value (−) | b* value (−) | |
| Organic pigment B-1 | Pigment blue (phthalocyanine-based pigment) | Granular | 83 | 81.6 | 24.41 | 6.01 | −12.63 | 10.68 |
| Organic pigment G-1 | Pigment green (phthalocyanine-based pigment) | Granular | 96 | 66.4 | 31.77 | −21.28 | 3.06 | 9.26 |
| Organic pigment R-1 | Pigment red (diketopyrrolopyrrole-based pigment) | Granular | 130 | 81.6 | 37.95 | 43.24 | 23.28 | 10.13 |
| Organic pigments R-2 | Pigment red (anthraquinone-based pigment) | Granular | 121 | 41.6 | 54.13 | 56.75 | 43.86 | 13.64 |
| Organic pigment V-1 | Pigment violet (dioxazine-based pigment) | Granular | 107 | 52.6 | 25.57 | 5.99 | 1.07 | 15.16 |
| Organic pigment Y-1 | Pigment yellow (quinophthalone-based pigment) | Granular | 131 | 31.3 | 61.05 | 16.93 | 44.80 | 15.18 |

TABLE 5

| | | Production of organic and inorganic composite pigment | | | | | | |
|---|---|---|---|---|---|---|---|---|
| | | Coating step with surface modifying agent | | | | | Organic pigment-adhesion step | |
| | | | | | | Coating amount | Organic pigment | |
| | Kind of core | Additives | | Amount added | Edge runner treatment | | (calculated as C) | | Amount adhered |
| Examples | particles | Kind | | (wt. part) | Linear load (N/cm) (Kg/cm) | Time (min.) | (wt. %) | Kind | (wt. part) |
|---|---|---|---|---|---|---|---|---|---|
| Example 19 | Core particles 1 | Methylhydrogenpolysiloxane | | 4.0 | 588　60 | 120 | 1.04 | B-1 | 100.0 |
| Example 20 | Core particles 1 | Methylhydrogenpolysiloxane | | 2.0 | 392　40 | 60 | 0.52 | G-1 | 100.0 |
| Example 21 | Core particles 1 | Methylhydrogenpolysiloxane | | 6.0 | 784　80 | 180 | 1.52 | R-1 | 100.0 |
| Example 22 | Core particles 1 | Methylhydrogenpolysiloxane | | 8.0 | 735　75 | 60 | 2.00 | R-2 | 100.0 |
| Example 23 | Core particles 1 | Methylhydrogenpolysiloxane | | 4.0 | 490　50 | 40 | 1.05 | Y-1 | 100.0 |
| Example 24 | Core particles 1 | Methyltrimethoxysilane | | 2.0 | 441　45 | 120 | 0.17 | B-1 | 150.0 |
| Example 25 | Core particles 1 | Methyltrimethoxysilane | | 3.0 | 588　60 | 60 | 0.26 | G-1 | 150.0 |
| Example 26 | Core particles 1 | Methyltrimethoxysilane | | 6.0 | 294　30 | 40 | 0.51 | R-1 | 150.0 |
| Example 27 | Core particles 2 | Methyltriethoxysilane | | 8.0 | 735　75 | 160 | 0.49 | B-1 | 120.0 |
| Example 28 | Core particles 2 | Methyltriethoxysilane | | 6.0 | 588　60 | 100 | 0.38 | G-1 | 120.0 |
| Example 29 | Core particles 2 | Methyltriethoxysilane | | 12.0 | 588　60 | 60 | 0.72 | R-1 | 120.0 |
| Example 30 | Core particles 3 | Phenyltriethoxysilane | | 6.0 | 588　60 | 85 | 2.06 | B-1 | 200.0 |
| Example 31 | Core particles 3 | Phenyltriethoxysilane | | 6.0 | 735　75 | 90 | 2.05 | G-1 | 200.0 |
| Example 32 | Core particles 3 | Phenyltriethoxysilane | | 4.0 | 441　45 | 100 | 1.38 | R-1 | 200.0 |
| Example 33 | Core particles 5 | Methylhydrogenpolysiloxane | | 2.0 | 343　35 | 120 | 0.52 | B-1 | 120.0 |
| Example 34 | Core particles 5 | Methylhydrogenpolysiloxane | | 10.0 | 441　45 | 140 | 2.44 | G-1 | 120.0 |
| Example 35 | Core particles 5 | Methylhydrogenpolysiloxane | | 5.0 | 588　60 | 180 | 1.30 | R-1 | 120.0 |
| Example 36 | Core particles 6 | γ-aminopropyltriethoxysilane | | 20.0 | 588　60 | 50 | 2.74 | B-1 | 100.0 |
| Example 37 | Core particles 7 | Polyvinyl alcohol | | 15.0 | 441　45 | 120 | 7.08 | G-1 | 100.0 |

| | Production of organic and inorganic composite pigment | | | | | | |
|---|---|---|---|---|---|---|---|
| | Organic pigment-adhesion step | | | | | | |
| | Organic pigment | | Edge runner treatment | | Amount adhered (calculated as C) | Pulverization and classification | |
| Examples | Kind | Amount adhered (wt. part) | Linear load (N/cm) (Kg/cm) | Time (min.) | (wt. %) | Use or non-use of pulverization | Use or non-use of classification |
|---|---|---|---|---|---|---|---|
| Example 19 | — | — | 588　60 | 60 | 33.06 | Used | Used |
| Example 20 | — | — | 588　60 | 120 | 18.63 | Used | Used |
| Example 21 | — | — | 441　45 | 60 | 30.16 | Used | Used |
| Example 22 | — | — | 735　75 | 90 | 37.68 | Used | Used |
| Example 23 | — | — | 588　60 | 60 | 22.32 | Used | Used |
| Example 24 | V-1 | 10.0 | 588　60 | 120 | 40.85 | Used | Used |
| Example 25 | Y-1 | 10.0 | 441　45 | 180 | 21.56 | Used | Used |
| Example 26 | Y-1 | 10.0 | 588　60 | 160 | 46.79 | Used | Used |
| Example 27 | — | — | 735　75 | 180 | 36.16 | Used | Used |
| Example 28 | — | — | 343　35 | 120 | 19.58 | Used | Used |
| Example 29 | — | — | 392　40 | 90 | 33.03 | Used | Used |
| Example 30 | — | — | 588　60 | 120 | 44.72 | Used | Used |
| Example 31 | — | — | 784　80 | 180 | 24.01 | Used | Used |
| Example 32 | — | — | 588　60 | 120 | 40.42 | Used | Used |
| Example 33 | — | — | 588　60 | 140 | 36.66 | Used | Used |
| Example 34 | — | — | 392　40 | 120 | 20.11 | Used | Used |
| Example 35 | — | — | 441　45 | 160 | 33.38 | Used | Used |
| Example 36 | — | — | 735　75 | 120 | 33.68 | Used | Used |
| Example 37 | — | — | 588　60 | 120 | 18.49 | Used | Used |

TABLE 6

| Comparative Examples and Reference Examples | Kind of core particles | Production of organic and inorganic composite pigment ||||||| Organic pigment-adhesion step Organic pigment ||
|---|---|---|---|---|---|---|---|---|---|
| | | Coating step with surface modifying agent ||||||| | |
| | | Additives || Edge runner treatment || | Coating amount (calculated as C) | | Amount adhered |
| | | Kind | Amount added (wt. part) | Linear load (N/cm) | (Kg/cm) | Time (min.) | (wt. %) | Kind | (wt. part) |
| Comparative Example 1 | Core particles 1 | — | — | — | — | — | — | B-1 | 100.0 |
| Comparative Example 2 | Core particles 1 | — | — | — | — | — | — | G-1 | 100.0 |
| Comparative Example 3 | Core particles 1 | — | — | — | — | — | — | R-1 | 100.0 |
| Comparative Example 4 | Core particles 4 | Methylhydrogenpolysiloxane | 0.005 | 588 | 60 | 120 | $2 \times 10^{-3}$ | B-1 | 100.0 |
| Comparative Example 5 | Core particles 4 | Methylhydrogenpolysiloxane | 0.005 | 588 | 60 | 120 | $2 \times 10^{-3}$ | G-1 | 100.0 |
| Comparative Example 6 | Core particles 4 | Methylhydrogenpolysiloxane | 0.005 | 588 | 60 | 120 | $2 \times 10^{-3}$ | R-1 | 100.0 |
| Reference Example 1 | Core particles 1 | Methylhydrogenpolysiloxane | 4.0 | 588 | 60 | 120 | 1.03 | B-1 | 100.0 |
| Reference Example 2 | Core particles 1 | Methylhydrogenpolysiloxane | 4.0 | 588 | 60 | 120 | 1.04 | G-1 | 100.0 |
| Reference Example 3 | Core particles 1 | Methylhydrogenpolysiloxane | 4.0 | 588 | 60 | 120 | 1.04 | R-1 | 100.0 |

| Comparative Examples and Reference Examples | Production of organic and inorganic composite pigment |||||||
|---|---|---|---|---|---|---|---|
| | Organic pigment-adhesion step |||||||
| | Organic pigment || Edge runner treatment || Amount adhered (calculated as C) | Pulverization and classification ||
| | Kind | Amount adhered (wt. part) | Linear load (N/cm) (Kg/cm) | Time (min.) | (wt. %) | Use or non-use of pulverization | Use or non-use of classification |
| Comparative Example 1 | — | — | 588 60 | 60 | 33.69 | Non-used | Non-used |
| Comparative Example 2 | — | — | 588 60 | 60 | 18.14 | Non-used | Non-used |
| Comparative Example 3 | — | — | 588 60 | 60 | 30.64 | Non-used | Non-used |
| Comparative Example 4 | — | — | 588 60 | 60 | 33.00 | Used | Used |
| Comparative Example 5 | — | — | 588 60 | 60 | 18.96 | Used | Used |
| Comparative Example 6 | — | — | 588 60 | 60 | 29.98 | Used | Used |
| Reference Example 1 | — | — | 588 60 | 60 | 33.55 | Non-used | Non-used |
| Reference Example 2 | — | — | 588 60 | 60 | 18.01 | Non-used | Non-used |
| Reference Example 3 | — | — | 588 60 | 60 | 30.76 | Non-used | Non-used |

TABLE 7

| | Properties of organic and inorganic composite pigment | | | | |
|---|---|---|---|---|---|
| Examples | Average particle diameter of primary particles (nm) | Geometrical standard deviation (-) | BET specific surface area value ($m^2/g$) | Volume average particle diameter ($Dp_{50}$) (μm) | Volume maximum particle diameter ($Dp_{99}$) (μm) |
| Example 19 | 22 | 1.25 | 61.2 | 0.96 | 1.43 |
| Example 20 | 23 | 1.26 | 64.6 | 0.83 | 1.51 |
| Example 21 | 24 | 1.25 | 58.6 | 0.76 | 1.46 |
| Example 22 | 22 | 1.25 | 56.3 | 0.64 | 1.47 |
| Example 23 | 24 | 1.25 | 58.6 | 0.91 | 1.38 |
| Example 24 | 23 | 1.26 | 46.3 | 1.08 | 1.46 |
| Example 25 | 22 | 1.25 | 48.2 | 1.16 | 1.40 |
| Example 26 | 23 | 1.26 | 50.6 | 0.93 | 1.48 |
| Example 27 | 14 | 1.28 | 81.2 | 1.13 | 1.63 |
| Example 28 | 13 | 1.27 | 86.8 | 1.06 | 1.59 |
| Example 29 | 14 | 1.28 | 80.1 | 1.11 | 1.61 |
| Example 30 | 32 | 1.48 | 40.1 | 0.78 | 0.96 |
| Example 31 | 33 | 1.48 | 42.8 | 0.69 | 1.13 |
| Example 32 | 32 | 1.48 | 43.2 | 0.83 | 1.18 |
| Example 33 | 22 | 1.25 | 58.6 | 0.86 | 1.46 |
| Example 34 | 23 | 1.25 | 56.3 | 0.91 | 1.40 |
| Example 35 | 24 | 1.26 | 60.1 | 0.83 | 1.46 |
| Example 36 | 13 | 1.28 | 75.3 | 0.90 | 1.50 |
| Example 37 | 32 | 1.48 | 46.8 | 0.59 | 1.13 |

| | Properties of organic and inorganic composite pigment | | | | | |
|---|---|---|---|---|---|---|
| | Hue | | | | Photofatigue resistance | Desorption degree of organic |
| Examples | $L^*$ value (-) | $a^*$ value (-) | $b^*$ value (-) | Tinting strength (%) | ($\Delta E^*$ value) (-) | pigment (-) |
| Example 19 | 26.13 | 7.01 | −11.62 | 138 | 1.38 | 5 |
| Example 20 | 38.16 | −20.12 | 3.01 | 148 | 1.26 | 5 |
| Example 21 | 39.60 | 42.16 | 21.63 | 161 | 1.96 | 5 |
| Example 22 | 55.68 | 54.13 | 41.62 | 160 | 1.83 | 5 |
| Example 23 | 63.96 | 15.16 | 42.23 | 158 | 2.26 | 4 |
| Example 24 | 23.16 | 7.23 | −14.65 | 171 | 1.48 | 5 |
| Example 25 | 32.63 | −21.69 | 6.83 | 169 | 1.36 | 4 |
| Example 26 | 38.16 | 41.62 | 25.33 | 166 | 2.03 | 5 |
| Example 27 | 25.13 | 5.32 | −11.01 | 146 | 1.36 | 4 |
| Example 28 | 33.63 | −20.16 | 2.54 | 154 | 1.35 | 4 |
| Example 29 | 38.62 | 42.86 | 22.18 | 168 | 1.29 | 4 |
| Example 30 | 26.83 | 6.36 | −11.92 | 213 | 1.68 | 5 |
| Example 31 | 34.16 | −19.72 | 2.83 | 221 | 1.74 | 5 |
| Example 32 | 39.62 | 40.63 | 24.16 | 206 | 1.83 | 5 |
| Example 33 | 25.63 | 4.92 | −11.83 | 163 | 1.26 | 5 |
| Example 34 | 32.64 | −22.65 | 2.93 | 158 | 1.23 | 5 |
| Example 35 | 39.68 | 42.26 | 21.69 | 159 | 1.41 | 5 |
| Example 36 | 25.63 | 5.63 | −10.93 | 146 | 1.16 | 4 |
| Example 37 | 32.68 | −21.63 | 2.96 | 143 | 1.08 | 5 |

TABLE 8

| | Properties of organic and inorganic composite pigment | | | | |
|---|---|---|---|---|---|
| Comparative Examples and Reference Examples | Average particle diameter of primary particles (nm) | Geometrical standard deviation (-) | BET specific surface area value ($m^2/g$) | Volume average particle diameter ($Dp_{50}$) (μm) | Volume maximum particle diameter ($Dp_{99}$) (μm) |
| Comparative Example 1 | 21 | 2.56 | 128.1 | 6.58 | 26.35 |
| Comparative Example 2 | 21 | 2.63 | 138.2 | 6.64 | 25.91 |
| Comparative Example 3 | 21 | 2.79 | 140.6 | 6.62 | 25.82 |

TABLE 8-continued

| | | | | | |
|---|---|---|---|---|---|
| Comparative Example 4 | 38 | 2.38 | 73.1 | 4.93 | 11.14 |
| Comparative Example 5 | 37 | 2.35 | 68.3 | 4.86 | 11.36 |
| Comparative Example 6 | 38 | 2.36 | 76.2 | 4.92 | 11.98 |
| Reference Example 1 | 23 | 1.26 | 68.3 | 5.65 | 12.60 |
| Reference Example 2 | 24 | 1.27 | 78.6 | 5.52 | 12.54 |
| Reference Example 3 | 23 | 1.26 | 71.6 | 5.46 | 12.43 |

| | Properties of organic and inorganic composite pigment | | | | | |
|---|---|---|---|---|---|---|
| Comparative Examples and Reference Examples | Hue | | | Tinting strength (%) | Photofatigue resistance ($\Delta E^*$ value) (−) | Desorption degree of organic pigment (−) |
| | $L^*$ value (−) | $a^*$ value (−) | $b^*$ value (−) | | | |
| Comparative Example 1 | 29.16 | 5.12 | −9.14 | 100 | 7.12 | 1 |
| Comparative Example 2 | 40.13 | −18.16 | 2.12 | 100 | 5.99 | 1 |
| Comparative Example 3 | 43.56 | 39.16 | 19.62 | 100 | 6.48 | 1 |
| Comparative Example 4 | 31.62 | 6.66 | −10.62 | 103 | 10.16 | 1 |
| Comparative Example 5 | 43.16 | −18.63 | 2.96 | 106 | 11.21 | 1 |
| Comparative Example 6 | 45.16 | 40.66 | 20.92 | 105 | 11.83 | 1 |
| Reference Example 1 | 28.32 | 5.56 | −9.92 | 132 | 1.52 | 5 |
| Reference Example 2 | 40.11 | −19.16 | 2.56 | 135 | 1.36 | 5 |
| Reference Example 3 | 42.63 | 40.16 | 20.66 | 131 | 2.00 | 4 |

TABLE 9

Production of transparent coloring composition (I)

| Examples | Coloring pigment | | Dispersant | |
|---|---|---|---|---|
| | Kind | Amount blended (wt. part) | Kind | Amount blended (wt. part) |
| Example 38 | Example 19 | 100.0 | Basic comb-shaped polymer | 20.0 |
| Example 39 | Example 20 | 100.0 | Basic comb-shaped polymer | 20.0 |
| Example 40 | Example 21 | 100.0 | Basic comb-shaped polymer | 20.0 |
| Example 41 | Example 22 | 100.0 | Phenyl ether-based nonionic surfactant | 15.0 |
| Example 42 | Example 23 | 100.0 | Sulfonic acid salt dispersant | 30.0 |
| Example 43 | Example 24 | 100.0 | Modified acrylic block copolymer | 25.0 |
| Example 44 | Example 25 | 100.0 | Modified acrylic block copolymer | 25.0 |
| Example 45 | Example 26 | 100.0 | Modified acrylic block copolymer | 25.0 |
| Example 46 | Example 27 | 100.0 | Polyester acid amide amine | 10.0 |
| Example 47 | Example 28 | 100.0 | Polyester acid amide amine | 10.0 |
| Example 48 | Example 29 | 100.0 | Polyester acid amide amine | 10.0 |
| Example 49 | Example 30 | 100.0 | Phenyl ether-based nonionic surfactant | 30.0 |
| Example 50 | Example 31 | 100.0 | Phenyl ether-based nonionic surfactant | 30.0 |

TABLE 9-continued

| Example 51 | Example 32 | 100.0 | Phenyl ether-based nonionic surfactant | 30.0 |
| Example 52 | Example 33 | 100.0 | Basic comb-shaped polymer | 15.0 |
| Example 53 | Example 34 | 100.0 | Basic comb-shaped polymer | 15.0 |
| Example 54 | Example 35 | 100.0 | Basic comb-shaped polymer | 15.0 |
| Example 55 | Example 36 | 100.0 | Polyether-based phosphoric acid ester | 40.0 |
| Example 56 | Example 37 | 100.0 | Phenyl ether-based nonionic surfactant | 20.0 |

| | Production of transparent coloring composition (I) Solvent | | | |
|---|---|---|---|---|
| Examples | Kind | Amount blended (wt. part) | Kind | Amount blended (wt. part) |
| Example 38 | Cyclohexanone | 50.0 | PGMA | 230.0 |
| Example 39 | Cyclohexanone | 50.0 | PGMA | 230.0 |
| Example 40 | Cyclohexanone | 50.0 | PGMA | 230.0 |
| Example 41 | Cyclohexanone | 50.0 | PGMA | 225.0 |
| Example 42 | Cyclohexanone | 50.0 | PGMA | 240.0 |
| Example 43 | Cyclohexanone | 50.0 | PGMA | 245.0 |
| Example 44 | Cyclohexanone | 50.0 | PGMA | 245.0 |
| Example 45 | Cyclohexanone | 50.0 | PGMA | 245.0 |
| Example 46 | Cyclohexanone | 50.0 | PGMA | 220.0 |
| Example 47 | Cyclohexanone | 50.0 | PGMA | 220.0 |
| Example 48 | Cyclohexanone | 50.0 | PGMA | 220.0 |
| Example 49 | Cyclohexanone | 50.0 | PGMA | 240.0 |
| Example 50 | Cyclohexanone | 50.0 | PGMA | 240.0 |
| Example 51 | Cyclohexanone | 50.0 | PGMA | 240.0 |
| Example 52 | Cyclohexanone | 50.0 | PGMA | 225.0 |
| Example 53 | Cyclohexanone | 50.0 | PGMA | 225.0 |
| Example 54 | Cyclohexanone | 50.0 | PGMA | 225.0 |
| Example 55 | Cyclohexanone | 50.0 | PGMA | 250.0 |
| Example 56 | Cyclohexanone | 50.0 | PGMA | 230.0 |

TABLE 10

| | Production of transparent coloring composition (I) | | | |
|---|---|---|---|---|
| Comparative Examples and Reference Examples | Coloring pigment | | Dispersant | |
| | Kind | Amount blended (wt. part) | Kind | Amount blended (wt. part) |
| Comparative Example 7 | Organic pigment B-1 | 100.0 | Modified acrylic block copolymer | 20.0 |
| Comparative Example 8 | Organic pigment G-1 | 100.0 | Modified acrylic block copolymer | 20.0 |
| Comparative Example 9 | Organic pigment R-1 | 100.0 | Modified acrylic block copolymer | 20.0 |
| Comparative Example 10 | Comparative Example 1 | 100.0 | Modified acrylic block copolymer | 20.0 |
| Comparative Example 11 | Comparative Example 2 | 100.0 | Modified acrylic block copolymer | 20.0 |
| Comparative Example 12 | Comparative Example 3 | 100.0 | Modified acrylic block copolymer | 20.0 |
| Comparative Example 13 | Comparative Example 4 | 100.0 | Modified acrylic block copolymer | 20.0 |
| Comparative Example 14 | Comparative Example 5 | 100.0 | Modified acrylic block copolymer | 20.0 |
| Comparative Example 15 | Comparative Example 6 | 100.0 | Modified acrylic block copolymer | 20.0 |
| Reference Example 4 | Reference Example 1 | 100.0 | Modified acrylic block copolymer | 20.0 |
| Reference Example 5 | Reference Example 2 | 100.0 | Modified acrylic block copolymer | 20.0 |
| Reference Example 6 | Reference Example 3 | 100.0 | Modified acrylic block copolymer | 20.0 |

TABLE 10-continued

Production of transparent coloring composition (I)

| Comparative Examples and Reference Examples | Solvent Kind | Amount blended (wt. part) | Kind | Amount blended (wt. part) |
|---|---|---|---|---|
| Comparative Example 7 | Cyclohexanone | 50.0 | PGMA | 230.0 |
| Comparative Example 8 | Cyclohexanone | 50.0 | PGMA | 230.0 |
| Comparative Example 9 | Cyclohexanone | 50.0 | PGMA | 230.0 |
| Comparative Example 10 | Cyclohexanone | 50.0 | PGMA | 230.0 |
| Comparative Example 11 | Cyclohexanone | 50.0 | PGMA | 230.0 |
| Comparative Example 12 | Cyclohexanone | 50.0 | PGMA | 230.0 |
| Comparative Example 13 | Cyclohexanone | 50.0 | PGMA | 230.0 |
| Comparative Example 14 | Cyclohexanone | 50.0 | PGMA | 230.0 |
| Comparative Example 15 | Cyclohexanone | 50.0 | PGMA | 230.0 |
| Reference Example 4 | Cyclohexanone | 50.0 | PGMA | 230.0 |
| Reference Example 5 | Cyclohexanone | 50.0 | PGMA | 230.0 |
| Reference Example 6 | Cyclohexanone | 50.0 | PGMA | 230.0 |

TABLE 11

Properties of transparent coloring composition (I)

| Examples | Viscosity (mPa·s) | Dispersion average particle diameter $(Dd_{50})$ (nm) | Dispersion particle diameter $(Dd_{84})$ (nm) | Dispersion maximum particle diameter $(Dd_{99})$ (nm) | Geometrical standard deviation $(Dd_{84}/Dd_{50})$ (-) | Transmittance (R) 620 nm (%) | Transmittance (R) 550 nm (%) | Transmittance (G) 530 nm (%) | Transmittance (G) 650 nm (%) |
|---|---|---|---|---|---|---|---|---|---|
| Example 38 | 10.3 | 68 | 126 | 193 | 1.86 | — | — | — | — |
| Example 39 | 9.6 | 76 | 147 | 226 | 1.93 | — | — | 81.3 | <1 |
| Example 40 | 6.8 | 103 | 173 | 256 | 1.68 | 76.3 | <1 | — | — |
| Example 41 | 5.4 | 56 | 81 | 122 | 1.45 | 78.3 | <1 | — | — |
| Example 42 | 7.3 | 43 | 72 | 108 | 1.68 | — | — | — | — |
| Example 43 | 8.2 | 26 | 59 | 100 | 2.25 | — | — | — | — |
| Example 44 | 3.6 | 31 | 61 | 118 | 1.96 | — | — | 82.6 | <1 |
| Example 45 | 2.3 | 63 | 134 | 168 | 2.13 | 83.4 | <1 | — | — |
| Example 46 | 11.3 | 78 | 131 | 193 | 1.68 | — | — | — | — |
| Example 47 | 16.8 | 81 | 140 | 168 | 1.73 | — | — | 78.3 | <1 |
| Example 48 | 21.3 | 96 | 158 | 173 | 1.65 | 77.6 | <1 | — | — |
| Example 49 | 6.8 | 113 | 150 | 216 | 1.33 | — | — | — | — |
| Example 50 | 5.6 | 32 | 58 | 116 | 1.82 | — | — | 81.3 | <1 |
| Example 51 | 8.3 | 65 | 109 | 183 | 1.68 | 76.7 | <1 | — | — |
| Example 52 | 9.6 | 68 | 118 | 176 | 1.73 | — | — | — | — |
| Example 53 | 10.3 | 103 | 147 | 192 | 1.44 | — | — | 81.3 | <1 |
| Example 54 | 11.2 | 86 | 144 | 201 | 1.68 | 80.6 | <1 | — | — |
| Example 55 | 16.8 | 89 | 153 | 211 | 1.72 | — | — | — | — |
| Example 56 | 8.4 | 96 | 171 | 216 | 1.78 | — | — | 76.9 | <1 |

Properties of transparent coloring composition (I)

| Examples | Transmittance (B) 460 nm (%) | Transmittance (B) 610 nm (%) | Transmittance (Y) 550 nm (%) | Transmittance (Y) 400 nm (%) | Specific absorptivity (based on weight) 550 nm $\epsilon_w$ (-) | 650 nm $\epsilon_w$ (-) | 610 nm $\epsilon_w$ (-) | 400 nm $\epsilon_w$ (-) |
|---|---|---|---|---|---|---|---|---|
| Example 38 | 78.9 | <1 | — | — | — | — | 2.12 | — |

TABLE 11-continued

| | | | | | | | | |
|---|---|---|---|---|---|---|---|---|
| Example 39 | — | — | — | — | — | 2.24 | — | — |
| Example 40 | — | — | — | — | 2.06 | — | — | — |
| Example 41 | — | — | — | — | 1.87 | — | — | — |
| Example 42 | — | — | 80.0 | <1 | — | — | — | 2.05 |
| Example 43 | 81.3 | <1 | — | — | — | — | 1.68 | — |
| Example 44 | — | — | — | — | — | 1.73 | — | — |
| Example 45 | — | — | — | — | 1.86 | — | — | — |
| Example 46 | 83.2 | <1 | — | — | — | — | 2.05 | — |
| Example 47 | — | — | — | — | — | 2.08 | — | — |
| Example 48 | — | — | — | — | 2.03 | — | — | — |
| Example 49 | 76.8 | <1 | — | — | — | — | 1.68 | — |
| Example 50 | — | — | — | — | — | 1.70 | — | — |
| Example 51 | — | — | — | — | 1.67 | — | — | — |
| Example 52 | 81.2 | <1 | — | — | — | — | 2.08 | — |
| Example 53 | — | — | — | — | — | 2.04 | — | — |
| Example 54 | — | — | — | — | 2.03 | — | — | — |
| Example 55 | 79.6 | <1 | — | — | — | — | 2.24 | — |
| Example 56 | — | — | — | — | — | 2.35 | — | — |

TABLE 12

| | Properties of transparent coloring composition (I) | | | | | Properties of colored transparent film (II) Transmittance (R) | |
|---|---|---|---|---|---|---|---|
| Comparative Examples and Reference Examples | Viscosity (mPa·s) | Dispersion average particle diameter $(Dd_{50})$ (nm) | Dispersion particle diameter $(Dd_{84})$ (nm) | Dispersion maximum particle diameter $(Dd_{99})$ (nm) | Geometrical standard deviation $(Dd_{84}/Dd_{50})$ (−) | 620 nm (%) | 550 nm (%) |
| Comparative Example 7 | 368 | 463 | 1463 | 2063 | 3.16 | — | — |
| Comparative Example 8 | 542 | 582 | 2252 | 2682 | 3.87 | — | — |
| Comparative Example 9 | 1163 | 678 | 2685 | 3162 | 3.96 | 48.3 | 5.6 |
| Comparative Example 10 | 683 | 376 | 1075 | 1623 | 2.86 | — | — |
| Comparative Example 11 | 876 | 369 | 1085 | 1462 | 2.94 | — | — |
| Comparative Example 12 | 2303 | 386 | 1112 | 1566 | 2.88 | 46.8 | 6.3 |
| Comparative Example 13 | 462 | 268 | 516 | 962 | 1.93 | — | — |
| Comparative Example 14 | 662 | 276 | 553 | 968 | 2.00 | — | — |
| Comparative Example 15 | 862 | 264 | 589 | 912 | 2.23 | 30.8 | 3.1 |
| Reference Example 4 | 56.8 | 338 | 856 | 1163 | 2.53 | — | — |
| Reference Example 5 | 61.3 | 346 | 872 | 1187 | 2.52 | — | — |
| Reference Example 6 | 73.2 | 364 | 935 | 1213 | 2.57 | 64.4 | 3.1 |

| | Properties of colored transparent film (II) | | | | Properties of transparent coloring composition (I) Specific absorptivity (based on weight) | | |
|---|---|---|---|---|---|---|---|
| Comparative Examples and Reference Examples | Transmittance (G) 530 nm (%) | 650 nm (%) | Transmittance (B) 460 nm (%) | 610 nm (%) | 550 nm $\epsilon_w$ (−) | 650 nm $\epsilon_w$ (−) | 610 nm $\epsilon_w$ (−) |
| Comparative Example 7 | — | — | 63.3 | 5.6 | — | — | 1.00 |
| Comparative Example 8 | 56.2 | 5.1 | — | — | — | 1.00 | — |
| Comparative Example 9 | — | — | — | — | 1.00 | — | — |
| Comparative Example 10 | — | — | 62.6 | 6.1 | — | — | 1.02 |
| Comparative Example 11 | 51.3 | 5.2 | — | — | — | 1.01 | — |
| Comparative Example 12 | — | — | — | — | 1.04 | — | — |

TABLE 12-continued

| | | | | | | | |
|---|---|---|---|---|---|---|---|
| Comparative Example 13 | — | — | 31.6 | 3.4 | — | — | 1.12 |
| Comparative Example 14 | 32.6 | 3.6 | — | — | — | 1.15 | — |
| Comparative Example 15 | — | — | — | — | 1.08 | — | — |
| Reference Example 4 | — | — | 68.6 | 1.3 | — | — | 1.67 |
| Reference Example 5 | 69.3 | 1.4 | — | — | — | 1.71 | — |
| Reference Example 6 | — | — | — | — | 1.59 | — | — |

TABLE 13

| | Production of transparent coloring composition (II) | | | |
|---|---|---|---|---|
| | Transparent coloring composition (I) | | Resin | |
| Examples | Kind | Amount blended (wt. part) | Kind | Amount blended (wt. part) |
| Example 57 | Example 38 | 400.0 | MM/MA copolymer* | 100.0 |
| Example 58 | Example 39 | 400.0 | MM/MA copolymer* | 100.0 |
| Example 59 | Example 40 | 400.0 | MM/MA copolymer* | 100.0 |
| Example 60 | Example 41 | 390.0 | MM/MA copolymer* | 90.0 |
| Example 61 | Example 42 | 420.0 | MM/MA copolymer* | 80.0 |
| Example 62 | Example 43 | 420.0 | MM/MA copolymer* | 100.0 |
| Example 63 | Example 44 | 420.0 | MM/MA copolymer* | 100.0 |
| Example 64 | Example 45 | 420.0 | MM/MA copolymer* | 100.0 |
| Example 65 | Example 46 | 380.0 | MM/MA copolymer* | 80.0 |
| Example 66 | Example 47 | 380.0 | MM/MA copolymer* | 80.0 |
| Example 67 | Example 48 | 380.0 | MM/MA copolymer* | 80.0 |
| Example 68 | Example 49 | 420.0 | MM/MA copolymer* | 90.0 |
| Example 69 | Example 50 | 420.0 | MM/MA copolymer* | 90.0 |
| Example 70 | Example 51 | 420.0 | MM/MA copolymer* | 90.0 |
| Example 71 | Example 52 | 390.0 | MM/MA copolymer* | 100.0 |
| Example 72 | Example 53 | 390.0 | MM/MA copolymer* | 100.0 |
| Example 73 | Example 54 | 390.0 | MM/MA copolymer* | 100.0 |
| Example 74 | Example 55 | 440.0 | MM/MA copolymer* | 80.0 |
| Example 75 | Example 56 | 400.0 | MM/MA copolymer* | 90.0 |

Note:
*Methyl methacrylate/methacrylic acid copolymer

TABLE 14

| | Production of transparent coloring composition (II) | | | |
|---|---|---|---|---|
| | Transparent coloring composition (I) | | Resin | |
| Comparative Examples and Reference Examples | Kind | Amount blended (wt. part) | Kind | Amount blended (wt. part) |
| Comparative Example 16 | Comparative Example 7 | 400.0 | Methyl methacrylate/methacrylic acid copolymer | 100.0 |
| Comparative Example 17 | Comparative Example 8 | 400.0 | Methyl methacrylate/methacrylic acid copolymer | 100.0 |
| Comparative Example 18 | Comparative Example 9 | 400.0 | Methyl methacrylate/methacrylic acid copolymer | 100.0 |

TABLE 14-continued

Production of transparent coloring composition (II)

| Comparative Examples and Reference Examples | Transparent coloring composition (I) Kind | Amount blended (wt. part) | Resin Kind | Amount blended (wt. part) |
|---|---|---|---|---|
| Comparative Example 19 | Comparative Example 10 | 400.0 | Methyl methacrylate/methacrylic acid copolymer | 100.0 |
| Comparative Example 20 | Comparative Example 11 | 400.0 | Methyl methacrylate/methacrylic acid copolymer | 100.0 |
| Comparative Example 21 | Comparative Example 12 | 400.0 | Methyl methacrylate/methacrylic acid copolymer | 100.0 |
| Comparative Example 22 | Comparative Example 13 | 400.0 | Methyl methacrylate/methacrylic acid copolymer | 100.0 |
| Comparative Example 23 | Comparative Example 14 | 400.0 | Methyl methacrylate/methacrylic acid copolymer | 100.0 |
| Comparative Example 24 | Comparative Example 15 | 400.0 | Methyl methacrylate/methacrylic acid copolymer | 100.0 |
| Reference Example 7 | Reference Example 4 | 400.0 | Methyl methacrylate/methacrylic acid copolymer | 100.0 |
| Reference Example 8 | Reference Example 5 | 400.0 | Methyl methacrylate/methacrylic acid copolymer | 100.0 |
| Reference Example 9 | Reference Example 6 | 400.0 | Methyl methacrylate/methacrylic acid copolymer | 100.0 |

TABLE 15

Properties of transparent coloring composition (II)

| Examples | Viscosity (mPa·s) | Dispersion average particle diameter ($Dd_{50}$) (nm) | Dispersion particle diameter ($Dd_{84}$) (nm) | Dispersion maximum particle diameter ($Dd_{99}$) (nm) | Geometrical standard deviation ($Dd_{84}/Dd_{50}$) (-) |
|---|---|---|---|---|---|
| Example 57 | 21.3 | 66 | 117 | 156 | 1.77 |
| Example 58 | 16.8 | 77 | 136 | 186 | 1.76 |
| Example 59 | 31.3 | 87 | 142 | 184 | 1.63 |
| Example 60 | 26.8 | 43 | 61 | 108 | 1.43 |
| Example 61 | 31.7 | 21 | 34 | 68 | 1.60 |
| Example 62 | 25.2 | 24 | 45 | 87 | 1.86 |
| Example 63 | 16.8 | 43 | 75 | 101 | 1.74 |
| Example 64 | 32.4 | 56 | 104 | 146 | 1.86 |
| Example 65 | 48.6 | 54 | 91 | 147 | 1.68 |
| Example 66 | 21.7 | 43 | 75 | 136 | 1.75 |
| Example 67 | 30.0 | 64 | 99 | 150 | 1.55 |
| Example 68 | 20.6 | 67 | 92 | 144 | 1.38 |
| Example 69 | 54.6 | 21 | 37 | 68 | 1.76 |
| Example 70 | 34.4 | 45 | 70 | 124 | 1.56 |
| Example 71 | 43.2 | 65 | 109 | 152 | 1.67 |
| Example 72 | 51.6 | 56 | 82 | 137 | 1.46 |
| Example 73 | 56.3 | 51 | 80 | 126 | 1.56 |
| Example 74 | 32.7 | 37 | 58 | 109 | 1.58 |
| Example 75 | 37.6 | 48 | 81 | 149 | 1.68 |

Properties of transparent coloring composition (II) Specific absorptivity (based on weight)

| Examples | 550 nm $\epsilon_w$ (-) | 650 nm $\epsilon_w$ (-) | 610 nm $\epsilon_w$ (-) | 400 nm $\epsilon_w$ (-) |
|---|---|---|---|---|
| Example 57 | — | — | 2.24 | — |
| Example 58 | — | 2.28 | — | — |
| Example 59 | 2.11 | — | — | — |
| Example 60 | 1.92 | — | — | — |
| Example 61 | — | — | — | 2.09 |
| Example 62 | — | — | 1.74 | — |

TABLE 15-continued

| | | | | |
|---|---|---|---|---|
| Example 63 | — | 1.78 | — | — |
| Example 64 | 1.91 | — | — | — |
| Example 65 | — | — | 2.11 | — |
| Example 66 | — | 2.13 | — | — |
| Example 67 | 2.09 | — | — | — |
| Example 68 | — | — | 1.74 | — |
| Example 69 | — | 1.75 | — | — |
| Example 70 | 1.73 | — | — | — |
| Example 71 | — | — | 2.12 | — |
| Example 72 | — | 2.08 | — | — |
| Example 73 | 2.09 | — | — | — |
| Example 74 | — | — | 2.28 | — |
| Example 75 | — | 2.36 | — | — |

TABLE 16

| | Properties of transparent coloring composition (II) | | | | |
|---|---|---|---|---|---|
| Comparative Examples and Reference Examples | Viscosity (mPa·s) | Dispersion average particle diameter ($Dd_{50}$) (nm) | Dispersion particle diameter ($Dd_{84}$) (nm) | Dispersion maximum particle diameter ($Dd_{99}$) (nm) | Geometrical standard deviation ($Dd_{84}/Dd_{50}$) (—) |
| Comparative Example 16 | 286 | 388 | 1117 | 1457 | 2.88 |
| Comparative Example 17 | 367 | 564 | 1771 | 2234 | 3.14 |
| Comparative Example 18 | 765 | 578 | 2058 | 2546 | 3.56 |
| Comparative Example 19 | 546 | 366 | 977 | 1453 | 2.67 |
| Comparative Example 20 | 458 | 335 | 965 | 1357 | 2.88 |
| Comparative Example 21 | 1368 | 324 | 930 | 1375 | 2.87 |
| Comparative Example 22 | 358 | 262 | 499 | 1123 | 1.90 |
| Comparative Example 23 | 568 | 283 | 492 | 1087 | 1.74 |
| Comparative Example 24 | 658 | 271 | 506 | 1232 | 1.87 |
| Reference Example 7 | 51.5 | 345 | 872 | 1078 | 2.53 |
| Reference Example 8 | 65.7 | 334 | 839 | 1059 | 2.51 |
| Reference Example 9 | 67.9 | 359 | 922 | 1109 | 2.57 |

| | Properties of transparent coloring composition (II) Specific absorptivity (based on weight) | | | |
|---|---|---|---|---|
| Comparative Examples and Reference Examples | 550 nm $\epsilon_w$ (—) | 650 nm $\epsilon_w$ (—) | 610 nm $\epsilon_w$ (—) | 400 nm $\epsilon_w$ (—) |
| Comparative Example 16 | — | — | 1.00 | — |
| Comparative Example 17 | — | 1.00 | — | — |
| Comparative Example 18 | 1.00 | — | — | — |
| Comparative Example 19 | — | — | 1.02 | — |
| Comparative Example 20 | — | 1.03 | — | — |
| Comparative Example 21 | 1.03 | — | — | — |
| Comparative Example 22 | — | — | 1.11 | — |
| Comparative Example 23 | — | 1.18 | — | — |

TABLE 16-continued

| | | | | |
|---|---|---|---|---|
| Comparative Example 24 | 1.13 | — | — | — |
| Reference Example 7 | — | — | 1.69 | — |
| Reference Example 8 | — | 1.74 | — | — |
| Reference Example 9 | 1.63 | — | — | — |

TABLE 17

| | Properties of colored transparent film (II) | | | | |
|---|---|---|---|---|---|
| | Surface | Chromaticity | | | Photofatigue resistance |
| Examples | roughness Ra (nm) | x (−) | y (−) | Y (−) | ΔE* value (−) |
| Example 57 | 6.0 | 0.1477 | 0.2194 | 29.37 | 2.86 |
| Example 58 | 5.8 | 0.2746 | 0.3882 | 70.27 | 2.68 |
| Example 59 | 7.3 | 0.5672 | 0.3186 | 22.72 | 3.72 |
| Example 60 | 6.4 | 0.5761 | 0.3226 | 23.16 | 3.56 |
| Example 61 | 5.2 | 0.1337 | 0.2063 | 31.28 | 2.16 |
| Example 62 | 6.8 | 0.1468 | 0.2168 | 30.64 | 1.84 |
| Example 63 | 7.2 | 0.2749 | 0.3876 | 70.61 | 2.12 |
| Example 64 | 6.5 | 0.5832 | 0.3386 | 24.16 | 1.96 |
| Example 65 | 4.8 | 0.1567 | 0.2326 | 30.07 | 1.83 |
| Example 66 | 6.3 | 0.2664 | 0.3896 | 71.32 | 2.01 |
| Example 67 | 7.1 | 0.5763 | 0.3412 | 23.83 | 2.11 |
| Example 68 | 6.8 | 0.1538 | 0.2269 | 28.64 | 2.34 |
| Example 69 | 6.8 | 0.2668 | 0.3763 | 70.68 | 1.68 |
| Example 70 | 6.5 | 0.5836 | 0.3120 | 24.66 | 2.00 |
| Example 71 | 6.3 | 0.1668 | 0.2312 | 29.96 | 1.96 |
| Example 72 | 5.6 | 0.2732 | 0.3889 | 71.32 | 1.84 |
| Example 73 | 6.1 | 0.5673 | 0.3284 | 22.86 | 1.76 |
| Example 74 | 5.9 | 0.1664 | 0.2445 | 32.16 | 1.73 |
| Example 75 | 5.8 | 0.2668 | 0.3962 | 72.13 | 1.64 |

| | Properties of colored transparent film (II) | | | |
|---|---|---|---|---|
| | Transmittance (R) | | Transmittance (G) | |
| Examples | 620 nm (%) | 550 nm (%) | 530 nm (%) | 650 nm (%) |
| Example 57 | — | — | — | — |
| Example 58 | — | — | 92.3 | <1 |
| Example 59 | 94.6 | <1 | — | — |
| Example 60 | 91.3 | <1 | — | — |
| Example 61 | — | — | — | — |
| Example 62 | — | — | — | — |
| Example 63 | — | — | 94.1 | <1 |
| Example 64 | 95.6 | <1 | — | — |
| Example 65 | — | — | — | — |
| Example 66 | — | — | 94.6 | <1 |
| Example 67 | 91.3 | <1 | — | — |
| Example 68 | — | — | — | — |
| Example 69 | — | — | 93.6 | <1 |
| Example 70 | 91.2 | <1 | — | — |
| Example 71 | — | — | — | — |
| Example 72 | — | — | 91.3 | <1 |
| Example 73 | 92.6 | <1 | — | — |
| Example 74 | — | — | — | — |
| Example 75 | — | — | 93.3 | <1 |

| | Properties of colored transparent film (II) | | | |
|---|---|---|---|---|
| | Transmittance (B) | | Transmittance (Y) | |
| Examples | 460 nm (%) | 610 nm (%) | 550 nm (%) | 400 nm (%) |
| Example 57 | 92.1 | <1 | — | — |
| Example 58 | — | — | — | — |
| Example 59 | — | — | — | — |
| Example 60 | — | — | — | — |
| Example 61 | — | — | 91.2 | <1 |
| Example 62 | 93.6 | <1 | — | — |
| Example 63 | — | — | — | — |
| Example 64 | — | — | — | — |
| Example 65 | 95.8 | <1 | — | — |
| Example 66 | — | — | — | — |
| Example 67 | — | — | — | — |
| Example 68 | 94.1 | <1 | — | — |
| Example 69 | — | — | — | — |
| Example 70 | — | — | — | — |
| Example 71 | 91.6 | <1 | — | — |
| Example 72 | — | — | — | — |
| Example 73 | — | — | — | — |
| Example 74 | 94.5 | <1 | — | — |
| Example 75 | — | — | — | — |

TABLE 18

| | | Properties of colored transparent film (II) | | | |
|---|---|---|---|---|---|
| Comparative Examples and Reference Examples | Surface roughness Ra (nm) | Chromaticity | | | Photofatigue resistance |
| | | x (−) | y (−) | Y (−) | ΔE* value (−) |
| Comparative Example 16 | 38.6 | 0.1603 | 0.2246 | 26.53 | 8.13 |
| Comparative Example 17 | 36.2 | 0.2722 | 0.3763 | 64.62 | 7.96 |
| Comparative Example 18 | 28.1 | 0.5338 | 0.3018 | 21.63 | 10.13 |
| Comparative Example 19 | 46.3 | 0.1556 | 0.2316 | 25.42 | 7.14 |
| Comparative Example 20 | 51.6 | 0.2816 | 0.3862 | 65.12 | 6.64 |
| Comparative Example 21 | 63.2 | 0.5264 | 0.3123 | 21.56 | 8.13 |
| Comparative Example 22 | 26.6 | 0.1558 | 0.2113 | 23.66 | 5.48 |
| Comparative Example 23 | 27.2 | 0.2716 | 0.3872 | 65.96 | 5.36 |
| Comparative Example 24 | 25.8 | 0.5362 | 0.3226 | 22.63 | 5.28 |
| Reference Example 7 | 12.3 | 0.1613 | 0.2326 | 24.13 | 1.98 |
| Reference Example 8 | 13.5 | 0.2688 | 0.3886 | 64.12 | 1.72 |
| Reference Example 9 | 14.2 | 0.5216 | 0.3063 | 20.16 | 2.13 |

| | Properties of colored transparent film (II) | | | | | |
|---|---|---|---|---|---|---|
| Comparative Examples and Reference Examples | Transmittance (R) | | Transmittance (G) | | Transmittance (B) | |
| | 620 nm (%) | 550 nm (%) | 530 nm (%) | 650 nm (%) | 460 nm (%) | 610 nm (%) |
| Comparative Example 16 | — | — | — | — | 73.3 | 6.6 |

TABLE 18-continued

| | | | | | | |
|---|---|---|---|---|---|---|
| Comparative Example 17 | — | — | 74.2 | 6.1 | — | — |
| Comparative Example 18 | 71.5 | 5.6 | — | — | — | — |
| Comparative Example 19 | — | — | — | — | 69.7 | 6.5 |
| Comparative Example 20 | — | — | 71.3 | 6.2 | — | — |
| Comparative Example 21 | 66.8 | 6.3 | — | — | — | — |
| Comparative Example 22 | — | — | — | — | 33.4 | 3.5 |
| Comparative Example 23 | — | — | 35.9 | 3.3 | — | — |
| Comparative Example 24 | 31.1 | 3.1 | — | — | — | — |
| Reference Example 7 | — | — | — | — | 76.3 | <1 |
| Reference Example 8 | — | — | 78.9 | <1 | — | — |
| Reference Example 9 | 74.4 | <1 | — | — | — | — |

TABLE 19

Production of transparent coloring composition (III)

| Examples | Transparent coloring composition (II) Kind | Amount blended (wt. part) | Polyfunctional monomer Kind | Amount blended (wt. part) | Polymerization initiator Kind | Amount blended (wt. part) |
|---|---|---|---|---|---|---|
| Example 76 | Example 57 | 500.0 | Dipentaerythritol pentaacrylate | 100.0 | Triazine-based compound** | 5.0 |
| Example 77 | Example 58 | 500.0 | Dipentaerythritol pentaacrylate | 100.0 | Triazine-based compound** | 5.0 |
| Example 78 | Example 59 | 500.0 | Dipentaerythritol pentaacrylate | 100.0 | Triazine-based compound** | 5.0 |
| Example 79 | Example 60 | 480.0 | Dipentaerythritol pentaacrylate | 100.0 | Triazine-based compound** | 4.5 |
| Example 80 | Example 61 | 500.0 | Dipentaerythritol pentaacrylate | 100.0 | Triazine-based compound** | 3.5 |
| Example 81 | Example 62 | 520.0 | Dipentaerythritol pentaacrylate | 100.0 | Triazine-based compound** | 2.5 |
| Example 82 | Example 63 | 520.0 | Dipentaerythritol pentaacrylate | 100.0 | Triazine-based compound** | 2.5 |
| Example 83 | Example 64 | 520.0 | Dipentaerythritol pentaacrylate | 100.0 | Triazine-based compound** | 2.5 |
| Example 84 | Example 65 | 460.0 | Dipentaerythritol pentaacrylate | 100.0 | Triazine-based compound** | 3.0 |
| Example 85 | Example 66 | 460.0 | Dipentaerythritol pentaacrylate | 100.0 | Triazine-based compound** | 3.0 |
| Example 86 | Example 67 | 460.0 | Dipentaerythritol pentaacrylate | 100.0 | Triazine-based compound** | 3.0 |
| Example 87 | Example 68 | 510.0 | Dipentaerythritol pentaacrylate | 100.0 | Triazine-based compound** | 4.5 |
| Example 88 | Example 69 | 510.0 | Dipentaerythritol pentaacrylate | 100.0 | Triazine-based compound** | 4.5 |
| Example 89 | Example 70 | 510.0 | Dipentaerythritol pentaacrylate | 100.0 | Triazine-based compound** | 4.5 |
| Example 90 | Example 71 | 490.0 | Dipentaerythritol pentaacrylate | 100.0 | Triazine-based compound** | 4.0 |
| Example 91 | Example 72 | 490.0 | Dipentaerythritol pentaacrylate | 100.0 | Triazine-based compound** | 4.0 |
| Example 92 | Example 73 | 490.0 | Dipentaerythritol pentaacrylate | 100.0 | Triazine-based compound** | 4.0 |
| Example 93 | Example 74 | 520.0 | Dipentaerythritol pentaacrylate | 100.0 | Triazine-based compound** | 4.0 |
| Example 94 | Example 75 | 490.0 | Dipentaerythritol pentaacrylate | 100.0 | Triazine-based compound** | 4.5 |

Note:
**2-(4-methoxy-β-styryl)-bis(4,6-trichloromethyl)-s-triazine

TABLE 20

Production of transparent coloring composition (III)

| Comparative Examples and Reference Examples | Transparent coloring composition (II) Kind | Amount blended (wt. part) | Polyfunctional monomer Kind | Amount blended (wt. part) | Polymerization initiator Kind | Amount blended (wt. part) |
|---|---|---|---|---|---|---|
| Comparative Example 25 | Comparative Example 16 | 500.0 | Dipentaerythritol pentaacrylate | 100.0 | Triazine-based compound** | 5.0 |
| Comparative Example 26 | Comparative Example 17 | 500.0 | Dipentaerythritol pentaacrylate | 100.0 | Triazine-based compound** | 5.0 |
| Comparative Example 27 | Comparative Example 18 | 500.0 | Dipentaerythritol pentaacrylate | 100.0 | Triazine-based compound** | 5.0 |
| Comparative Example 28 | Comparative Example 19 | 500.0 | Dipentaerythritol pentaacrylate | 100.0 | Triazine-based compound** | 5.0 |
| Comparative Example 29 | Comparative Example 20 | 500.0 | Dipentaerythritol pentaacrylate | 100.0 | Triazine-based compound** | 5.0 |

TABLE 20-continued

Production of transparent coloring composition (III)

| Comparative Examples and Reference Examples | Transparent coloring composition (II) Kind | Amount blended (wt. part) | Polyfunctional monomer Kind | Amount blended (wt. part) | Polymerization initiator Kind | Amount blended (wt. part) |
|---|---|---|---|---|---|---|
| Comparative Example 30 | Comparative Example 21 | 500.0 | Dipentaerythritol pentaacrylate | 100.0 | Triazine-based compound** | 5.0 |
| Comparative Example 31 | Comparative Example 22 | 500.0 | Dipentaerythritol pentaacrylate | 100.0 | Triazine-based compound** | 5.0 |
| Comparative Example 32 | Comparative Example 23 | 500.0 | Dipentaerythritol pentaacrylate | 100.0 | Triazine-based compound** | 5.0 |
| Comparative Example 33 | Comparative Example 24 | 500.0 | Dipentaerythritol pentaacrylate | 100.0 | Triazine-based compound** | 5.0 |
| Reference Example 10 | Reference Example 7 | 500.0 | Dipentaerythritol pentaacrylate | 100.0 | Triazine-based compound** | 5.0 |
| Reference Example 11 | Reference Example 8 | 500.0 | Dipentaerythritol pentaacrylate | 100.0 | Triazine-based compound** | 5.0 |
| Reference Example 12 | Reference Example 9 | 500.0 | Dipentaerythritol pentaacrylate | 100.0 | Triazine-based compound** | 5.0 |

Note:
**2-(4-methoxy-β-styryl)-bis(4,6-trichloromethyl)-s-triazine

TABLE 21

Properties of transparent coloring composition (III)

| Examples | Viscosity (mPa·s) | Dispersion average particle diameter ($Dd_{50}$) (nm) | Dispersion particle diameter ($Dd_{84}$) (nm) | Dispersion maximum particle diameter ($Dd_{99}$) (nm) | Geometrical standard deviation ($Dd_{84}/Dd_{50}$) (-) |
|---|---|---|---|---|---|
| Example 76 | 18.9 | 56 | 94 | 144 | 1.68 |
| Example 77 | 17.8 | 67 | 115 | 156 | 1.71 |
| Example 78 | 30.2 | 78 | 129 | 167 | 1.66 |
| Example 79 | 26.7 | 46 | 67 | 135 | 1.45 |
| Example 80 | 28.8 | 18 | 30 | 55 | 1.68 |
| Example 81 | 26.8 | 23 | 41 | 68 | 1.78 |
| Example 82 | 21.8 | 36 | 60 | 88 | 1.68 |
| Example 83 | 28.6 | 46 | 81 | 112 | 1.77 |
| Example 84 | 34.3 | 55 | 91 | 132 | 1.65 |
| Example 85 | 19.7 | 36 | 62 | 110 | 1.71 |
| Example 86 | 26.7 | 57 | 88 | 126 | 1.54 |
| Example 87 | 22.2 | 46 | 62 | 132 | 1.35 |
| Example 88 | 38.6 | 22 | 37 | 77 | 1.68 |
| Example 89 | 27.9 | 35 | 56 | 89 | 1.61 |
| Example 90 | 37.7 | 38 | 63 | 99 | 1.67 |
| Example 91 | 37.2 | 45 | 65 | 103 | 1.45 |
| Example 92 | 39.9 | 38 | 55 | 98 | 1.46 |
| Example 93 | 34.5 | 32 | 50 | 75 | 1.56 |
| Example 94 | 33.3 | 28 | 45 | 69 | 1.59 |

Properties of transparent coloring composition (III)
Specific absorptivity (based on weight)

| Examples | 550 nm $\epsilon_w$ (-) | 650 nm $\epsilon_w$ (-) | 610 nm $\epsilon_w$ (-) | 400 nm $\epsilon_w$ (-) |
|---|---|---|---|---|
| Example 76 | — | — | 2.23 | — |
| Example 77 | — | 2.29 | — | — |
| Example 78 | 2.10 | — | — | — |
| Example 79 | 1.93 | — | — | — |
| Example 80 | — | — | — | 2.08 |
| Example 81 | — | — | 1.73 | — |
| Example 82 | — | 1.79 | — | — |
| Example 83 | 1.90 | — | — | — |
| Example 84 | — | — | 2.10 | — |
| Example 85 | — | 2.12 | — | — |
| Example 86 | 2.10 | — | — | — |

TABLE 21-continued

| Example 87 | — | — | 1.75 | — |
|---|---|---|---|---|
| Example 88 | — | 1.76 | — | — |
| Example 89 | 1.73 | — | — | — |
| Example 90 | — | — | 2.12 | — |
| Example 91 | — | 2.09 | — | — |
| Example 92 | 2.08 | — | — | — |
| Example 93 | — | — | 2.27 | — |
| Example 94 | — | 2.35 | — | — |

TABLE 22

| | Properties of transparent coloring composition (III) | | | | |
|---|---|---|---|---|---|
| Comparative Examples and Reference Examples | Viscosity (mPa·s) | Dispersion average particle diameter ($Dd_{50}$) (nm) | Dispersion particle diameter ($Dd_{84}$) (nm) | Dispersion maximum particle diameter ($Dd_{99}$) (nm) | Geometrical standard deviation ($Dd_{84}/Dd_{50}$) (—) |
| Comparative Example 25 | 226 | 322 | 824 | 1234 | 2.56 |
| Comparative Example 26 | 356 | 467 | 1289 | 1867 | 2.76 |
| Comparative Example 27 | 678 | 452 | 1257 | 1926 | 2.78 |
| Comparative Example 28 | 468 | 321 | 822 | 1595 | 2.56 |
| Comparative Example 29 | 358 | 289 | 772 | 1368 | 2.67 |
| Comparative Example 30 | 980 | 298 | 855 | 1415 | 2.87 |
| Comparative Example 31 | 288 | 275 | 526 | 932 | 1.91 |
| Comparative Example 32 | 453 | 269 | 569 | 962 | 2.12 |
| Comparative Example 33 | 564 | 284 | 519 | 949 | 1.83 |
| Reference Example 10 | 65.9 | 356 | 894 | 1056 | 2.51 |
| Reference Example 11 | 52.4 | 348 | 887 | 1090 | 2.55 |
| Reference Example 12 | 64.9 | 366 | 921 | 1069 | 2.52 |

| | Properties of transparent coloring composition (III) Specific absorptivity (based on weight) | | | |
|---|---|---|---|---|
| Comparative Examples and Reference Examples | 550 nm $\epsilon_w$ (—) | 650 nm $\epsilon_w$ (—) | 610 nm $\epsilon_w$ (—) | 400 nm $\epsilon_w$ (—) |
| Comparative Example 25 | — | — | 1.00 | — |
| Comparative Example 26 | — | 1.00 | — | — |
| Comparative Example 27 | 1.00 | — | — | — |
| Comparative Example 28 | — | — | 1.02 | — |
| Comparative Example 29 | — | 1.04 | — | — |
| Comparative Example 30 | 1.01 | — | — | — |
| Comparative Example 31 | — | — | 1.10 | — |
| Comparative Example 32 | — | 1.17 | — | — |
| Comparative Example 33 | 1.12 | — | — | — |
| Reference Example 10 | — | — | 1.70 | — |
| Reference Example 11 | — | 1.73 | — | — |
| Reference Example 12 | 1.61 | — | — | — |

TABLE 23

Properties of colored transparent film (III)

| Examples | Surface roughness Ra (nm) | Chromaticity x (−) | Chromaticity y (−) | Y (−) | Photofatigue resistance ΔE* value (−) | Transmittance (R) 620 nm (%) | Transmittance (R) 550 nm (%) | Transmittance (G) 530 nm (%) | Transmittance (G) 650 nm (%) | Transmittance (B) 460 nm (%) | Transmittance (B) 610 nm (%) | Transmittance (Y) 550 nm (%) | Transmittance (Y) 400 nm (%) |
|---|---|---|---|---|---|---|---|---|---|---|---|---|---|
| Example 76 | 5.0 | 0.1487 | 0.2186 | 29.54 | 2.83 | — | — | — | — | 92.7 | <1 | — | — |
| Example 77 | 4.8 | 0.2735 | 0.3877 | 70.57 | 2.65 | — | — | 93.3 | <1 | — | — | — | — |
| Example 78 | 6.2 | 0.5665 | 0.3154 | 23.02 | 3.70 | 95.1 | <1 | — | — | — | — | — | — |
| Example 79 | 5.3 | 0.5772 | 0.3239 | 23.39 | 3.52 | 92.2 | <1 | — | — | — | — | — | — |
| Example 80 | 4.6 | 0.1342 | 0.2078 | 31.48 | 2.10 | — | — | — | — | — | — | 92.3 | <1 |
| Example 81 | 5.3 | 0.1471 | 0.2155 | 30.99 | 1.78 | — | — | — | — | 93.9 | <1 | — | — |
| Example 82 | 6.0 | 0.2735 | 0.3834 | 70.59 | 2.01 | — | — | 94.5 | <1 | — | — | — | — |
| Example 83 | 5.3 | 0.5833 | 0.3343 | 24.58 | 1.84 | 96.6 | <1 | — | — | — | — | — | — |
| Example 84 | 3.9 | 0.1569 | 0.2352 | 30.87 | 1.68 | — | — | — | — | 95.7 | <1 | — | — |
| Example 85 | 5.3 | 0.2653 | 0.3848 | 71.66 | 1.89 | — | — | 94.9 | <1 | — | — | — | — |
| Example 86 | 5.9 | 0.5736 | 0.3424 | 23.99 | 1.95 | 93.3 | <1 | — | — | — | — | — | — |
| Example 87 | 5.8 | 0.1564 | 0.2232 | 28.79 | 2.11 | — | — | — | — | 94.3 | <1 | — | — |
| Example 88 | 5.8 | 0.2689 | 0.3778 | 70.98 | 1.54 | — | — | 93.9 | <1 | — | — | — | — |
| Example 89 | 5.4 | 0.5821 | 0.3159 | 24.96 | 1.78 | 93.2 | <1 | — | — | — | — | — | — |
| Example 90 | 4.7 | 0.1646 | 0.2303 | 30.33 | 1.84 | — | — | — | — | 91.2 | <1 | — | — |
| Example 91 | 4.5 | 0.2716 | 0.3890 | 71.76 | 1.78 | — | — | 91.9 | <1 | — | — | — | — |
| Example 92 | 5.3 | 0.5636 | 0.3254 | 23.00 | 1.76 | 94.1 | <1 | — | — | — | — | — | — |
| Example 93 | 5.0 | 0.1698 | 0.2447 | 32.67 | 1.68 | — | — | — | — | 94.7 | <1 | — | — |
| Example 94 | 5.0 | 0.2640 | 0.3947 | 72.46 | 1.61 | — | — | 93.6 | <1 | — | — | — | — |

TABLE 24

Properties of colored transparent film (III)

| Comparative Examples and Reference Examples | Surface roughness Ra (nm) | Chromaticity x (−) | Chromaticity y (−) | Y (−) | Photofatigue resistance ΔE* value (−) | Transmittance (R) 620 nm (%) | Transmittance (R) 550 nm (%) | Transmittance (G) 530 nm (%) | Transmittance (G) 650 nm (%) | Transmittance (B) 460 nm (%) | Transmittance (B) 610 nm (%) |
|---|---|---|---|---|---|---|---|---|---|---|---|
| Comparative Example 25 | 38.2 | 0.1600 | 0.2221 | 26.26 | 8.01 | — | — | — | — | 72.4 | 6.7 |
| Comparative Example 26 | 35.8 | 0.2721 | 0.3756 | 64.58 | 7.88 | — | — | 73.1 | 6.0 | — | — |
| Comparative Example 27 | 27.2 | 0.5333 | 0.3015 | 21.99 | 10.56 | 71.6 | 5.4 | — | — | — | — |
| Comparative Example 28 | 43.2 | 0.1563 | 0.2319 | 25.65 | 7.27 | — | — | — | — | 68.9 | 2.0 |
| Comparative Example 29 | 48.3 | 0.2824 | 0.3855 | 65.16 | 6.32 | — | — | 70.5 | 2.8 | — | — |
| Comparative Example 30 | 55.6 | 0.5277 | 0.3148 | 21.61 | 7.88 | 65.7 | 6.5 | — | — | — | — |
| Comparative Example 31 | 22.1 | 0.1563 | 0.2156 | 23.70 | 5.89 | — | — | — | — | 34.8 | 3.3 |
| Comparative Example 32 | 28.3 | 0.2745 | 0.3836 | 65.88 | 5.87 | — | — | 36.6 | 3.2 | — | — |
| Comparative Example 33 | 24.3 | 0.5323 | 0.3252 | 22.72 | 5.26 | 32.3 | 2.9 | — | — | — | — |
| Reference Example 10 | 18.0 | 0.1628 | 0.2388 | 24.55 | 1.84 | — | — | — | — | 75.1 | <1 |
| Reference Example 11 | 16.0 | 0.2656 | 0.3878 | 64.26 | 1.74 | — | — | 77.2 | <1 | — | — |
| Reference Example 12 | 16.8 | 0.5211 | 0.3032 | 20.33 | 1.99 | 73.4 | <1 | — | — | — | — |

TABLE 25

Production of transparent coloring composition (IV)

| Examples | Transparent coloring composition (II) Kind | Amount blended (wt. part) | Photo-acid generator Kind | Amount blended (wt. part) |
|---|---|---|---|---|
| Example 95 | Example 57 | 500.0 | Onium salt compound*** | 5.0 |
| Example 96 | Example 58 | 500.0 | Onium salt compound*** | 5.0 |
| Example 97 | Example 59 | 500.0 | Onium salt compound*** | 5.0 |
| Example 98 | Example 60 | 480.0 | Onium salt compound*** | 4.5 |
| Example 99 | Example 61 | 500.0 | Onium salt compound*** | 3.5 |
| Example 100 | Example 62 | 520.0 | Halogen acid-generating compound**** | 2.5 |
| Example 101 | Example 63 | 520.0 | Halogen acid-generating compound**** | 2.5 |
| Example 102 | Example 64 | 520.0 | Halogen acid-generating compound**** | 2.5 |
| Example 103 | Example 65 | 460.0 | Halogen acid-generating compound**** | 3.0 |
| Example 104 | Example 66 | 460.0 | Halogen acid-generating compound**** | 3.0 |
| Example 105 | Example 67 | 460.0 | Halogen acid-generating compound**** | 3.0 |
| Example 106 | Example 68 | 510.0 | Sulfonic acid-generating compound***** | 4.5 |
| Example 107 | Example 69 | 510.0 | Sulfonic acid-generating compound***** | 4.5 |
| Example 108 | Example 70 | 510.0 | Sulfonic acid-generating compound***** | 4.5 |
| Example 109 | Example 71 | 490.0 | Onium salt compound*** | 4.0 |
| Example 110 | Example 72 | 490.0 | Onium salt compound*** | 4.0 |
| Example 111 | Example 73 | 490.0 | Onium salt compound*** | 4.0 |
| Example 112 | Example 74 | 520.0 | Onium salt compound*** | 4.0 |
| Example 113 | Example 75 | 490.0 | Onium salt compound*** | 4.5 |

Note:
***p-phenylthiophenyldiphenylsulfonium trifluoroacetate
****1-(3,4-dimethoxyphenyl)-3,5-bis(trichloromethyl)-s-triazine
*****N-trifluoromethanesulfonyloxydiphenylmaleimide

TABLE 26

Production of transparent coloring composition (IV)

| Comparative Examples and Reference Examples | Transparent coloring composition (II) Kind | Amount blended (wt. part) | Photo-acid generator Kind | Amount blended (wt. part) |
|---|---|---|---|---|
| Comparative Example 34 | Comparative Example 16 | 500.0 | Onium salt compound*** | 5.0 |
| Comparative Example 35 | Comparative Example 17 | 500.0 | Onium salt compound*** | 5.0 |
| Comparative Example 36 | Comparative Example 18 | 500.0 | Onium salt compound*** | 5.0 |
| Comparative Example 37 | Comparative Example 19 | 500.0 | Onium salt compound*** | 5.0 |
| Comparative Example 38 | Comparative Example 20 | 500.0 | Onium salt compound*** | 5.0 |
| Comparative Example 39 | Comparative Example 21 | 500.0 | Onium salt compound*** | 5.0 |
| Comparative Example 40 | Comparative Example 22 | 500.0 | Onium salt compound*** | 5.0 |
| Comparative Example 41 | Comparative Example 23 | 500.0 | Onium salt compound*** | 5.0 |
| Comparative Example 42 | Comparative Example 24 | 500.0 | Onium salt compound*** | 5.0 |
| Reference Example 13 | Reference Example 7 | 500.0 | Onium salt compound*** | 5.0 |
| Reference Example 14 | Reference Example 8 | 500.0 | Onium salt compound*** | 5.0 |
| Reference Example 15 | Reference Example 9 | 500.0 | Onium salt compound*** | 5.0 |

Note:
***p-phenylthiophenyldiphenylsulfonium trifluoroacetate

TABLE 27

Properties of transparent coloring composition (IV)

| Examples | Viscosity (mPa · s) | Dispersion average particle diameter ($Dd_{50}$) (nm) | Dispersion particle diameter ($Dd_{84}$) (nm) | Dispersion maximum particle diameter ($Dd_{99}$) (nm) | Geometrical standard deviation ($Dd_{84}/Dd_{50}$) (–) |
|---|---|---|---|---|---|
| Example 95 | 18.8 | 53 | 87 | 145 | 1.65 |
| Example 96 | 16.8 | 68 | 119 | 161 | 1.75 |
| Example 97 | 28.8 | 79 | 133 | 169 | 1.68 |
| Example 98 | 24.6 | 48 | 70 | 145 | 1.46 |
| Example 99 | 26.9 | 19 | 31 | 65 | 1.63 |
| Example 100 | 24.9 | 25 | 43 | 71 | 1.73 |
| Example 101 | 20.6 | 38 | 62 | 93 | 1.63 |
| Example 102 | 25.6 | 49 | 85 | 123 | 1.74 |
| Example 103 | 31.3 | 59 | 97 | 146 | 1.65 |
| Example 104 | 19.9 | 41 | 71 | 127 | 1.73 |
| Example 105 | 26.9 | 58 | 89 | 143 | 1.53 |
| Example 106 | 22.8 | 49 | 66 | 146 | 1.35 |
| Example 107 | 39.5 | 32 | 52 | 80 | 1.62 |
| Example 108 | 30.8 | 28 | 46 | 93 | 1.66 |
| Example 109 | 32.7 | 33 | 56 | 103 | 1.69 |
| Example 110 | 33.8 | 40 | 59 | 121 | 1.48 |
| Example 111 | 37.2 | 33 | 47 | 105 | 1.43 |
| Example 112 | 30.7 | 37 | 57 | 86 | 1.54 |
| Example 113 | 32.8 | 31 | 48 | 76 | 1.55 |

Properties of transparent coloring composition (IV)
Specific absorptivity (based on weight)

| Examples | 550 nm $\epsilon_w$ (–) | 650 nm $\epsilon_w$ (–) | 610 nm $\epsilon_w$ (–) | 400 nm $\epsilon_w$ (–) |
|---|---|---|---|---|
| Example 95 | — | — | 2.22 | — |
| Example 96 | — | 2.27 | — | — |
| Example 97 | 2.11 | — | — | — |
| Example 98 | 1.95 | — | — | — |
| Example 99 | — | — | — | 2.09 |
| Example 100 | — | — | 1.75 | — |
| Example 101 | — | 1.78 | — | — |
| Example 102 | 1.89 | — | — | — |
| Example 103 | — | — | 2.11 | — |
| Example 104 | — | 2.11 | — | — |
| Example 105 | 2.11 | — | — | — |
| Example 106 | — | — | 1.76 | — |
| Example 107 | — | 1.75 | — | — |
| Example 108 | 1.72 | — | — | — |
| Example 109 | — | — | 2.11 | — |
| Example 110 | — | 2.10 | — | — |
| Example 111 | 2.09 | — | — | — |
| Example 112 | — | — | 2.26 | — |
| Example 113 | — | 2.34 | — | — |

TABLE 28

Properties of transparent coloring composition (IV)

| Comparative Examples and Reference Examples | Viscosity (mPa · s) | Dispersion average particle diameter ($Dd_{50}$) (nm) | Dispersion particle diameter ($Dd_{84}$) (nm) | Dispersion maximum particle diameter ($Dd_{99}$) (nm) | Geometrical standard deviation ($Dd_{84}/Dd_{50}$) (–) |
|---|---|---|---|---|---|
| Comparative Example 34 | 232 | 329 | 849 | 1223 | 2.58 |
| Comparative Example 35 | 412 | 471 | 1305 | 1500 | 2.77 |
| Comparative Example 36 | 587 | 463 | 1283 | 1789 | 2.77 |
| Comparative Example 37 | 421 | 333 | 862 | 1521 | 2.59 |

TABLE 28-continued

| | | | | | |
|---|---|---|---|---|---|
| Comparative Example 38 | 338 | 278 | 734 | 1432 | 2.64 |
| Comparative Example 39 | 678 | 286 | 795 | 1639 | 2.78 |
| Comparative Example 40 | 314 | 285 | 564 | 988 | 1.98 |
| Comparative Example 41 | 333 | 271 | 507 | 867 | 1.87 |
| Comparative Example 42 | 468 | 298 | 572 | 931 | 1.92 |
| Reference Example 13 | 75.3 | 326 | 835 | 1112 | 2.56 |
| Reference Example 14 | 66.4 | 359 | 901 | 1062 | 2.51 |
| Reference Example 15 | 65.3 | 373 | 939 | 1078 | 2.52 |

| Comparative Examples and Reference Examples | Properties of transparent coloring composition (IV) Specific absorptivity (based on weight) | | | |
|---|---|---|---|---|
| | 550 nm $\epsilon_w$ (—) | 650 nm $\epsilon_w$ (—) | 610 nm $\epsilon_w$ (—) | 400 nm $\epsilon_w$ (—) |
| Comparative Example 34 | — | — | 1.00 | — |
| Comparative Example 35 | — | 1.00 | — | — |
| Comparative Example 36 | 1.00 | — | — | — |
| Comparative Example 37 | — | — | 1.02 | — |
| Comparative Example 38 | — | 1.03 | — | — |
| Comparative Example 39 | 1.02 | — | — | — |
| Comparative Example 40 | — | — | 1.09 | — |
| Comparative Example 41 | — | 1.16 | — | — |
| Comparative Example 42 | 1.13 | — | — | — |
| Reference Example 13 | — | — | 1.68 | — |
| Reference Example 14 | — | 1.71 | — | — |
| Reference Example 15 | 1.59 | — | — | — |

TABLE 29

| | Properties of colored transparent film (IV) | | | | |
|---|---|---|---|---|---|
| | Surface | Chromaticity | | | Photofatigue resistance |
| Examples | roughness Ra (nm) | x (—) | y (—) | Y (—) | ΔE* value (—) |
| Example 95 | 5.1 | 0.1483 | 0.2183 | 29.53 | 2.81 |
| Example 96 | 4.7 | 0.2733 | 0.3873 | 70.51 | 2.63 |
| Example 97 | 6.3 | 0.5661 | 0.3151 | 23.11 | 3.71 |
| Example 98 | 5.5 | 0.5779 | 0.3234 | 23.41 | 3.54 |
| Example 99 | 4.9 | 0.1342 | 0.2073 | 31.52 | 2.13 |
| Example 100 | 5.9 | 0.1475 | 0.2152 | 30.87 | 1.79 |
| Example 101 | 5.4 | 0.2732 | 0.3831 | 70.37 | 2.04 |
| Example 102 | 5.9 | 0.5833 | 0.3347 | 24.58 | 1.86 |
| Example 103 | 4.8 | 0.1563 | 0.2359 | 30.89 | 1.69 |
| Example 104 | 5.6 | 0.2655 | 0.3843 | 71.47 | 1.84 |
| Example 105 | 5.3 | 0.5738 | 0.3429 | 23.45 | 1.96 |
| Example 106 | 5.2 | 0.1562 | 0.2235 | 28.53 | 2.14 |
| Example 107 | 5.9 | 0.2682 | 0.3773 | 70.56 | 1.58 |
| Example 108 | 5.8 | 0.5824 | 0.3154 | 24.87 | 1.73 |
| Example 109 | 5.1 | 0.1646 | 0.2301 | 30.36 | 1.86 |
| Example 110 | 5.3 | 0.2716 | 0.3893 | 71.77 | 1.73 |
| Example 111 | 5.1 | 0.5638 | 0.3257 | 23.17 | 1.75 |
| Example 112 | 5.8 | 0.1692 | 0.2449 | 32.64 | 1.64 |
| Example 113 | 5.5 | 0.2643 | 0.3948 | 72.48 | 1.66 |

| | Properties of colored transparent film (IV) | | | |
|---|---|---|---|---|
| | Transmittance (R) | | Transmittance (G) | |
| Examples | 620 nm (%) | 550 nm (%) | 530 nm (%) | 650 nm (%) |
| Example 95 | — | — | — | — |
| Example 96 | — | — | 94.1 | <1 |
| Example 97 | 95.3 | <1 | — | — |
| Example 98 | 92.6 | <1 | — | — |
| Example 99 | — | — | — | — |
| Example 100 | — | — | — | — |
| Example 101 | — | — | 94.2 | <1 |
| Example 102 | 96.9 | <1 | — | — |
| Example 103 | — | — | — | — |
| Example 104 | — | — | 94.0 | <1 |
| Example 105 | 93.9 | <1 | — | — |
| Example 106 | — | — | — | — |
| Example 107 | — | — | 93.8 | <1 |

TABLE 29-continued

| Examples | 94.3 | <1 | — | — |
|---|---|---|---|---|
| Example 108 | 94.3 | <1 | — | — |
| Example 109 | — | — | — | — |
| Example 110 | — | — | 91.3 | <1 |
| Example 111 | 94.5 | <1 | — | — |
| Example 112 | — | — | — | — |
| Example 113 | — | — | 93.4 | <1 |

| | Properties of colored transparent film (IV) | | | |
|---|---|---|---|---|
| | Transmittance (B) | | Transmittance (Y) | |
| Examples | 460 nm (%) | 610 nm (%) | 550 nm (%) | 400 nm (%) |
| Example 95 | 92.4 | <1 | — | — |
| Example 96 | — | — | — | — |
| Example 97 | — | — | — | — |
| Example 98 | — | — | — | — |
| Example 99 | — | — | 92.1 | <1 |
| Example 100 | 93.4 | <1 | — | — |
| Example 101 | — | — | — | — |
| Example 102 | — | — | — | — |
| Example 103 | 95.2 | <1 | — | — |
| Example 104 | — | — | — | — |
| Example 105 | — | — | — | — |
| Example 106 | 94.6 | <1 | — | — |
| Example 107 | — | — | — | — |
| Example 108 | — | — | — | — |
| Example 109 | 91.5 | <1 | — | — |
| Example 110 | — | — | — | — |
| Example 111 | — | — | — | — |
| Example 112 | 94.6 | <1 | — | — |
| Example 113 | — | — | — | — |

TABLE 30

| | Properties of colored transparent film (IV) | | | | |
|---|---|---|---|---|---|
| Comparative Examples and Reference Examples | Surface roughness Ra (nm) | Chromaticity x (−) | y (−) | Y (−) | Photofatigue resistance ΔE* value (−) |
| Comparative Example 34 | 36.3 | 0.1611 | 0.2236 | 26.27 | 7.87 |
| Comparative Example 35 | 33.2 | 0.2724 | 0.3766 | 64.44 | 6.57 |
| Comparative Example 36 | 38.2 | 0.5336 | 0.3081 | 21.67 | 8.65 |
| Comparative Example 37 | 28.9 | 0.1543 | 0.2228 | 25.46 | 6.45 |
| Comparative Example 38 | 38.0 | 0.2834 | 0.3864 | 65.19 | 5.78 |
| Comparative Example 39 | 28.5 | 0.5228 | 0.3234 | 21.54 | 6.97 |
| Comparative Example 40 | 28.5 | 0.1567 | 0.2222 | 23.67 | 5.21 |
| Comparative Example 41 | 27.4 | 0.2727 | 0.3884 | 65.56 | 5.32 |
| Comparative Example 42 | 22.6 | 0.5327 | 0.3247 | 22.83 | 5.36 |
| Reference Example 13 | 12.2 | 0.1616 | 0.2323 | 24.64 | 1.97 |
| Reference Example 14 | 13.4 | 0.2640 | 0.3845 | 64.48 | 1.88 |
| Reference Example 15 | 14.1 | 0.5212 | 0.3028 | 20.46 | 2.15 |

| | Properties of colored transparent film (IV) | | | | | |
|---|---|---|---|---|---|---|
| Comparative Examples and Reference Examples | Transmittance (R) | | Transmittance (G) | | Transmittance (B) | |
| | 620 nm (%) | 550 nm (%) | 530 nm (%) | 650 nm (%) | 460 nm (%) | 610 nm (%) |
| Comparative Example 34 | — | — | — | — | 72.8 | 6.5 |
| Comparative Example 35 | — | — | 73.3 | 5.8 | — | — |
| Comparative Example 36 | 71.0 | 3.8 | — | — | — | — |
| Comparative Example 37 | — | — | — | — | 69.2 | 6.6 |
| Comparative Example 38 | — | — | 71.6 | 6.2 | — | — |
| Comparative Example 39 | 67.5 | 5.1 | — | — | — | — |
| Comparative Example 40 | — | — | — | — | 35.1 | 3.5 |
| Comparative Example 41 | — | — | 36.7 | 2.9 | — | — |
| Comparative Example 42 | 32.3 | 3.0 | — | — | — | — |
| Reference Example 13 | — | — | — | — | 75.9 | <1 |
| Reference Example 14 | — | — | 76.7 | <1 | — | — |
| Reference Example 15 | 72.6 | <1 | — | — | — | — |

TABLE 31

| | Production of color filter | | | | Properties of color filter | | | |
|---|---|---|---|---|---|---|---|---|
| | Method of producing color filter | Kind of colored transparent film | | | Transmittance | | | |
| | | | | | (R) | (G) | (B) | |
| Examples | | (R) | (G) | (B) | (620 nm) (%) | (530 nm) (%) | (460 nm) (%) | Contrast (%) |
| Example 114 | Color filter (I) | Example 59 | Example 58 | Example 57 | 94.6 | 92.3 | 92.1 | 1580 |
| Example 115 | Color filter (I) | Example 67 | Example 66 | Example 65 | 91.3 | 94.6 | 95.8 | 1420 |

TABLE 31-continued

| | Production of color filter | | | | Properties of color filter | | | |
| --- | --- | --- | --- | --- | --- | --- | --- | --- |
| | Method of producing color filter | Kind of colored transparent film | | | Transmittance | | | Contrast |
| Examples | | (R) | (G) | (B) | (R) (620 nm) (%) | (G) (530 nm) (%) | (B) (460 nm) (%) | (%) |
| Example 116 | Color filter (I) | Example 70 | Example 69 | Example 68 | 91.2 | 93.6 | 94.1 | 1400 |
| Example 117 | Color filter (I) | Example 73 | Example 72 | Example 71 | 92.6 | 91.3 | 91.6 | 1310 |
| Example 118 | Color filter (II) | Example 78 | Example 77 | Example 76 | 95.1 | 93.3 | 92.7 | 1890 |
| Example 119 | Color filter (II) | Example 86 | Example 85 | Example 84 | 93.3 | 94.9 | 95.7 | 1670 |
| Example 120 | Color filter (II) | Example 89 | Example 88 | Example 87 | 93.2 | 93.9 | 94.3 | 1430 |
| Example 121 | Color filter (II) | Example 92 | Example 91 | Example 90 | 94.1 | 91.9 | 91.2 | 1740 |
| Example 122 | Color filter (III) | Example 97 | Example 96 | Example 95 | 95.3 | 94.1 | 92.4 | 2120 |
| Example 123 | Color filter (III) | Example 105 | Example 104 | Example 103 | 93.9 | 94.0 | 95.2 | 1860 |
| Example 124 | Color filter (III) | Example 108 | Example 107 | Example 106 | 94.3 | 93.8 | 94.6 | 1660 |
| Example 125 | Color filter (III) | Example 111 | Example 110 | Example 109 | 94.5 | 91.3 | 91.5 | 1470 |

TABLE 32

| Comparative Examples and Reference Examples | Production of color filter | | | | Properties of color filter | | | |
| --- | --- | --- | --- | --- | --- | --- | --- | --- |
| | Method of producing color filter | Kind of colored transparent film | | | Transmittance | | | Contrast |
| | | (R) | (G) | (B) | (R) (620 nm) (%) | (G) (530 nm) (%) | (B) (460 nm) (%) | (%) |
| Comparative Example 43 | Color filter (I) | Comparative Example 18 | Comparative Example 17 | Comparative Example 16 | 64.3 | 66.2 | 66.3 | 570 |
| Comparative Example 44 | Color filter (I) | Comparative Example 21 | Comparative Example 20 | Comparative Example 19 | 61.8 | 64.9 | 65.0 | 460 |
| Comparative Example 45 | Color filter (I) | Comparative Example 24 | Comparative Example 23 | Comparative Example 22 | 45.3 | 47.3 | 51.6 | 590 |
| Reference Example 16 | Color filter (I) | Reference Example 9 | Reference Example 8 | Reference Example 7 | 83.7 | 85.9 | 85.0 | 740 |
| Comparative Example 46 | Color filter (II) | Comparative Example 27 | Comparative Example 26 | Comparative Example 25 | 64.8 | 66.9 | 66.5 | 520 |
| Comparative Example 47 | Color filter (II) | Comparative Example 30 | Comparative Example 29 | Comparative Example 28 | 62.2 | 64.3 | 64.8 | 480 |
| Comparative Example 48 | Color filter (II) | Comparative Example 33 | Comparative Example 32 | Comparative Example 31 | 45.3 | 51.3 | 52.6 | 520 |
| Reference Example 17 | Color filter (II) | Reference Example 12 | Reference Example 11 | Reference Example 10 | 84.3 | 86.2 | 85.2 | 790 |
| Comparative Example 49 | Color filter (III) | Comparative Example 36 | Comparative Example 35 | Comparative Example 34 | 64.7 | 68.3 | 67.2 | 680 |
| Comparative Example 50 | Color filter (III) | Comparative Example 39 | Comparative Example 38 | Comparative Example 37 | 62.5 | 65.6 | 66.8 | 560 |
| Comparative Example 51 | Color filter (III) | Comparative Example 42 | Comparative Example 41 | Comparative Example 40 | 44.2 | 46.6 | 50.3 | 460 |
| Reference Example 18 | Color filter (III) | Reference Example 15 | Reference Example 14 | Reference Example 13 | 83.5 | 86.1 | 85.1 | 780 |

What is claimed is:

1. A transparent color composition comprising:
an inorganic-organic composite pigment comprising fine white inorganic particles and an organic pigment adhered to the surface of the respective fine white inorganic particles, in which the primary particles of said composite pigment have an average particle diameter of 1 to 100 nm, and
a solvent,
wherein the organic-inorganic pigment is dispersed in the solvent and has a dispersion average particle diameter $Dd_{50}$ of not more than 300 nm and a dispersion maximum particle diameter $Dd_{99}$ of not more than 1,000 nm.

2. A transparent coloring composition according to claim 1, further comprising a transparent resin containing at least one acid group and/or latent acid group.

3. A transparent coloring composition according to claim 2, further comprising a photo-radical polymerization initiator, and a polyfunctional monomer having two or more ethylenically unsaturated double bonds.

4. A transparent coloring composition according to claim 3, wherein the amount of polyfunctional monomer is 5 to 300 parts by weight based on 100 parts by weight of the transparent resin.

5. A transparent coloring composition according to claim 2, further comprising a photo-acid generator.

6. A transparent coloring composition according to claim 3 or 5, wherein the organic-inorganic composite pigment dispersed in the transparent coloring composition has a dispersion particle diameter $Dd_{84}$ of not more than 600 nm and a geometrical standard deviation $Dd_{84}/Dd_{50}$ of the dispersion particle diameter $Dd_{84}$ to the dispersion average particle diameter $Dd_{50}$ of not more than 3.00.

7. A transparent coloring composition according to claim 2, wherein the amount of transparent resin having at least one acid group and/or latent acid group contained in the composition is 5 to 500 parts by weight based on 100 parts by weight of the organic-inorganic composite pigment.

8. A transparent coloring composition according to claim 2, wherein the organic-inorganic composite pigment dispersed in the transparent coloring composition has a dispersion particle diameter $Dd_{84}$ of not more than 600 nm and a geometrical standard deviation $Dd_{84}/Dd_{50}$ of the dispersion particle diameter $Dd_{84}$ to the dispersion average particle diameter $Dd_{50}$ of not more than 3.00.

9. A transparent coloring composition according to claim 1, wherein the amount of organic pigment adhered onto the surface of the respective fine white inorganic particles is 1 to 500 parts by weight based on 100 parts by weight of the fine white particles.

10. A transparent coloring composition according to claim 1, wherein the organic-inorganic composite pigment dispersed in the transparent coloring composition has a dispersion particle diameter $Dd_{84}$ of not more than 600 nm and a geometrical standard deviation $Dd_{84}/Dd_{50}$ of the dispersion particle diameter $Dd_{84}$ to the dispersion average particle diameter $Dd_{50}$ of not more than 3.00.

11. A transparent coloring composition according to claim 1, wherein the organic-inorganic composite pigment has a volume-average particle diameter $Dp_{50}$ of not more than 5.00 μm, and a volume maximum particle diameter $Dp_{99}$ of not more than 12.00 μm.

12. A transparent color composition comprising:

an inorganic-organic composite pigment comprising fine white inorganic particles, a surface modifier layer formed on the surface of the respective fine white inorganic particles and an organic pigment adhered to the surface of the surface modifier layer, in which the primary particles of said composite pigment have an average particle diameter of 1 to 100 nm, and a solvent, wherein the organic-inorganic pigment is dispersed in the solvent and has a dispersion average particle diameter $Dd_{50}$ of not more than 300 nm and a dispersion maximum particle diameter $Dd_{99}$ of not more than 1,000 nm.

* * * * *